United States Patent
Rodriguez et al.

(10) Patent No.: US 11,050,694 B2
(45) Date of Patent: *Jun. 29, 2021

(54) SUGGESTED ITEMS FOR USE WITH EMBEDDED APPLICATIONS IN CHAT CONVERSATIONS

(71) Applicant: Google LLC, Mountain View, CA (US)

(72) Inventors: Adam Rodriguez, Singapore (SG); Rendong Chen, Singapore (SG); Thomas Horn, Singapore (SG); Florbela Lei, Singapore (SG); Yohan Launay, Singapore (SG); Chen-Ting Chuang, Singapore (SG); Bin Zhu, Singapore (SG)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,632

(22) Filed: Jun. 10, 2019

(65) Prior Publication Data

US 2019/0297039 A1 Sep. 26, 2019

Related U.S. Application Data

(63) Continuation of application No. 15/624,638, filed on Jun. 15, 2017, now Pat. No. 10,348,658.

(51) Int. Cl.
*H04L 12/58* (2006.01)
*G06Q 10/10* (2012.01)
(Continued)

(52) U.S. Cl.
CPC ......... *H04L 51/063* (2013.01); *G06Q 10/101* (2013.01); *H04L 51/02* (2013.01);
(Continued)

(58) Field of Classification Search
CPC ....... H04L 51/02; H04L 51/063; H04L 51/10; H04L 65/1069; H04L 65/1093;
(Continued)

(56) References Cited

U.S. PATENT DOCUMENTS 6,092,102 A 7/2000 Wagner
D599,363 S 9/2009 Mays
(Continued)

FOREIGN PATENT DOCUMENTS

CN 1475908 2/2004
CN 102222079 10/2011
(Continued)

OTHER PUBLICATIONS

WIPO, International Preliminary Report on Patentability for International Patent Application No. PCT/US2018/022501, dated Dec. 17, 2019, 7 pages.
(Continued)

*Primary Examiner* — Alina A Boutah
(74) *Attorney, Agent, or Firm* — IP Spring

(57) ABSTRACT

Implementations relate to suggested items for use with embedded applications in chat conversations. In some implementations, a method includes causing a chat interface to be displayed by a first user device, the chat interface generated by a messaging application. The chat interface is configured to display, in a chat conversation, messages provided by user devices participating in the chat conversation over a network. An embedded interface is associated with the chat interface and displayed by an embedded application associated with the messaging application. A suggestion event is determined to occur in association with the embedded application based on received data that indicates that a particular event has occurred at one or more other user devices participating in the chat conversation.
(Continued)

Suggested response items are obtained based on the suggestion event, and the suggested response items are displayed by the first user device.

20 Claims, 15 Drawing Sheets

(51) Int. Cl.
H04L 29/08 (2006.01)
H04L 29/06 (2006.01)

(52) U.S. Cl.
CPC .......... H04L 51/10 (2013.01); H04L 65/1069 (2013.01); H04L 65/1093 (2013.01); H04L 65/403 (2013.01); H04L 65/602 (2013.01); H04L 67/36 (2013.01)

(58) Field of Classification Search
CPC ..... H04L 65/403; H04L 65/602; H04L 67/36; G06Q 10/101
See application file for complete search history.

(56) References Cited

U.S. PATENT DOCUMENTS

| | | | |
|---|---|---|---|
| 7,603,413 B1 | 10/2009 | Herold et al. | |
| D611,053 S | 3/2010 | Kanga et al. | |
| D624,927 S | 10/2010 | Allen et al. | |
| 7,904,187 B2 | 3/2011 | Hoffberg et al. | |
| D648,343 S | 11/2011 | Chen | |
| D648,735 S | 11/2011 | Arnold | |
| D651,609 S | 1/2012 | Pearson et al. | |
| D658,201 S | 4/2012 | Gleasman et al. | |
| D658,677 S | 5/2012 | Gleasman et al. | |
| D658,678 S | 5/2012 | Gleasman et al. | |
| 8,266,109 B1 | 9/2012 | Bilsborough | |
| D673,172 S | 12/2012 | Peters | |
| 8,391,618 B1 | 3/2013 | Chuang et al. | |
| 8,423,577 B1 | 4/2013 | Lee et al. | |
| 8,515,958 B2 | 8/2013 | Knight | |
| 8,554,701 B1 | 10/2013 | Dillard et al. | |
| 8,589,407 B2 | 11/2013 | Bhatia | |
| D695,755 S | 12/2013 | Hwang et al. | |
| D716,338 S | 1/2014 | Lee | |
| D699,739 S | 2/2014 | Voreis et al. | |
| D699,744 S | 2/2014 | Ho Kushner | |
| 8,650,210 B1 | 2/2014 | Cheng et al. | |
| D701,228 S | 3/2014 | Lee | |
| D701,527 S | 3/2014 | Brinda et al. | |
| D701,528 S | 3/2014 | Brinda et al. | |
| 8,688,698 B1 | 4/2014 | Black et al. | |
| 8,700,480 B1 | 4/2014 | Fox et al. | |
| D704,726 S | 5/2014 | Maxwell | |
| D705,244 S | 5/2014 | Arnold et al. | |
| D705,251 S | 5/2014 | Pearson et al. | |
| D705,802 S | 5/2014 | Kerr et al. | |
| D706,802 S | 6/2014 | Myung et al. | |
| 8,825,474 B1 | 9/2014 | Zhai et al. | |
| D714,821 S | 10/2014 | Chand et al. | |
| 8,938,669 B1* | 1/2015 | Cohen | H04L 65/403 715/255 |
| 8,996,639 B1* | 3/2015 | Faaborg | H04L 51/02 709/206 |
| 9,019,415 B2 | 4/2015 | Ma et al. | |
| 9,020,956 B1 | 4/2015 | Barr et al. | |
| 9,191,786 B2 | 11/2015 | Davis | |
| 9,213,941 B2 | 12/2015 | Petersen | |
| 9,230,241 B1* | 1/2016 | Singh | H04N 21/41407 |
| 9,262,517 B2 | 2/2016 | Feng et al. | |
| 9,330,110 B2 | 5/2016 | Lin et al. | |
| 9,560,152 B1 | 1/2017 | Jamdar et al. | |
| 9,595,059 B2 | 3/2017 | Knudson et al. | |
| 9,600,724 B2 | 3/2017 | Ko et al. | |
| 9,674,120 B2 | 6/2017 | Davis | |
| 9,715,496 B1* | 7/2017 | Sapoznik | G06F 16/245 |
| 9,805,371 B1 | 10/2017 | Sapoznik et al. | |
| 9,807,037 B1 | 10/2017 | Sapoznik et al. | |
| 9,817,813 B2 | 11/2017 | Faizakof et al. | |
| 9,973,705 B2 | 5/2018 | Ko et al. | |
| 10,129,193 B2 | 11/2018 | Mahmoud et al. | |
| 10,146,748 B1* | 12/2018 | Barndollar | G06F 16/487 |
| 10,146,768 B2 | 12/2018 | Fuxman et al. | |
| 10,404,636 B2 | 9/2019 | Rodriguez et al. | |
| 10,412,030 B2 | 9/2019 | McGregor et al. | |
| 10,440,279 B2 | 10/2019 | Ko et al. | |
| 10,547,574 B2 | 1/2020 | Pham | |
| 2003/0105589 A1 | 6/2003 | Liu et al. | |
| 2003/0182374 A1 | 9/2003 | Haldar | |
| 2005/0146621 A1 | 7/2005 | Tanaka et al. | |
| 2006/0004685 A1 | 1/2006 | Pyhalammi et al. | |
| 2006/0029106 A1 | 2/2006 | Ott et al. | |
| 2006/0150119 A1 | 7/2006 | Chesnais et al. | |
| 2006/0156209 A1 | 7/2006 | Matsuura et al. | |
| 2007/0030364 A1 | 2/2007 | Obrador et al. | |
| 2007/0094217 A1 | 4/2007 | Ronnewinkel | |
| 2007/0162942 A1 | 7/2007 | Hamynen et al. | |
| 2007/0244980 A1 | 10/2007 | Baker et al. | |
| 2008/0120371 A1 | 5/2008 | Gopal | |
| 2009/0007019 A1 | 1/2009 | Kobayashi et al. | |
| 2009/0076795 A1 | 3/2009 | Bangalore et al. | |
| 2009/0119584 A1 | 5/2009 | Herbst | |
| 2009/0282114 A1 | 11/2009 | Feng et al. | |
| 2010/0118115 A1 | 5/2010 | Takahashi et al. | |
| 2010/0228590 A1 | 9/2010 | Muller et al. | |
| 2010/0260426 A1 | 10/2010 | Huang et al. | |
| 2011/0074685 A1 | 3/2011 | Causey et al. | |
| 2011/0098056 A1 | 4/2011 | Rhoads | |
| 2011/0107223 A1 | 5/2011 | Tilton et al. | |
| 2011/0145068 A1 | 6/2011 | King et al. | |
| 2011/0164163 A1 | 7/2011 | Bilbrey et al. | |
| 2011/0212717 A1 | 9/2011 | Rhoads et al. | |
| 2011/0221912 A1 | 9/2011 | Yoshizawa | |
| 2011/0230174 A1 | 9/2011 | Mandanapu et al. | |
| 2011/0252108 A1 | 10/2011 | Morris et al. | |
| 2011/0252207 A1 | 10/2011 | Janosik, Jr. et al. | |
| 2012/0030289 A1 | 2/2012 | Buford et al. | |
| 2012/0033876 A1 | 2/2012 | Momeyer et al. | |
| 2012/0041941 A1 | 2/2012 | King et al. | |
| 2012/0041973 A1 | 2/2012 | Kim et al. | |
| 2012/0042036 A1 | 2/2012 | Lau et al. | |
| 2012/0131520 A1 | 5/2012 | Tang et al. | |
| 2012/0179717 A1 | 7/2012 | Kennedy et al. | |
| 2012/0224743 A1 | 9/2012 | Rodriguez et al. | |
| 2012/0245944 A1* | 9/2012 | Gruber | H04M 1/72547 704/270.1 |
| 2012/0278164 A1 | 11/2012 | Spivack et al. | |
| 2012/0322428 A1 | 12/2012 | Lupoli et al. | |
| 2013/0021266 A1 | 1/2013 | Selim | |
| 2013/0050507 A1 | 2/2013 | Syed et al. | |
| 2013/0061148 A1 | 3/2013 | Das et al. | |
| 2013/0073366 A1 | 3/2013 | Heath | |
| 2013/0218877 A1 | 8/2013 | Satyanarayanan | |
| 2013/0260727 A1 | 10/2013 | Knudson et al. | |
| 2013/0262574 A1* | 10/2013 | Cohen | H04L 51/18 709/204 |
| 2013/0346235 A1 | 12/2013 | Lam | |
| 2014/0004889 A1 | 1/2014 | Davis | |
| 2014/0035846 A1 | 2/2014 | Lee et al. | |
| 2014/0047413 A1* | 2/2014 | Sheive | G06F 8/30 717/110 |
| 2014/0067371 A1 | 3/2014 | Liensberger | |
| 2014/0071324 A1 | 3/2014 | Tokunaga et al. | |
| 2014/0088954 A1 | 3/2014 | Shirzadi et al. | |
| 2014/0108562 A1* | 4/2014 | Panzer | H04L 51/02 709/206 |
| 2014/0129942 A1 | 5/2014 | Rathod | |
| 2014/0156801 A1 | 6/2014 | Fernandes et al. | |
| 2014/0163954 A1 | 6/2014 | Joshi et al. | |
| 2014/0164506 A1* | 6/2014 | Tesch | H04L 51/32 709/204 |
| 2014/0171133 A1 | 6/2014 | Stuttle et al. | |
| 2014/0189027 A1 | 7/2014 | Zhang et al. | |
| 2014/0189538 A1 | 7/2014 | Martens et al. | |

(56) References Cited

U.S. PATENT DOCUMENTS

| | | |
|---|---|---|
| 2014/0201675 A1 | 7/2014 | Joo et al. |
| 2014/0228009 A1 | 8/2014 | Chen et al. |
| 2014/0232889 A1 | 8/2014 | King et al. |
| 2014/0237057 A1 | 8/2014 | Khodorenko |
| 2014/0317030 A1 | 10/2014 | Shen et al. |
| 2014/0337438 A1* | 11/2014 | Govande ............... H04L 51/063 |
| | | 709/206 |
| 2014/0372349 A1 | 12/2014 | Driscoll |
| 2014/0372540 A1 | 12/2014 | Libin |
| 2015/0006143 A1 | 1/2015 | Skiba et al. |
| 2015/0026101 A1 | 1/2015 | Lin et al. |
| 2015/0026642 A1 | 1/2015 | Wilson et al. |
| 2015/0032724 A1 | 1/2015 | Thirugnanasundaram et al. |
| 2015/0058720 A1 | 2/2015 | Smadja et al. |
| 2015/0095855 A1 | 4/2015 | Bai et al. |
| 2015/0100537 A1 | 4/2015 | Grieves et al. |
| 2015/0171133 A1 | 6/2015 | Kim et al. |
| 2015/0178371 A1 | 6/2015 | Seth et al. |
| 2015/0178388 A1 | 6/2015 | Winnemoeller et al. |
| 2015/0185995 A1 | 7/2015 | Snowmaker et al. |
| 2015/0207765 A1 | 7/2015 | Brantingham et al. |
| 2015/0220806 A1 | 8/2015 | Heller et al. |
| 2015/0227797 A1 | 8/2015 | Ko et al. |
| 2015/0248411 A1 | 9/2015 | Krinker et al. |
| 2015/0250936 A1 | 9/2015 | Thomas et al. |
| 2015/0286371 A1 | 10/2015 | Degani |
| 2015/0288633 A1 | 10/2015 | Ogundokun et al. |
| 2015/0302301 A1 | 10/2015 | Petersen |
| 2015/0347617 A1 | 12/2015 | Weinig et al. |
| 2015/0370830 A1 | 12/2015 | Murphy-Chutorian et al. |
| 2016/0011725 A1 | 1/2016 | D'Argenio et al. |
| 2016/0037311 A1 | 2/2016 | Cho |
| 2016/0042252 A1 | 2/2016 | Sawhney et al. |
| 2016/0043817 A1 | 2/2016 | Handoush et al. |
| 2016/0043974 A1* | 2/2016 | Purcell ................. G06F 3/0482 |
| | | 715/758 |
| 2016/0055246 A1 | 2/2016 | Marcin et al. |
| 2016/0072737 A1* | 3/2016 | Forster ................... H04L 51/02 |
| | | 709/206 |
| 2016/0092044 A1 | 3/2016 | Laska et al. |
| 2016/0140447 A1 | 5/2016 | Cohen et al. |
| 2016/0140477 A1 | 5/2016 | Karanam et al. |
| 2016/0162791 A1 | 6/2016 | Petersen |
| 2016/0179816 A1 | 6/2016 | Glover |
| 2016/0196040 A1 | 7/2016 | Kapadia et al. |
| 2016/0210279 A1 | 7/2016 | Kim et al. |
| 2016/0210962 A1 | 7/2016 | Kim et al. |
| 2016/0224524 A1 | 8/2016 | Kay et al. |
| 2016/0226804 A1* | 8/2016 | Hampson ............. G06Q 10/107 |
| 2016/0234553 A1* | 8/2016 | Hampson ........... H04N 21/4667 |
| 2016/0283454 A1 | 9/2016 | Leydon et al. |
| 2016/0292217 A1 | 10/2016 | Sinha et al. |
| 2016/0308794 A1 | 10/2016 | Kim et al. |
| 2016/0321052 A1 | 11/2016 | Sharifi et al. |
| 2016/0342895 A1 | 11/2016 | Gao et al. |
| 2016/0350304 A1 | 12/2016 | Aggarwal et al. |
| 2016/0378080 A1 | 12/2016 | Uppala et al. |
| 2017/0017648 A1 | 1/2017 | Pearlman et al. |
| 2017/0031575 A1 | 2/2017 | Dotan-Conen et al. |
| 2017/0075878 A1 | 3/2017 | Jon et al. |
| 2017/0093769 A1* | 3/2017 | Lind ..................... G09G 5/377 |
| 2017/0098122 A1 | 4/2017 | el Kaliouby et al. |
| 2017/0134316 A1 | 5/2017 | Cohen et al. |
| 2017/0142046 A1 | 5/2017 | Mahmoud et al. |
| 2017/0147202 A1 | 5/2017 | Donohue |
| 2017/0149703 A1 | 5/2017 | Willett et al. |
| 2017/0153792 A1 | 6/2017 | Kapoor et al. |
| 2017/0171117 A1 | 6/2017 | Carr et al. |
| 2017/0180276 A1* | 6/2017 | Gershony ............... H04L 51/18 |
| 2017/0180294 A1 | 6/2017 | Milligan et al. |
| 2017/0187654 A1 | 6/2017 | Lee |
| 2017/0250930 A1* | 8/2017 | Ben-Itzhak ............. G06F 3/011 |
| 2017/0250935 A1 | 8/2017 | Rosenberg |
| 2017/0250936 A1 | 8/2017 | Rosenberg et al. |
| 2017/0293834 A1 | 10/2017 | Raison et al. |
| 2017/0308589 A1 | 10/2017 | Liu et al. |
| 2017/0324868 A1 | 11/2017 | Tamblyn et al. |
| 2017/0344224 A1 | 11/2017 | Kay et al. |
| 2017/0357432 A1 | 12/2017 | King et al. |
| 2017/0357442 A1* | 12/2017 | Peterson ............. G06F 3/04886 |
| 2017/0359279 A1 | 12/2017 | Peterson et al. |
| 2017/0359281 A1 | 12/2017 | Yip et al. |
| 2017/0359282 A1 | 12/2017 | Alsina et al. |
| 2017/0359283 A1 | 12/2017 | Bernstein |
| 2017/0359285 A1 | 12/2017 | Weinig et al. |
| 2017/0359701 A1 | 12/2017 | Sarma et al. |
| 2017/0359702 A1 | 12/2017 | Peterson et al. |
| 2017/0359703 A1 | 12/2017 | Ciechanowski et al. |
| 2018/0004397 A1 | 1/2018 | Mazzocchi |
| 2018/0005272 A1 | 1/2018 | Todasco et al. |
| 2018/0012231 A1 | 1/2018 | Sapoznik et al. |
| 2018/0013699 A1 | 1/2018 | Sapoznik et al. |
| 2018/0032499 A1 | 2/2018 | Hampson et al. |
| 2018/0032997 A1 | 2/2018 | Gordon et al. |
| 2018/0060705 A1 | 3/2018 | Mahmoud et al. |
| 2018/0083894 A1 | 3/2018 | Fung et al. |
| 2018/0083898 A1* | 3/2018 | Pham .................... G06F 40/274 |
| 2018/0083901 A1* | 3/2018 | McGregor, Jr. ......... G06K 9/726 |
| 2018/0090135 A1 | 3/2018 | Schlesinger et al. |
| 2018/0109526 A1 | 4/2018 | Fung et al. |
| 2018/0137097 A1 | 5/2018 | Lim et al. |
| 2018/0196854 A1* | 7/2018 | Burks ................. G06F 3/04886 |
| 2018/0210874 A1* | 7/2018 | Fuxman ................. G06F 40/35 |
| 2018/0227498 A1 | 8/2018 | Ko et al. |
| 2018/0293601 A1* | 10/2018 | Glazier ............... G06Q 30/0214 |
| 2018/0309706 A1 | 10/2018 | Kim et al. |
| 2018/0316637 A1* | 11/2018 | Desjardins .......... H04L 65/4023 |
| 2018/0322403 A1 | 11/2018 | Ron et al. |
| 2018/0336226 A1 | 11/2018 | Anorga et al. |
| 2018/0336415 A1 | 11/2018 | Anorga et al. |
| 2018/0352393 A1 | 12/2018 | Lottermoser et al. |
| 2018/0367483 A1 | 12/2018 | Rodriguez et al. |
| 2018/0367484 A1 | 12/2018 | Rodriguez et al. |
| 2018/0373683 A1* | 12/2018 | Hullette ............... G06F 40/134 |
| 2019/0204868 A1 | 7/2019 | Choi et al. |

FOREIGN PATENT DOCUMENTS

| | | |
|---|---|---|
| CN | 102395966 | 3/2012 |
| CN | 102467574 | 5/2012 |
| CN | 103226949 | 7/2013 |
| CN | 103548025 | 1/2014 |
| CN | 104035947 | 9/2014 |
| CN | 104836720 | 8/2015 |
| CN | 104951428 | 9/2015 |
| EP | 1 376392 | 1/2004 |
| EP | 1394713 | 3/2004 |
| EP | 2523436 | 11/2012 |
| EP | 2560104 | 2/2013 |
| EP | 2688014 | 1/2014 |
| EP | 2703980 | 3/2014 |
| EP | 3091445 | 11/2016 |
| JP | 2000-298676 | 10/2000 |
| JP | 2002-132804 | 5/2002 |
| JP | 2012-027950 | 2/2012 |
| JP | 2012-221480 | 11/2012 |
| JP | 2014-86088 | 5/2014 |
| JP | 2014-142919 | 8/2014 |
| JP | 2014-170397 | 9/2014 |
| JP | 2015-531136 | 10/2015 |
| KR | 20110003462 | 1/2011 |
| KR | 20130008036 | 1/2013 |
| KR | 10-2013-0050871 | 5/2013 |
| KR | 20130061387 | 6/2013 |
| KR | 1020150037935 | 4/2015 |
| KR | 10-2015-0108096 | 9/2015 |
| KR | 10-2017-0032883 | 3/2017 |
| WO | 2004/104758 | 12/2004 |
| WO | 2011/002989 | 1/2011 |
| WO | 2016130788 | 8/2016 |

(56) References Cited

FOREIGN PATENT DOCUMENTS

| WO | 2016204428 | 12/2016 |
|---|---|---|
| WO | 2018089109 | 5/2018 |

OTHER PUBLICATIONS

WIPO, International Preliminary Report on Patentability for International Patent Application No. PCT/US2018/022503, dated Dec. 17, 2019, 9 pages.
JPO, Office Action for Japanese Patent Application No. 2019-547462, dated Feb. 18, 2020, 6 pages.
USPTO, First Action Interview, Office Action Summary for U.S. Appl. No. 15/912,796, dated Mar. 13, 2020, 5 pages.
KIPO, Notice of Preliminary Rejection (with English translation) for Korean Patent Application No. 10-2019-7020465, dated Jan. 10, 2020, 9 pages.
KIPO, Notice of Allowance (with English translation) for Korean Patent Application No. 10-2019-7024479, dated Jan. 17, 2020, 4 pages.
KIPO, Notice of Final Rejection for Korean Patent Application No. 10-2018-7019756, dated Jan. 17, 2020, 4 pages.
USPTO, First Action Interview, Office Action Summary for U.S. Appl. No. 15/912,809, dated Feb. 18, 2020, 18 pages.
USPTO, Final Office Action for U.S. Appl. No. 15/386,760, dated Jan. 10, 2020, 12 pages.
USPTO, First Action Interview, Pre-Interview Communication for U.S. Appl. No. 15/912,796, dated Jan. 8, 2020, 5 pages.
CNIPA, First Office Action for Chinese Patent Application No. 201680070359.3, dated Jun. 3, 2020, 9 pages.
EPO, Communication Pursuant to Article 94(3) EPC for European Patent Application No. 18716399.3, dated Jul. 3, 2020, 6 pages.
EPO, Communication Pursuant to Article 94(3) EPC for European Patent Application No. 16825666.7, dated Jun. 18, 2020, 6 pages.
EPO, Communication Pursuant to Article 94(3) EPC for European Patent Application No. 16825663.4, dated May 7, 2020, 5 pages.
IPO, First Examination Report for Indian Patent Application No. 201847014172, dated Jun. 17, 2020, 7 pages.
JPO, Office Action for Japanese Patent Application No. 2018-532399, dated Jun. 16, 2020, 3 pages.
JPO, Notice of Allowance (including English translation) for Japanese Patent Application No. 2019-547462, dated May 28, 2020, 2 pages.
KIPO, Notice of Final Rejection for Korean Patent Application No. 10-2019-7020465, dated Jun. 29, 2020, 4 pages.
USPTO, Final Office Action for U.S. Appl. No. 15/912,809, dated Jun. 24, 2020, 8 pages.
USPTO, Non-final Office Action for U.S. Appl. No. 16/560,815, dated May 18, 2020, 16 pages.
WIPO, International Preliminary Report on Patentability for International Patent Application No. PCT/US2018/021028, dated Nov. 28, 2019, 10 pages.
USPTO, Notice of Allowance for U.S. Appl. No. 15/709,423, dated Oct. 9, 2019, 19 pages.
USPTO, Non-final Office Action for U.S. Appl. No. 15/386,760, dated Oct. 11, 2019, 12 pages.
KIPO, Notice of Final Rejection for Korean Patent Application No. 10-2018-7019756, dated Nov. 25, 2019, 3 pages.
KIPO, Notice of Preliminary Rejection for Korean Patent Application No. 10-2019-7024479, dated Sep. 18, 2019, 9 pages.
KIPO, Notice of Allowance for Korean Patent Application No. 10-2019-7011687, dated Sep. 26, 2019, 4 pages.
Lardinois, "Allo brings Google's smarts to messaging", https://techcrunch.com/2016/09/20/allo-brings-googles-smarts-to-messaging/, Sep. 2016, 14 pages.
USPTO, First Action Interview, Pre-Interview Communication for U.S. Appl. No. 15/912,809, dated Nov. 22, 2019, 5 pages.
Notice of Acceptance for Australian Patent Application No. 2015214298, dated Apr. 20, 2018, 3 pages.

Examination Report No. 1 for Australian Patent Application No. 2015214298, dated Apr. 24, 2017, 3 pages.
Examination Report No. 2 for Australian Patent Application No. 2015214298, dated Nov. 2, 2017, 3 pages.
International Search Report and Written Opinion for International Patent Application No. PCT/US2015/014414, dated May 11, 2015, 8 pages.
Blippar, "Computer Vision API", www.web.blippar.com/computer-vision-api, 4 pages.
Chen, et al., "Bezel Copy: An Efficient Cross-0Application Copy-Paste Technique for Touchscreen Smartphones.", Advanced Visual Interfaces, ACM, New York, New York, May 27, 2014, pp. 185-192.
CNIPA, First Office Action for Chinese Patent Application No. 201580016692.1, dated Nov. 2, 2018, 7 pages.
EPO, International Search Report and Written Opinion for PCT Application No. PCT/US2017/046858, dated Oct. 11, 2017, 10 Pages.
EPO, International Search Report and Written Opinion for International Patent Application No. PCT/US2016/068083, dated Mar. 9, 2017, 13 pages.
EPO, International Search Report for International Patent Application No. PCT/US2017/052713, dated Dec. 5, 2017, 4 Pages.
EPO, International Search Report for International Patent Application No. PCT/US2016/068083, dated Mar. 9, 2017, 4 pages.
EPO, International Search Report for International Patent Application No. PCT/US2018/022501, dated May 14, 2018, 4 pages.
EPO, Communication Pursuant to Article 94(3) EPC for European Patent Application No. 16825663.4, dated Apr. 16, 2019, 5 pages.
EPO, International Search Report for International Patent Application No. PCT/US2017/052349, dated Dec. 13, 2017, 5 pages.
EPO, International Search Report for International Patent Application No. PCT/US2017/057044, dated Jan. 18, 2018, 5 pages.
EPO, Written Opinion for International Patent Application No. PCT/US2017/052713, dated Dec. 5, 2017, 6 Pages.
EPO, Communication Pursuant to Article 94(3) EPC for European Patent Application No. 16825666.7, dated Apr. 23, 2019, 6 pages.
EPO, International Search Report for International Patent Application No. PCT/US2018/022503, dated Aug. 16, 2018, 6 pages.
EPO, Written Opinion for International Patent Application No. PCT/US2017/052349, dated Dec. 13, 2017, 6 pages.
EPO, Written Opinion for International Patent Application No. PCT/US2018/022501, dated May 14, 2018, 6 pages.
EPO, Written Opinion of the International Preliminary Examining Authority for International Patent Application No. PCT/US2017/052713, dated Oct. 15, 2018, 6 pages.
EPO, Extended European Search Report for European Patent Application No. 15746410.8, dated Sep. 5, 2017, 7 pages.
EPO, Written Opinion for International Patent Application No. PCT/US2018/022503, dated Aug. 16, 2018, 8 pages.
EPO, Written Opinion of the International Preliminary Examination Authority for International Patent Application No. PCT/US2017/057044, dated Dec. 20, 2018, 8 pages.
EPO, Written Opinion for International Patent Application No. PCT/US2017/057044, dated Jan. 18, 2018, 8 pages.
EPO, Written Opinion of the International Preliminary Examining Authority for International Patent Application No. PCT/US2017/052349, dated Aug. 6, 2018, 9 pages.
EPO, Written Opinion for International Patent Application No. PCT/US2016/068083, dated Mar. 9, 2017, 9 pages.
Fuxman, Ariel, "Aw, so cute!": Allo helps you respond to shared photos, Google Research Blog, https://research.googleblog.com/2016/05/aw-so-cute-allo-helps-you-respond-to.html, May 18, 2016, 6 pages.
International Bureau of WIPO, International Preliminary Report on Patentability for International Patent Application No. PCT/US2017/046858, dated Feb. 19, 2019, 7 pages.
International Bureau of WIPO, International Preliminary Report on Patentability for International Patent Application No. PCT/US2017/052349, dated Mar. 26, 2019, 7 pages.
International Bureau of WIPO, International Preliminary Report on Patentability for International Patent Application No. PCT/US2016/068083, dated Jul. 5, 2018, 9 pages.

(56) References Cited

OTHER PUBLICATIONS

Kannan, et al., "Smart Reply: Automated Response Suggestions for Email", Proceedings of the 22nd ACM SIGKDD International Conference on Knowledge Discovery and Data Mining, KDD '16, ACM Press, New York, New York, Aug. 13, 2016, pp. 955-965.
Khandelwal, "Hey Allo! Meet Google's AI-powered Smart Messaging App", The Hacker News, http://web.archive.org/web/20160522155700/https://thehackernews.com/2016/05/google-allo-messenger.html, May 19, 2016, 3 pages.
KIPO, Notice of Preliminary Rejection for Korean Patent Application No. 10-2019-7011687, dated May 7, 2019, 3 pages.
KIPO, Notice of Final Rejection for Korean Patent Application No. 10-2018-7013953, dated Jun. 13, 2019, 4 pages.
KIPO, Notice of Final Rejection for Korean Patent Application No. 10-2018-7013953, dated May 8, 2019, 4 pages.
KIPO, Preliminary Rejection for Korean Patent Application No. 10-2018-7013953, dated Oct. 29, 2018, 5 pages.
KIPO, Notice of Preliminary Rejection for Korean Patent Application No. 10-2018-7019756, dated May 13, 2019, 9 pages.
Lee, Jang Ho et al., "Supporting multi-user, multi-applet workspaces in CBE", Proceedings of the 1996 ACM conference on Computer supported cooperative work, ACM, Nov. 16, 1996, 10 pages.
Microsoft Corporation, "Windows Messenger for Windows XP", Retrieved from Internet: http://web.archive.org/web/20030606220012/messenger.msn.com/support/features.asp?client=0 on Sep. 22, 2005, Jun. 6, 2003, 3 pages.
PCT, "International Search Report and Written Opinion for International Application No. PCT/US2018/021028", dated Jun. 15, 2018, 11 Pages.
Pinterest, "Pinterest Lens", www.help.pinterest.com/en/articles/pinterest-lens, 2 pages.
Russell, "Google Allo is the Hangouts Killer We've Been Waiting for", Retrieved from the Internet: http://web.archive.org/web/20160519115534/https://www.technobuffalo.com/2016/05/18/google-allo-hangouts-replacement/, May 18, 2016, 3 pages.
USPTO, Notice of Allowance for U.S. Appl. No. 15/709,418, dated Mar. 1, 2018, 11 pages.
USPTO, Notice of Allowance for U.S. Appl. No. 16/003,661, dated May 1, 2019, 11 pages.
USPTO, Non-final Office Action for U.S. Appl. No. 15/386,162, dated Nov. 27, 2018, 11 Pages.
USPTO, Non-final Office Action for U.S. Appl. No. 15/386,162, dated Nov. 27, 2018, 12 pages.
USPTO, Final Office Action for U.S. Appl. No. 15/386,162, dated Jun. 5, 2019, 13 pages.
USPTO, Final Office Action for U.S. Appl. No. 15/386,760, dated May 30, 2019, 13 pages.
USPTO, Final Office Action for U.S. Appl. No. 15/238,304, dated Nov. 23, 2018, 14 pages.
USPTO, Notice of Allowance for U.S. Appl. No. 14/618,962, dated Nov. 8, 2016, 14 pages.
USPTO, Non-final Office Action for U.S. Appl. No. 15/709,418, dated Nov. 21, 2017, 15 pages.
USPTO, Notice of Allowance for U.S. Appl. No. 15/350,040, dated Apr. 24, 2019, 16 pages.
USPTO, First Action Interview, Office Action Summary for U.S. Appl. No. 16/003,661, dated Dec. 14, 2018, 16 pages.
USPTO, Non-final Office Action for U.S. Appl. No. 15/238,304, dated Jun. 7, 2018, 17 pages.
USPTO, Notice of Allowance for U.S. Appl. No. 15/428,821, dated Jan. 10, 2018, 20 pages.
USPTO, Notice of Allowance for U.S. Appl. No. 15/624,638, dated Feb. 28, 2019, 21 Pages.
USPTO, Non-final Office Action for U.S. Appl. No. 15/709,423, dated May 2, 2019, 21 Pages.
USPTO, Non-final Office Action for U.S. Appl. No. 14/618,962, dated Feb. 26, 2016, 25 pages.
USPTO, Notice of Allowance for U.S. Appl. No. 15/415,506, dated Jul. 23, 2018, 25 pages.
USPTO, Non-final Office Action for U.S. Appl. No. 15/428,821, dated May 18, 2017, 30 pages.
USPTO, First Action Interview, Pre-Interview Communication for U.S. Appl. No. 15/624,637, dated Oct. 19, 2018, 4 pages.
USPTO, First Action Interview, Office Action Summary for U.S. Appl. No. 15/350,040, dated Oct. 30, 2018, 4 pages.
USPTO, Non-final Office Action for U.S. Appl. No. 15/946,342, dated Jul. 26, 2018, 40 pages.
USPTO, First Action Interview, Pre-Interview Communication for U.S. Appl. No. 15/415,506, dated Apr. 5, 2018, 5 pages.
USPTO, First Action Interview, Office Action Summary for U.S. Appl. No. 15/624,637, dated Jan. 25, 2019, 5 pages.
USPTO, First Action Interview, Pre-Interview Communication for U.S. Appl. No. 15/350,040, dated Jul. 16, 2018, 5 pages.
USPTO, First Action Interview, Pre-Interview Communication for U.S. Appl. No. 15/386,760, dated Nov. 6, 2018, 5 pages.
USPTO, Notice of Allowance for U.S. Appl. No. 15/624,637, dated Apr. 19, 2019, 6 pages.
USPTO, First Action Interview, Pre-Interview Communication for U.S. Appl. No. 16/003,661, dated Aug. 29, 2018, 6 pages.
USPTO, Notice of Allowance for U.S. Appl. No. 15/238,304, dated Apr. 5, 2019, 7 pages.
USPTO, First Action Interview, Office Action Summary for U.S. Appl. No. 15/386,760, dated Jan. 30, 2019, 8 pages.
USPTO, Notice of Allowance for Design U.S. Appl. No. 29/503,386, dated Jul. 13, 2016, 8 pages.
USPTO, Non-final Office Action for Design U.S. Appl. No. 29/503,386, dated Feb. 1, 2016, 9 pages.
Vinyals, O. et al., "Show and Tell: A Neural Image Caption Generator", arXiv:1411.4555v2 [cs.CV], Apr. 20, 2015, pp. 1-9.
Yeh, et al., "Searching the web with mobile images for location recognition", Proceedings of the 2004 IEEE Computer Society Conference on Pattern Recognition, vol. 2, Jun.-Jul. 2004, pp. 1-6.
Chen, et al., "A Survey of Document Image Classification: problem statement, classifier architecture and performance evaluation", International Journal of Document Analysis and Recognition (IJDAR), vol. 10, No. 1, Aug. 3, 2006, pp. 1-16.
EPO, Written Opinion of the International Preliminary Examining Authority for International Patent Application No. PCT/US2018/021028, dated Jun. 14, 2019, 11 pages.
International Bureau of WIPO, International Preliminary Report on Patentability for International Patent Application No. PCT/US2017/057044, dated Jul. 30, 2019, 9 pages.
JPO, Office Action for Japanese Patent Application No. 2018-551908, dated Aug. 20, 2019, 4 pages.
JPO, Office Action for Japanese Patent Application No. 2018-532399, dated Jul. 23, 2019, 6 pages.
USPTO, Notice of Allowance for U.S. Appl. No. 15/386,162, dated Aug. 9, 2019, 5 pages.
JPO, Office Action for Japanese Patent Application No. 2018-532399, dated Mar. 10, 2020, 4 pages.
USPTO, Notice of Allowance for U.S. Appl. No. 15/386,760, dated Apr. 24, 2020, 9 pages.
USPTO, Notice of Allowance for U.S. Appl. No. 16/569,273, dated Feb. 20, 2020, 17 pages.
USPTO, Non-final Office Action for U.S. Appl. No. 16/569,273, dated Oct. 18, 2019, 21 pages.
CNIPA, First Office Action (with English translation) for Chinese Patent Application No. 201680082643.2, dated Aug. 5, 2020, 24 pages.
EPO, Communication Pursuant to Article 94(3) EPC for European Patent Application No. 17794825.4, dated Aug. 4, 2020, 8 pages.
JPO, Office Action for Japanese Patent Application No. 2019-518995, dated Jul. 28, 2020, 5 pages.
JPO, Notice of Allowance (with English translation) for Japanese Patent Application No. 2018-532399, dated Sep. 23, 2020, 2 pages.
Kannan, et al., "Smart reply: Automated response suggestion for email", Proceedings of the 22nd ACM SIGKDD International Conference on Knowledge Discovery and Data Mining, Aug. 13, 2016, 10 pages.
KIPO, Notice of Allowance (with English translation) for Korean Patent Application No. 10-2019-7020465, dated Aug. 5, 2020, 5 pages.

(56) References Cited

OTHER PUBLICATIONS

USPTO, Notice of Allowance for U.S. Appl. No. 15/912,796, dated Aug. 20, 2020, 9 pages.
USPTO, Notice of Allowance for U.S. Appl. No. 16/552,902, dated Aug. 27, 2020, 10 pages.
USPTO, Notice of Allowance for U.S. Appl. No. 16/560,815, dated Aug. 31, 2020, 11 pages.
USPTO, Notice of Allowance for U.S. Appl. No. 15/912,809, dated Sep. 11, 2020, 12 pages.
EPO, Communication Pursuant to Article 94(3) EPC for European Patent Application No. 17780938.1, dated Dec. 9, 2020, 6 pages.
USPTO, Non-final Office Action for U.S. Appl. No. 16/881,816, dated Nov. 27, 2020, 15 pages.
USPTO, Notice of Allowance for U.S. Appl. No. 16/703,699, dated Dec. 11, 2020, 9 pages.
CNIPA, Second Office Action for Chinese Patent Application No. 201680070359.3, dated Jan. 6, 2021, 6 pages.
EPO, Summons to Attend Oral Proceedings for European Patent Application No. 17794825.4, dated Feb. 12, 2021, 10 pages.
EPO, Communication Pursuant to Article 94(3) EPC for European Patent Application No. 18716400.9, dated Mar. 11, 2021, 9 pages.
IPO, First Examination Report for Indian Patent Application No. 201847024288, dated Jan. 22, 2021, 7 pages.
IPO, First Examination Report for Indian Patent Application No. 201947015830, dated Mar. 17, 2021, 6 pages.
IPO, First Examination Report for Indian Patent Application No. 201947014236, dated Mar. 29, 2021, 7 pages.
JPO, Office Action for Japanese Patent Application No. 2019-518995, dated Jan. 19, 2021, 5 pages.
Viathur, "How Google Allo stands out from WhatsApp, WeChat, Facebook Messenger", Retrieved from Internet: https://www.livemint.com/Leisure/6BcwmziLgEueyaL8VIgvHP/GoogleAllo-Machine-learning-smart-features-could-stumble-o.html, Sep. 21, 2016, 8 pages.
CNIPA, , Second Office Action (with English translation) for Chinese Patent Application No. 201680082643.2, dated Apr. 2, 2021, 13 pages.

\* cited by examiner

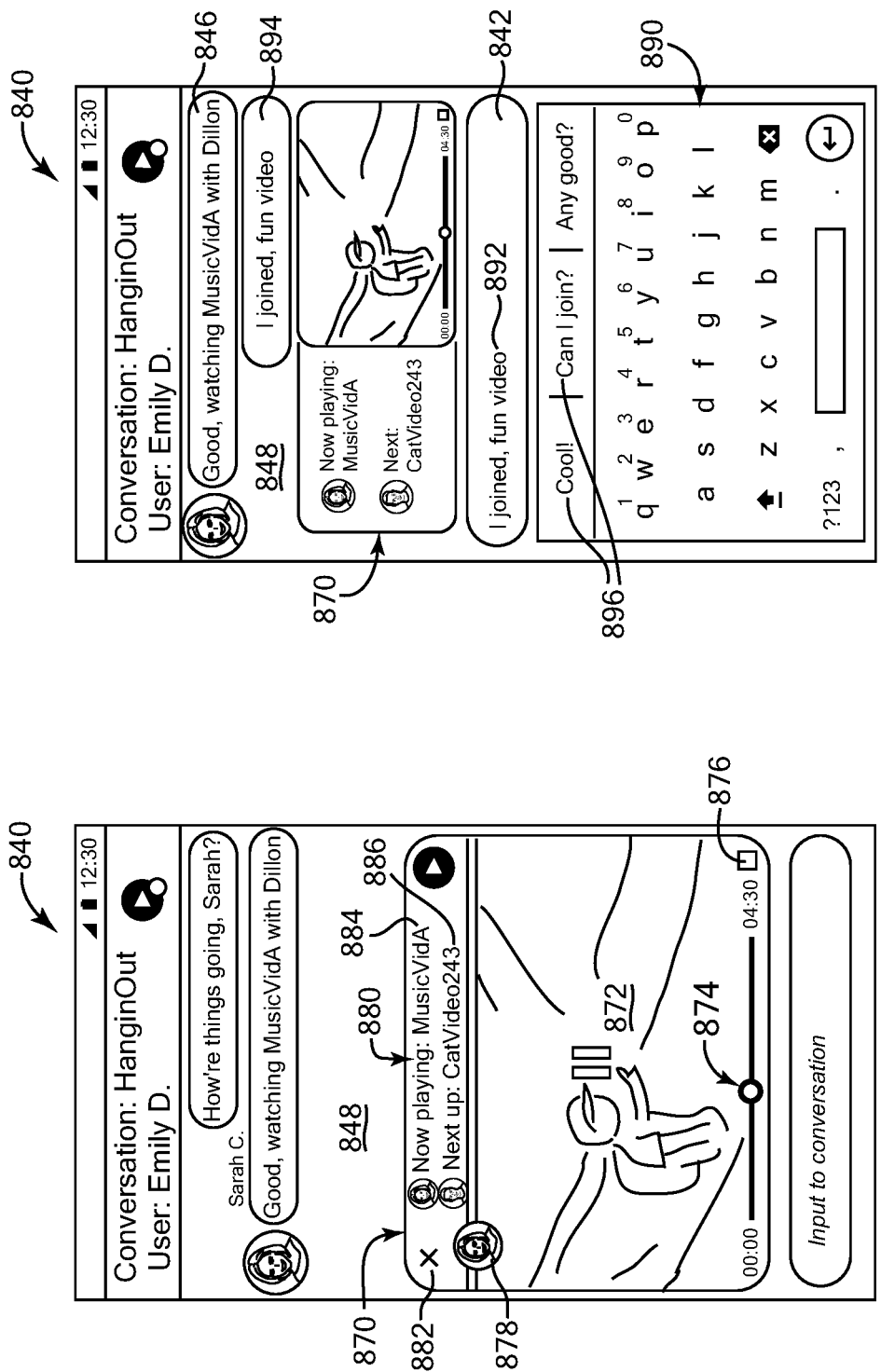

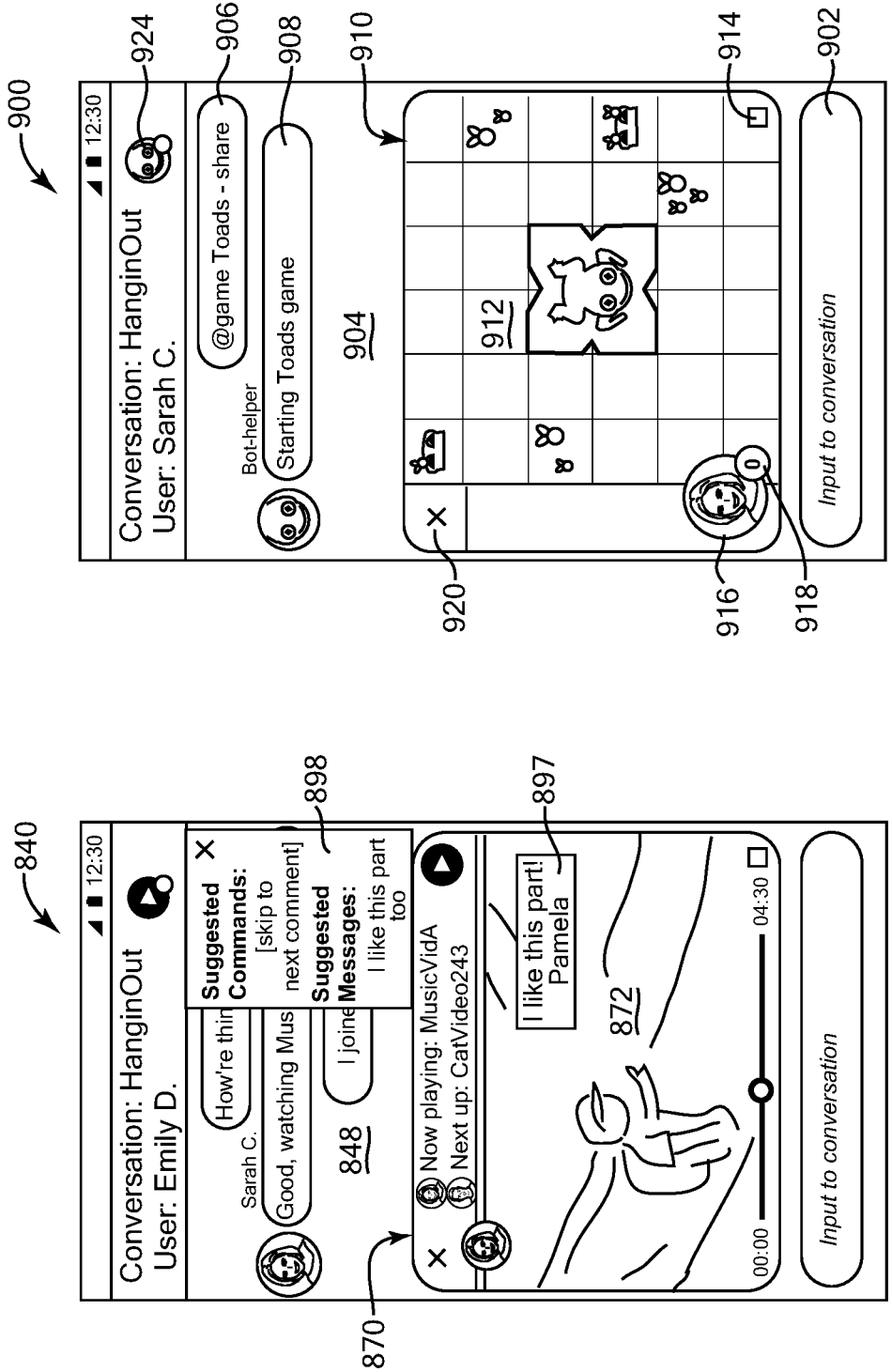

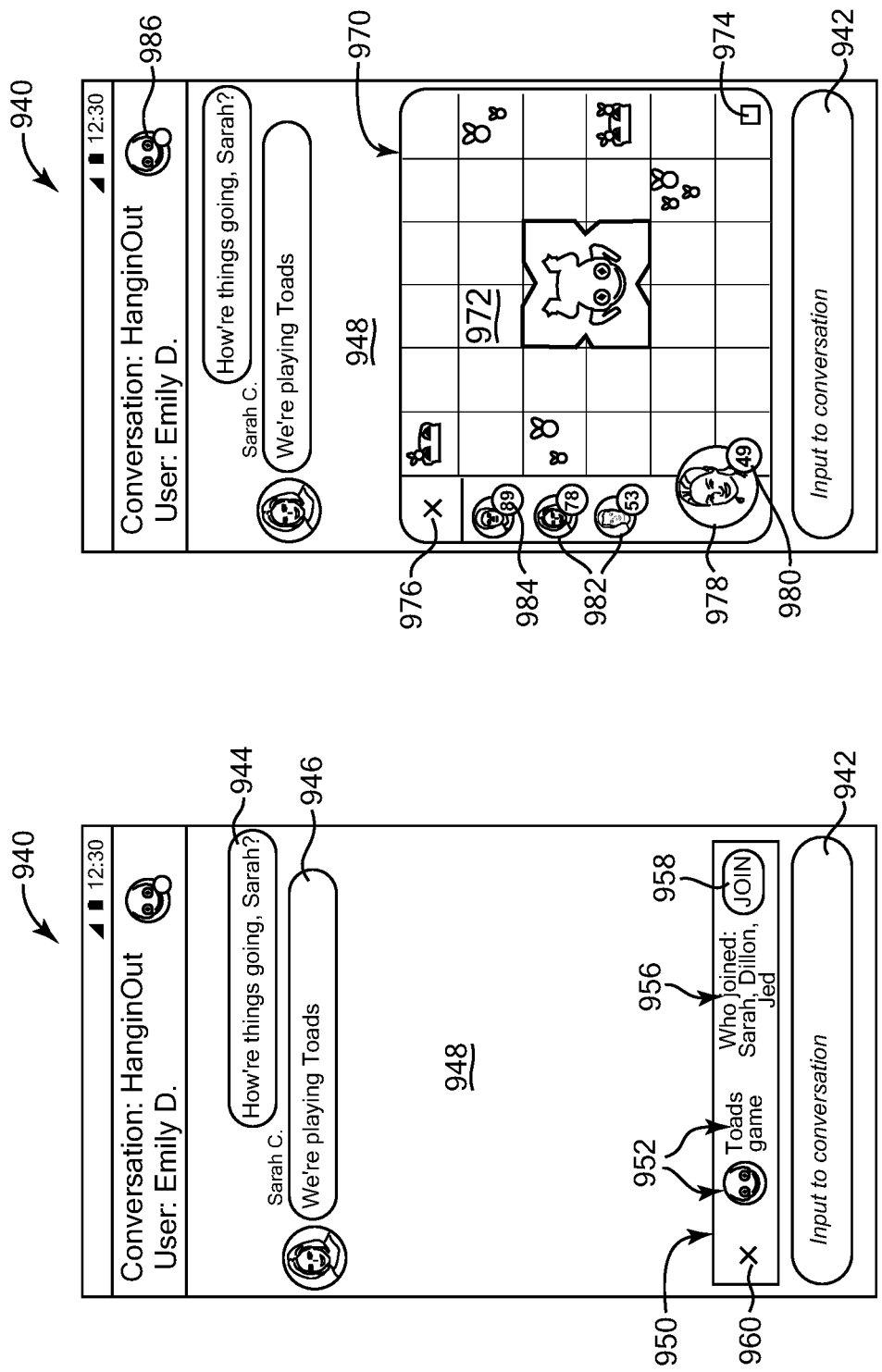

SUGGESTED ITEMS FOR USE WITH EMBEDDED APPLICATIONS IN CHAT CONVERSATIONS

CROSS REFERENCE TO RELATED APPLICATIONS

The present application is a continuation of U.S. patent application Ser. No. 15/624,638, filed Jun. 15, 2017 and entitled "Suggested Items for Use with Embedded Applications in Chat Conversations," which is incorporated herein by reference in its entirety.

U.S. patent application Ser. No. 15/624,637, filed Jun. 15, 2017, entitled, "Embedded Programs and Interfaces for Chat Conversations," is related to the present application, and is incorporated by reference herein in its entirety.

BACKGROUND

The popularity and convenience of digital mobile devices as well as the widespread of use of Internet communications have caused communications between user devices to become ubiquitous. For example, users commonly use their devices to send electronic messages to other users as text messages, chat messages, email, etc. In a chat conversation between user devices, for example, users post text, images, and other types of content data to a chat interface, and the posted data is displayed in the chat interfaces displayed on the other user devices participating in the chat conversation.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to embedded programs and interfaces for chat conversations. In some implementations, a computer-implemented method to provide suggested items includes causing a chat interface to be displayed by a first user device, where the chat interface is generated by a messaging application, and the chat interface is configured to display one or more messages in a chat conversation. The one or more messages are provided by a plurality of user devices participating in the chat conversation over a network. The method causes an embedded interface to be displayed associated with the chat interface, where the embedded interface is provided by a first embedded application that executes at least in part on the first user device in association with the messaging application. The method determines that a suggestion event has occurred in association based on based on received data that indicates that a particular event has occurred at one or more of the plurality of user devices that are participating in the chat conversation, where the one or more of the plurality of user devices are different than the first user device. The method obtains one or more suggested response items based on the suggestion event, and causes the one or more suggested response items to be displayed by the first user device.

Various implementations and examples of the method are described. For example, in some implementations, the particular event includes user input received by an associated chat interface of the one or more of the plurality of user devices, user input received by an associated embedded interface of the one or more of the plurality of user devices, and/or an embedded application event occurring in an associated embedded application executing on the one or more of the plurality of user devices. In some implementations, the received data that indicates that the particular event has occurred indicates at least one of: a type of content feature displayed in a media item being played by the one or more of the plurality of user devices, achievement of a predefined objective in a game of the one or more of the plurality of user devices, user input received by a receiving user device participating in the chat conversation, where the user input is provided in a different embedded interface displayed on the receiving user device, and initiation of the embedded application from a particular user device of the plurality of user devices. In some implementations, the particular event includes one or more messages input to the chat conversation by respective users of the one or more of the plurality of user devices, where the suggestion event is determined based on detecting at least one of one or more predefined topics, words, and phrases in the one or more messages.

In some implementations, obtaining one or more suggested response items based on the suggestion event includes determining at least one suggested response item of the one or more suggested response items based on at least one of: one or more predefined associations of the at least one suggested response item with the suggestion event; a model trained with particular suggestion events and responses input in response to the particular suggestion events; and one or more of a plurality of rules and objectives used in a game provided by the embedded application. In some implementations, the method further includes receiving user input indicative of user selection of a selected suggested response item from the one or more suggested response items; and outputting a selected message in the chat conversation, the selected message associated with the selected suggested response item.

In some examples, the one or more suggested response items can include one or more text messages that indicate user reactions to the suggestion event. The method can further include receiving user input indicative of selection of a selected suggested response item from the one or more suggested response items, and in response to the user input, providing a command to the first embedded application, where the command is associated with the selected suggested response item. In some examples, the command to the first embedded application includes at least one of: a first command to perform an action in a game implemented by the first embedded application, a second command to change a playback position in playback of media data by the first embedded application, and a third command to change a shared object provided by the first embedded application. In additional examples, the one or more suggested response items include one or more suggested commands to the first embedded application and one or more suggested messages to be output to the chat conversation in the chat interface, where the one or more suggested commands are visually distinguished from the one or more suggested messages when displayed in the chat interface. In some implementations, the one or more suggested response items are determined by at least one of the first embedded application, the messaging application, and a remote server in communication with the messaging application over the network.

In further examples, the first embedded application is a media player application causing displayed playback of video data in the embedded interface, wherein the embedded interface is configured to receive input from a user that controls the displayed playback of the video data, and wherein at least one of the one or more suggested response items includes one or more suggested playback commands operative to adjust the displayed playback of the video data. In further examples, the first embedded application is a game application causing display of game data in the embedded interface, wherein the embedded interface is configured to receive input from a user that changes one or more states of the game application, and wherein at least one of the one or more suggested response items includes one or more suggested commands operative to modify at least one state of the game application. In further examples, the first embedded application is a shared document application causing display of a shared document in the embedded interface, wherein the embedded interface is configured to receive input from a user that changes one or more items of the shared document, and wherein at least one of the one or more suggested response items includes one or more suggested commands operative to modify the shared document.

In some implementations, the embedded interface can be output on a subset of the plurality of user devices participating in the chat conversation, wherein the subset includes user devices that have received second user input in an associated chat interface that causes the user devices to join an embedded session initiated by the first embedded application. The first embedded application can display output data that is generated by the first embedded application, and/or received from a server in connection with the first user device over the network.

In some implementations, a system includes a memory and at least one processor configured to access the memory and configured to perform operations including causing a chat interface to be displayed by a first user device, where the chat interface is generated by a messaging application. The chat interface is configured to display one or more messages in a chat conversation, where the one or more messages are provided by a plurality of user devices participating in the chat conversation over a network. The operations include causing an embedded interface to be displayed associated with the chat interface, where the embedded interface is provided by a first embedded application executing in association with the messaging application, and the first embedded application executes at least in part on the first user device. The operations include determining that a suggestion event has occurred in association with use of the first embedded application based on at least one of: user input received by the embedded interface, and event information from the first embedded application indicating that the suggestion event has occurred in the first embedded application. The operations include obtaining one or more suggested response items responsive to the suggestion event, and causing to be displayed the one or more suggested response items by the first user device. The one or more suggested response items are each selectable by a first user of the first user device to cause the messaging application to provide an associated command to change one or more states of the first embedded application, and/or cause an associated message to be displayed in the chat conversation by the plurality of user devices participating in the chat conversation.

Various implementations and examples of the system are described. For example, in some implementations, the operation of determining that the suggestion event has occurred is based on determining that a second user device of the plurality of user devices has initiated a second embedded application corresponding to the first embedded application to join an embedded session provided for the first embedded application.

In some implementations, a non-transitory computer readable medium has stored thereon software instructions that, when executed by a processor, cause the processor to perform operations. The operations include determining that a suggestion event has occurred in association with use of at least one embedded application of a plurality of corresponding embedded applications executed at least in part on associated user devices, where each embedded application executes in association with a messaging application executing on the associated user device. Each messaging application is configured to cause an associated chat interface to be displayed by the associated user device, where the associated chat interface is configured to display one or more messages in a chat conversation, and the associated user devices are participating in the chat conversation over a network. The operations include obtaining one or more suggested response items responsive to the suggestion event, and causing to be displayed the one or more suggested response items by at least one associated user device of the associated user devices. The one or more suggested response items are each selectable by user input from a respective user of the at least one associated user device to provide an associated command to change one or more states of the plurality of corresponding embedded applications, and/or cause display of an associated message in the chat conversation by the associated user devices participating in the chat conversation. In some implementations, the one or more states are one or more second states, and the operation of determining that the suggestion event has occurred is based on at least one of: user input received by at least one of the corresponding embedded applications, and user input received by at least one of the messaging applications that changes one or more first states of the corresponding embedded applications.

BRIEF DESCRIPTION OF THE DRAWINGS

FIGS. 8A-8E are graphic representations of example user interfaces displayed by user devices, according to some implementations;

FIGS. 9A-9C are graphic representations of additional example user interfaces displayed by user devices, according to some implementations;

DETAILED DESCRIPTION

Figure 1:
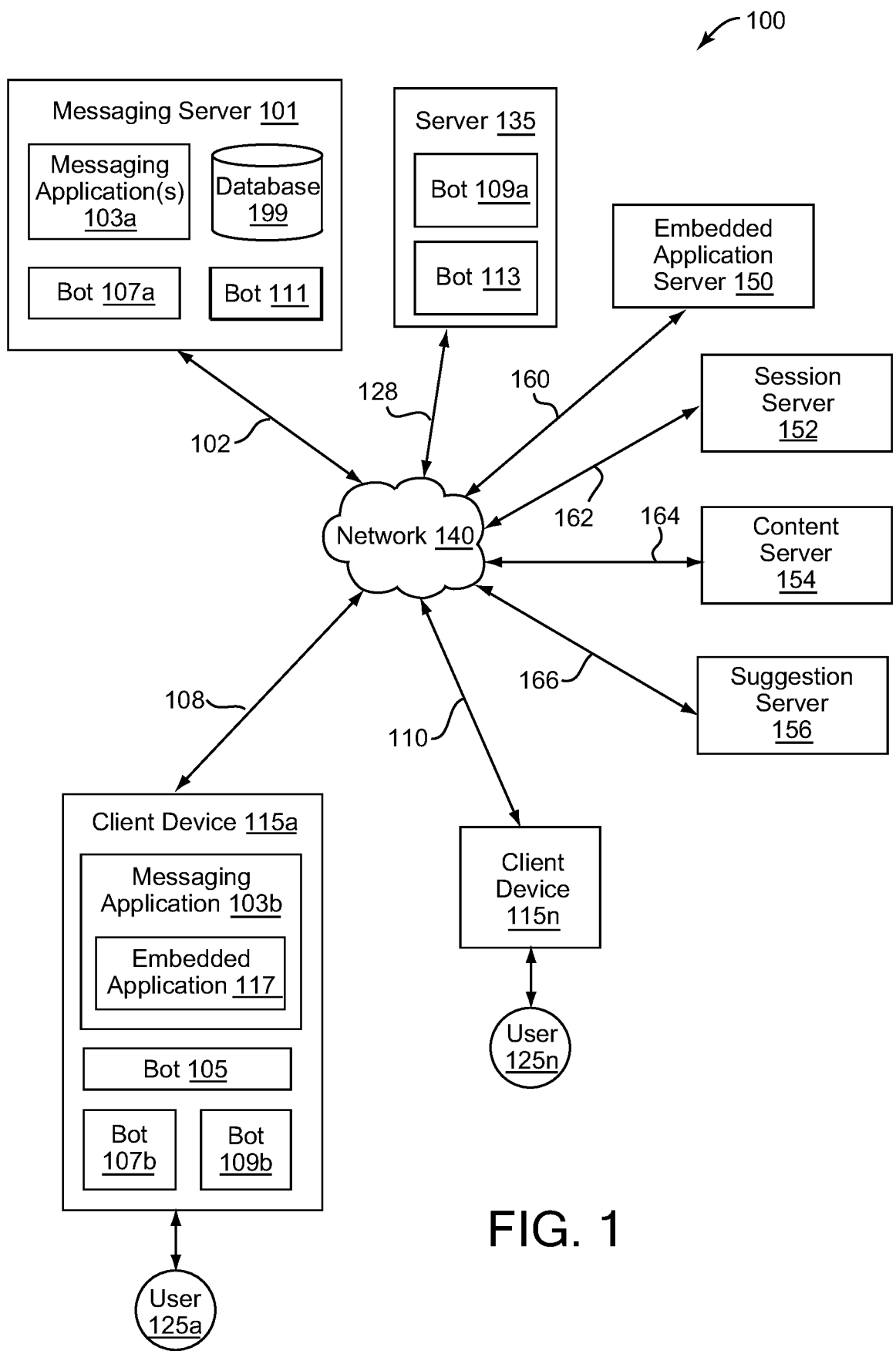
FIG. 1 is a block diagram of example systems and a network environment which may be used for one or more implementations described herein.

One or more implementations described herein relate to embedded programs and interfaces for chat conversations. In various implementations, a first embedded application can be initiated by user input in a first chat interface provided by a first messaging application and displayed on a first user device. The first chat interface is configured to receive user input from a first user and display messages received from one or more other user devices participating in a chat conversation over a network and associated with a respective chat user. The other user devices can connect to an embedded session that is associated with the embedded application, where users of the other devices are designated as member users.

For example, in some implementations, a notification can be provided on other chat devices in the chat conversation, indicating that the embedded session is active. Chat users of the other chat devices can provide input to their user devices (e.g., select a join control displayed in the chat interfaces of their devices) to cause their devices to join the embedded session and become member device. Chat identities of the chat users can be provided to the embedded application and use in the embedded application.

The first embedded application can cause an embedded interface to be displayed by the user device in association with the chat interface, e.g., as part of the chat interface, within or adjacent to the chat interface, etc. The embedded interface can receive user input from the associated user of the user device, e.g., via selection of displayed interface elements, a keyboard, other input device, etc., and the input is provided to the first embedded application. The first embedded application can also communicate with the first messaging application and the chat interface, e.g., receiving data from chat messages and output chat messages displayed in the chat interface and/or in the chat conversation. The first embedded application can communicate with the other member devices that have joined the embedded session, e.g., via the first messaging application, where the other devices can be associated with respective embedded applications and messaging applications. The first embedded application can communicate with the first messaging application and one or more servers that communicate with the first messaging application. Indications of events occurring in the embedded application or at other connected devices (e.g., server) can be displayed in the chat interface (e.g., in the chat conversation such that they are visible by chat users) and/or displayed in the embedded interface.

Embedded applications of various types can be used, e.g., embedded media player applications to play media items (videos, images, audio segments, etc.), embedded game applications to output game data, embedded applications to output content documents (e.g., item lists, spreadsheets, etc.), embedded applications to create and output reservations or travel itineraries, etc. In some implementations, embedded applications can be downloaded and executed on the first user device when initiation of the embedded application is selected in the chat interface. In some implementations, embedded applications can be standard, standalone applications that can be configured, or their output processed, to provide displayed output in an embedded manner, e.g., display output in an embedded interface in association with a chat interface of a messaging application.

Various other features are described. For example, in some implementations, suggested response items can be generated or obtained by the messaging application or embedded application and displayed in the chat interface or embedded interface. Some suggested response items, when selected by user input, can provide one or more suggested commands to the embedded application, messaging application, or first user device. Some suggested response items, when selected by user input, can provide one or more suggested messages to the chat interface, e.g., to the chat conversation. Suggested response items can be determined based on suggestion events occurring in the embedded application, messaging application, and/or other connected devices, thus providing relevant suggested input options for a user.

In various implementations, features can include member users being assigned respective user statuses (e.g., user roles) in the embedded session, e.g., a controlling user of media item playback, a player role or observer role in a game, etc. In some examples, an embedded application can receive user comments in the embedded interface during a first playback of a media item, and can display those user comments in the embedded interface during a later, second playback of that media item for chat users that participated in the chat conversation at the time of the first playback. Displayed output data of embedded applications can be synchronized among the member devices of a particular embedded session. For example, a playback position adjusted by user input on one member device causes the other member devices to adjust the playback positions in the associated embedded interfaces. Bots can be provided in the chat interface and can interface with embedded applications, e.g., initiate embedded applications to process content items selected by user input, etc.

One or more features described herein enable users to interact with embedded applications in the context of a chat conversation in which multiple user devices participate. Furthermore, multiple chat users can interact in an embedded application. Features allow chat users to share functions and output of applications in a chat conversation without the chat users having to exit from the chat interface to display an interface of a separate application. Thus, chat messages can be input and displayed in the chat interface concurrently with the display of output from an embedded application, allowing chat users to feel connected in concurrent use of the application. Such features allow group, shared, expressive experiences among chat users in an embedded session using embedded applications. In some examples, in an embedded session playing a media item such as video, features enable chat users to watch videos together and comment on the video in the chat conversation. If a first chat user is currently watching a video, a second chat user in that conversation has the option to watch the video with the first chat user, similarly to sitting on the couch watching television together in an analogous physical environment. In this shared experience, both users can control the playback, control a playlist of media items to watch, chat about features and events in the video, and/or post likes into the video feed.

Communication between an embedded application and a chat interface allows compelling and efficient integration of chat and application functions. For example, an embedded application can send events or notifications to a message application, and the message application can display the events or notifications in the chat conversation and chat interfaces of the chat users, thus being visible to chat users who are not currently participating in an embedded session. This can improve the engagement, retention, and awareness of users about the occurrence of and events within embedded sessions. Similarly, chat messages input to the chat interface and chat conversation can be input to an embedded application, allowing the embedded application to respond to commands and messages from the chat interface and chat conversation.

Use of such embedded applications in association with a chat interface allows chat users to interact with each other and an embedded application with reduced user input and reduced time to interact when using a chat interface and an application, thus reducing consumption of device resources that would otherwise be needed to process, display, and receive user input in applications that are separate from a messaging application. For example, disclosed features reduce consumption of device resources needed to enable and process communications between multiple users simultaneously using chat interfaces and application functions (e.g., reducing switching displays of different interfaces for different applications on a user device, reducing copying and pasting displayed data in one application to another application or interface, reducing the repeating of commands or data input to applications, etc.). Furthermore, embedded applications can be downloaded and installed on a user device seamlessly based on selections within a chat interface, reducing system resources needed to present additional download and installation interfaces. In addition, embedded applications can be of small data size, e.g., can use one or more functions of the associated messaging application such as communication and network functions, chat interface functions, etc., and so can omit such functions themselves. This allows specific application functions (e.g., playing media items, providing a game or shared list, etc.) to be implemented in a smaller application that consumes fewer bandwidth and storage resources than independently-executed applications that each include a complete set of functions. In some implementations, a standard API can be used between messaging application and embedded application, allowing a large variety of embedded applications to be provided by many different providers.

Consequently, a technical effect of one or more described implementations is that chat communication between user devices in device-implemented conversations is provided in conjunction with displayed and interactive features from applications with less computational time and resources expended to obtain results. For example, a technical effect of described techniques and features is a reduction in the consumption of system processing resources utilized to provide chat communication and application functions as compared to a system that does not provide one or more of the described techniques or features, e.g., a system that uses prior techniques of displaying application output in separate applications unassociated with chat interface communication in which additional computational resources are needed to run the separate application and cause a user to switch between application and chat conversations, provide additional input to applications, etc. In another example, a technical effect of described techniques and features is a reduction in the consumption of system processing resources utilized by a system that does not provide one or more of the described techniques or features, e.g., a system that uses only bots in chat interfaces to provide application functions and interface with chat users, since such bots may present output in a chat interface that is confusing to multiple chat users participating and providing messages in a chat conversation, leading to inefficient use of system resources (e.g., repeated viewing, scrolling, and input of commands from users to display previously-output messages and output provided by the bot, etc.). Thus, a technical effect of described techniques and features is a reduction in the consumption of system processing resources utilized to receive input from multiple users as compared to a system that does not provide one or more of the described techniques or features.

In some implementations, suggested response items may be automatically provided in response to suggestion events occurring in embedded applications, messaging applications, or other devices. The suggested response items are appropriate and relevant as commands or messages to the suggestion event. For example, suggested message items may cause appropriate messages to be displayed in the chat conversation as reactions to particular events occurring in an embedded application or other program (e.g., events based on user input from other users, or events in played content data), as if a user were creating the messages. Suggested command items may cause suggested relevant commands to be sent to the embedded application or other application/device in response to events in an embedded application or other program, e.g., a command to change media playback in response to a detection of features in the played media item, a command to perform a game action in response to an opponent's detected action in a game, etc. These suggested items provide users with more flexible options in determining their responses to events in applications and may provide options for a user who is otherwise unable to respond to an event in an application adequately. For example, at various times during a message conversation, users may not be able to provide sufficient attention and/or focus to respond to events with pertinent commands or messages, and/or may not be able to provide detailed user input to a user device to create such pertinent commands or messages. In some examples, a user may be performing an activity or be in an environment where appropriate responses are not possible or more difficult for the user to provide.

One or more features described herein advantageously provide automatic selectable suggested response items for a user in response to particular events in the embedded application or messaging application. The suggested response items are relevant to detected events on the device. Selection of such suggested items allows a user to simply and quickly respond to events with reduced user input and reduced time to compose the responses on a device, thus reducing consumption of device resources that would otherwise be needed to display a large set of possible responses and/or reducing consumption of device resources needed to enable and process added input from the user to compose responses, search through, edit, or complete responses, and/or otherwise participate in conversations held via electronic devices. Consequently, a technical effect of one or more described implementations is that creation and transmission of responses in device-implemented conversations is achieved with less computational time and resources expended to obtain results. For example, a technical effect of described techniques and features is a reduction in the consumption of system processing resources utilized to display, create, and send message responses and command responses as compared to a system that does not provide one or more of the described techniques or features, e.g., a system that uses prior techniques in which additional computational resources are needed to receive input from the user used to specify, select, edit, or create responses that a user is to transmit.

Described techniques provide additional advantages. In some examples, user statuses or roles can be automatically assigned efficiently based on information passed between messaging application and embedded application without receiving additional user input. In some examples, user commands and comments can be sent to a server, and server events can be received and presented by an embedded application on a user device, without the user having to access the server by exiting a chat interface and executing a separate application on the user device. Bots can be used in conjunction with embedded applications, e.g., to search for content items to be played by an embedded application and without the user expending system resources to perform manual searching, selection, and initiation of applications. In other examples, user comments can be stored that were previously input by users in association with content items previously played in an embedded application. Such stored comments can be displayed in association with the a later playback of the content items if the playback occurs in the same chat conversation (or group of chat users), thus saving chat users from re-entering comments during the later playback and reducing expenditure of system resources. Synchronization techniques allow playback of content items on user devices of an embedded session to be synchronized automatically and to be receptive to input from multiple users. Such techniques allow chat users to share an experience in a chat conversation without the users using additional system resources to execute separate applications or manually indicate playback positions to each other.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

An image as referred to herein is a digital image having pixels with one or more pixel values (e.g., color values, brightness values, etc.). An image can be a still image or single image, or can be an image included in a series of images, e.g., a frame in a video sequence of video frames, or an image in a different type of sequence or animation of images. A video includes a sequence of multiple images. For example, implementations described herein can be used with single images or static images (e.g., a photograph, an emoji, or other image), videos, or animated images (e.g., cinemagraphs or other animated image that includes motion, a sticker that includes animation and audio, etc). Text, as referred to herein, can include alphanumeric characters, emojis, symbols, or other characters.

FIG. 1 illustrates a block diagram of an example environment 100 for providing messaging services that enable embedded applications as described herein. In some implementations, automatic assistive agents, e.g., bots, can be provided. The exemplary environment 100 includes messaging server 101, one or more client devices 115a, 115n, server 135, embedded application server 150, session server 152, content server 154, suggestion server 156, and network 140. Users 125a-125n may be associated with respective client devices 115a, 115n. Server 135 may be a third-party server, e.g., controlled by a party different from the party that provides messaging services. In various implementations, server 135 may implement bot services, as described in further detail below. In some implementations, environment 100 may not include one or more servers or devices shown in FIG. 1 or may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to implementations of the element bearing that reference number.

In the illustrated implementation, messaging server 101, client devices 115, server 135, and servers 150-156 are communicatively coupled via a network 140. In various implementations, network 140 may be a conventional type, wired or wireless, and may have numerous different configurations including a star configuration, token ring configuration or other configurations. Furthermore, network 140 may include a local area network (LAN), a wide area network (WAN) (e.g., the Internet), and/or other interconnected data paths across which multiple devices may communicate. In some implementations, network 140 may be a peer-to-peer network between user devices and/or between other devices, e.g., using peer-to-peer data exchange techniques enabling offline communication (and usage of embedded applications as described below). Network communication can include use of appropriate communication protocols (e.g., websockets allowing communication of bi-directional, full duplex messages between devices such as a client (user) device and server). Network 140 may also be coupled to or include portions of a telecommunications network for sending data in a variety of different communication protocols. In some implementations, network 140 includes Bluetooth® communication networks, Wi-Fi®, or a cellular communications network for sending and receiving data including via short messaging service (SMS), multimedia messaging service (MMS), hypertext transfer protocol (HTTP), direct data connection, email, etc. In other examples, sound waves can be used in network 140 for data and state exchange between devices. Although FIG. 1 illustrates one network 140 coupled to client devices 115, messaging server 101, server 135, and servers 150-156, in practice one or more networks 140 may be coupled to these entities.

Messaging server 101 may include a processor, a memory, and network communication capabilities. In some implementations, messaging server 101 is a hardware server. In some implementation, messaging server 101 may be implanted in a virtualized environment, e.g., messaging server 101 may be a virtual machine that is executed on a hardware server that may include one or more other virtual machines. Messaging server 101 is communicatively coupled to the network 140 via signal line 102. Signal line 102 may be a wired connection, such as Ethernet, coaxial cable, fiber-optic cable, etc., or a wireless connection, such as Wi-Fi, Bluetooth, or other wireless technology. In some implementations, messaging server 101 sends and receives data to and from one or more of client devices 115a-115n, server 135, one or more of servers 150-156, and bot 113 via network 140. In some implementations, messaging server 101 may include messaging application 103a that provides client functionality to enable a user (e.g., any of users 125) to exchange messages with other users and/or with a bot. Messaging application 103a may be a server application, a server module of a client-server application, or a distributed application (e.g., with a corresponding client messaging application 103b on one or more client devices 115).

Messaging server 101 may also include database 199 which may store messages exchanged via messaging server 101, group data, e.g., indicating which users are in which messaging groups (e.g., chat conversations) and which content data (video data, images, audio data with group likes, game data, content documents, etc.) is associated with which messaging groups, data and/or configuration of one or more bots, information provided by content classifier 130, and user data associated with one or more users 125, all upon explicit permission from a respective user to store such data. In some embodiments, messaging server 101 may include one or more assistive agents, e.g., bots 107a and 111. In other embodiments, the assistive agents may be implemented on the client devices 115a-n and not on the messaging server 101.

In some implementations, messaging server 101, messaging application 103, and/or embedded applications running in association with a messaging application can provide messages in one messaging group (e.g., chat conversation), and/or can send messages to one or more other messaging groups (chat conversations) implemented by the messaging server 101 (or other messaging server).

Messaging application 103a may be code and routines operable by the processor to enable exchange of messages among users 125 and one or more bots 105, 107a, 107b, 109a, 109b, 111, and 113. In some implementations, messaging application 103a may be implemented using hardware including a field-programmable gate array (FPGA) or an application-specific integrated circuit (ASIC). In some implementations, messaging application 103a may be implemented using a combination of hardware and software.

In various implementations, when respective users associated with client devices 115 provide consent for storage of messages, database 199 may store messages exchanged between one or more client devices 115. In some implementations, when respective users associated with client devices 115 provide consent for storage of messages, database 199 may store messages exchanged between one or more client devices 115 and one or more bots implemented on a different device, e.g., another client device, messaging server 101, and server 135, etc. In the implementations where one or more users do not provide consent, messages received and sent by those users are not stored.

In some implementations, messages may be encrypted, e.g., such that only a sender and recipient of a message can view the encrypted messages. Some implementations can store encrypted data generated from users, e.g., user-generated content data such as messages, comments, recorded user actions, etc. The user-generated content data can be encrypted locally on the user device (e.g., in local execution of an embedded application) and on a server system (e.g., for information communicated for a shared embedded application and an embedded session). In some implementations, messages are stored. In some implementations, database 199 may further store data and/or configuration of one or more bots, e.g., bot 107a, bot 111, etc. In some implementations when a user 125 provides consent for storage of user data (such as social network data, contact information, images, etc.) database 199 may also store user data associated with the respective user 125 that provided such consent.

In some implementations, messaging server 101 and messaging application 103 can be implemented on one or more chat devices (e.g., user devices) participating in a chat conversation as described herein.

In some implementations, messaging application 103 a/103b may provide a user interface that enables a user 125 to create new bots. In these implementations, messaging application 103a/103b may include functionality that enables user-created bots to be included in chat conversations between users of messaging application 103a/103b.

Servers 150-156 may include one or more processors, memory and network communication capabilities. In some implementations, the servers are hardware servers. Signal lines 160, 162, 164, and 166 connect the servers 150, 152, 154, and 156 to the network 140, respectively, and may be wired connections, such as Ethernet, coaxial cable, fiber-optic cable, etc., or wireless connections, such as Wi-Fi, Bluetooth, or other wireless technology. In some implementations, servers 150-156 sends and receive data to and from one or more of the messaging server 101 and the client devices 115a-115n via the network 140. Although servers 150-156 are illustrated as being individual servers, one or more of the servers 150-156 can be combined and/or included in one or more other components of the environment 100, e.g., messaging server 101, client device 115a, server 135, etc. Any or all of servers 150-156 may be managed by the same party that manages the messaging server 101, or may be managed by a third-party. In some implementations, a server 101, 135, and 150-156 can be considered a remote server relative to a particular device when the server communicates over the network 140 with that particular device. Similarly, in some implementations, client devices 115 can be considered remote from a particular device if communicating over the network 140 with that particular device. In various implementations, functions of any of servers 101, 135, and 150-156 can be implemented on one or more client devices 115.

Embedded application server 150 is communicatively coupled to the network 140 via signal line 160 and serves embedded applications as described herein that are requested by a device for install on the device. For example, a user device can request to download an embedded application in as a background process of an operating system or messaging application, and the embedded application server 150 sends the data to the client device to execute the embedded application on the client device. In some implementations, the embedded application server 150 can execute embedded applications in whole or in part and can send output data from the embedded application to client devices for display by one or more client devices.

Session server 152 is communicatively coupled to the network 140 via signal line 162 and can be used in some implementations to handle and coordinate data sent to and from multiple client devices participating in an embedded session that connects multiple embedded applications (e.g., a shared embedded application) executing on client devices connected to the network 140. For example, session server 152 can be used to manage an embedded session, e.g., including one or more of synchronizing the states of embedded applications in an embedded session, determine and distribute events on a corresponding embedded application executing on the session server, etc. In some implementations, the session server can determine one or more events for the embedded session, one or more of which may occur at the session server or other server in communication with the session server. For example, an event may include a server receiving user selection, comments, or ratings associated with content items served by the server to user devices, and those content items may be played in an embedded session, such that the event can be conveyed to the embedded session. In some implementations, the session server 152 can be included in or be the same as messaging server 101 or other server of the environment 100.

Content server 154 is communicatively coupled to the network 140 via signal line 164 and can be used to send content data to one or more devices connected to the network 140. For example, the content data can be data provided for output by embedded applications that display embedded interfaces on client devices as described herein. The content data can include video data, image data, audio data, document data, webpage data, game data, bot data or information, map data or other geographic information, etc. The content data can be included in different content items (media items), e.g., videos or movies, images, games, documents, webpages, etc.

Suggestion server 156 is communicatively coupled to the network 140 via signal line 166 and can be used to determine and provide suggested response items in reply to messaging applications and/or embedded applications for display and selection by users at client devices. For example, a messaging application running at a client device 115 can send descriptive information to the suggestion server 156, and the suggestion server 156 can consult databases, knowledge graph, and/or other data resources to determine one or more suggested response items (also referred to as "suggested items," "suggested input items," or "suggested input items" herein) in response to the descriptive information. Such suggested items can be suggested commands and suggested messages as described with reference to FIG. 7. In some implementations, the functions of suggestion server 156 can be included within a messaging application and/or an embedded application.

In some implementations, the suggestion server 156 and/or other components of the environment 100 can use machine learning, e.g., use a machine learning model that utilizes machine learning to determine suggested items. For example, in a training stage the suggestion server (or other component) can be trained using training data (e.g., message training data) of actual or generated messages in a messaging application context, and then at an inference stage can determine suggested items to new messages or other data it receives. For example, the machine learning model can be trained using synthetic data, e.g., data that is automatically generated by a computer, with no use of user information. In some implementations, the machine learning model can be trained based on sample data, e.g., sample message data, for which permissions to utilize user data for training have been obtained expressly from users providing the message data. For example, sample data may include received messages and responses that were sent to the received messages. Based on the sample data, the model can predict message responses to received messages, which may then be provided as suggested items. In some implementations, the suggestion server 156 (or other component) can use one or more of a deep learning model, a logistic regression model, a Long Short Term Memory (LSTM) network, supervised or unsupervised model, etc. Some implementations can also detect image features in images or videos and determine suggested items (e.g., message responses) based on the image features. For example, image features can include people (without determining identity of the people), animals, objects (e.g., articles, vehicles, etc.), particular monuments, landscape features (e.g., foliage, mountains, lakes, sky, clouds, sunrise or sunset, buildings, bridges, etc.), weather, etc. Various image recognition and detection techniques can be used (e.g., machine learning based on training images, comparison to reference features in reference images, etc.) to detect image features.

In some implementations, one or more of the servers 150-156 host bots. The bots may be computer programs that perform specific functions to provide suggestions, for example, a reservation bot makes reservations, an auto-reply bot generates reply message text, a scheduling bot automatically schedules calendar appointments, etc. A server 150-156 may provide or refer one or more bots as its output to a messaging application 103. For example, the code for the bot may be incorporated into the messaging application 103, or the messaging application 103 may send requests to a bot implemented at a server 150-156. In some implementations, the messaging application 103 acts as an intermediary between the user 125 and a server 150-156 by providing the server 150-156 with bot commands and receiving output (e.g., embedded application data, session data, content data, suggested items, etc.) based on the bot commands.

In some implementations, one or more of the servers 150-156 (e.g., content server 154 and/or suggestion server 156) may maintain an electronic encyclopedia, a knowledge graph, one or more databases, a social network application (e.g., a social graph, a social network for friends, a social network for business, etc.), a website for a place or location (e.g., a restaurant, a car dealership, etc.), a mapping application (e.g., a website that provides directions), etc. For example, content server 154 may receive a request for information from a messaging application 103, perform a search, and provide the information in the request. In some implementations, content server 154 may include classifiers of particular types of content in images, and can determine whether any of particular classes are detected in the content (e.g., pixels) of the image. In some examples, the messaging application 103 may request driving directions or an estimated time of arrival from a mapping application accessed by content server 154.

In some implementations, if a user consents to the use of such data, one or more servers 150-156 (e.g., content server 154) may provide a messaging application 103 with profile information or profile images of a user that the messaging application 103 may use to identify a person in an image with a corresponding social network profile. In another example, content server 154 may provide the messaging application 103 with information related to entities identified in the messages used by the messaging application 10, if user consent has been obtained for provided user data. For example, the content server 154 may include or access an electronic encyclopedia that provides information about landmarks identified in the images, an electronic shopping website that provides information for purchasing entities identified in the messages, an electronic calendar application that provides, subject to user consent, an itinerary from a user identified in a message, a mapping application that provides information about nearby locations where an entity in the message can be visited, a web site for a restaurant where a dish mentioned in a message was served, etc. In some implementations, the content server 154 may communicate with the suggestion server 156 to obtain information. The content server 154 may provide requested information to the suggestion server 156.

In some implementations, one or more servers 150-156 may receive information from one or more messaging applications 103, e.g., to update databases used or maintained by these modules. For example, where the content server 154 maintains a web site about a restaurant, the messaging application 103 may provide the content server 154 with updated information about the restaurant, such as a user's favorite dish at the restaurant.

Server 135 may include a processor, a memory and network communication capabilities. In some implementations, server 135 is a hardware server. Server 135 is communicatively coupled to the network 140 via signal line 128. Signal line 128 may be a wired connection, such as Ethernet, coaxial cable, fiber-optic cable, etc., or a wireless connection, such as Wi-Fi, Bluetooth, or other wireless technology. In some implementations, server 135 sends and receives data to and from one or more of messaging server 101 and client devices 115 via network 140. Although server 135 is illustrated as being one server, various implementations may include one or more servers 135. Server 135 may implement one or more bots as server applications or server modules, e.g., bot 109*a* and bot 113.

In various implementations, server 135 may be part of the same entity that manages messaging server 101, e.g., a provider of messaging services. In some implementations, server 135 may be a third party server, e.g., controlled by an entity different than the entity that provides messaging application 103*a*/103*b*.

In some implementations, server 135 provides or hosts bots. A bot is an automated service, implemented on one or more computers, that users interact with primarily through text, e.g., via messaging application 103*a*/103*b*. Bots are described in greater detail below.

Client device 115 may be a computing device that includes a memory and a hardware processor, for example, a camera, a laptop computer, a tablet computer, a mobile telephone, a wearable device, a mobile email device, a portable game player, a portable music player, a reader device, head mounted display or other electronic device capable of wirelessly accessing network 140.

In the illustrated implementation, client device 115*a* is coupled to the network 140 via signal line 108 and client device 115*n* is coupled to the network 140 via signal line 110. Signal lines 108 and 110 may be wired connections, e.g., Ethernet, or wireless connections, such as Wi-Fi, Bluetooth, or other wireless technology. Client devices 115*a*, 115*n* are accessed by users 125*a*, 125*n*, respectively. The client devices 115*a*, 115*n* in FIG. 1 are used by way of example. While FIG. 1 illustrates two client devices, 115*a* and 115*n*, the disclosure applies to a system architecture having one or more client devices 115.

In some implementations, client device 115 may be a wearable device worn by a user 125. For example, client device 115 may be included as part of a clip (e.g., a wristband), part of jewelry, or part of a pair of glasses. In another example, client device 115 can be a smartwatch. In various implementations, user 125 may view messages from the messaging application 103*a*/103*b* on a display of the device, may access the messages via a speaker or other output device of the device, etc. For example, user 125 may view the messages on a display of a smartwatch or a smart wristband. In another example, user 125 may access the messages via headphones (not shown) coupled to or part of client device 115, a speaker of client device 115, a haptic feedback element of client device 115, etc.

In some implementations, messaging application 103*b* is stored on a client device 115*a*. In some implementations, messaging application 103*b* (e.g., a thin-client application, a client module, etc.) may be a client application stored on client device 115*a* with a corresponding a messaging application 103*a* (e.g., a server application, a server module, etc.) that is stored on messaging server 101. For example, messaging application 103*b* may transmit messages created by user 125*a* on client device 115*a* to messaging application 103*a* stored on messaging server 101.

In some implementations, messaging application 103*a* may be a standalone application stored on messaging server 101. A user 125*a* may access the messaging application 103*a* via a web page using a browser or other software on client device 115*a*. In some implementations, messaging application 103*b* that is implemented on the client device 115*a* may include the same or similar modules as that are included on messaging server 101. In some implementations, messaging application 103*b* may be implemented as a standalone client application, e.g., in a peer-to-peer or other configuration where one or more client devices 115 include functionality to enable exchange of messages with other client devices 115. In these implementations, messaging server 101 may include limited or no messaging functionality (e.g., client authentication, backup, etc.). In some implementations, messaging server 101 may implement one or more bots, e.g., bot 107*a* and bot 111.

In various implementations, messaging application 103 may include one or more embedded applications 117 that are executed in association with and dependent on the messaging application 103. An embedded application 117 can interact with a chat interface of the messaging application and provide one or more of its own embedded interfaces. Examples of various features of embedded applications are described herein.

In some implementations, messaging application 103*a*/103*b* may provide one or more suggested items, e.g., suggested commands, messages, or responses, to users 125 via a user interface, e.g., as a button, or other user interface element. Suggested items may enable users to respond quickly to messages when the user selects a suggested item, e.g., by selecting a corresponding user interface element on a touchscreen or via other input device. Suggested items may enable faster interaction, e.g., by reducing or eliminating the need for a user to type a response. Suggested items may enable users to respond to a message or provide a command quickly and easily, e.g., when a client device lacks text input functionality (e.g., a smartwatch that does not include a keyboard or microphone). In some implementations, suggested responses may be generated using predictive models, e.g., machine learning models, that are trained to generate responses. Suggested items are described in greater detail below with respect to FIG. 7.

Figure 2:
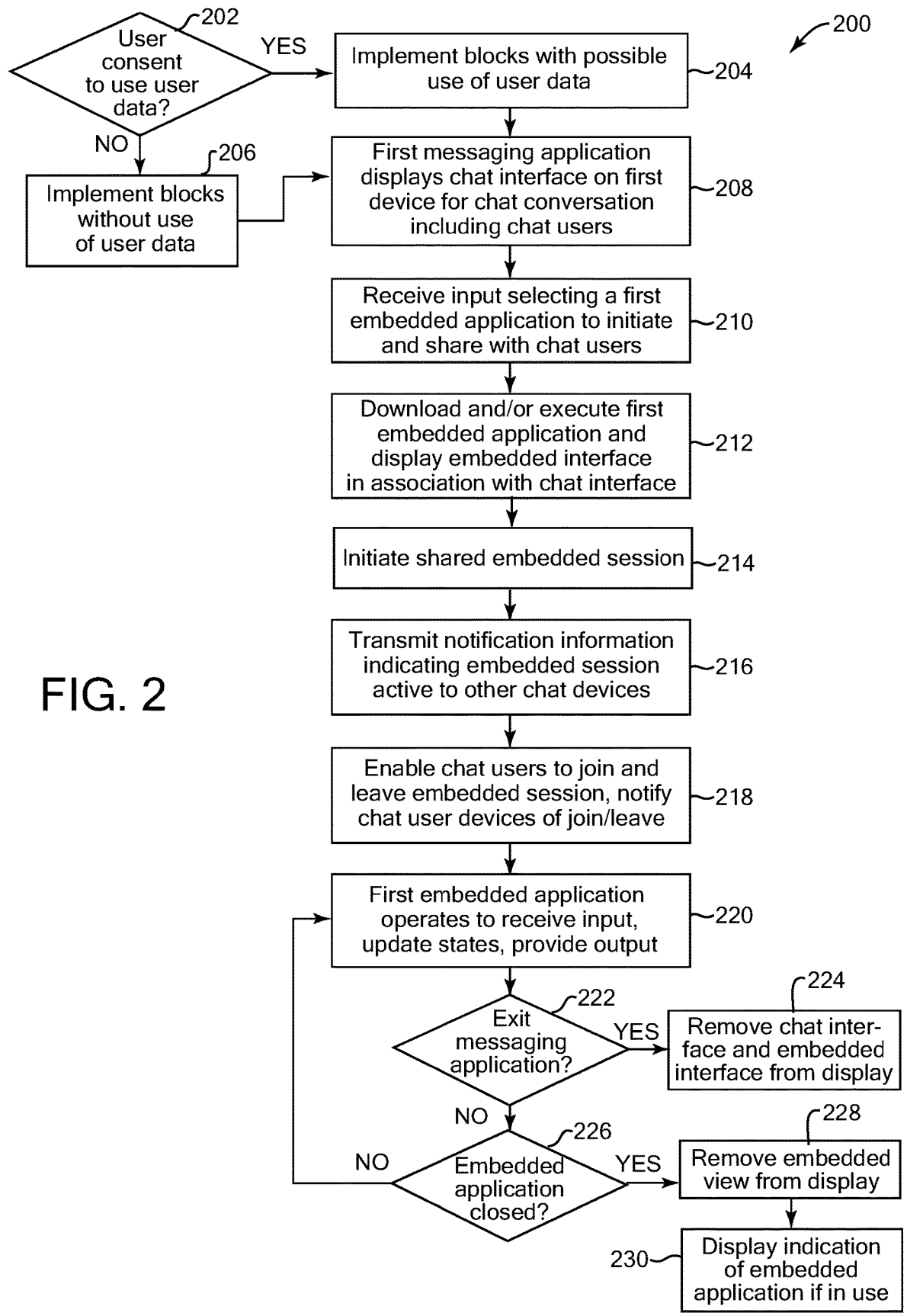
FIG. 2 is a flow diagram illustrating an example method to provide a program embedded in a chat conversation, according to some implementations.

FIG. 2 is a flow diagram illustrating an example method 200 to provide a program embedded in a chat conversations, according to some implementations. In some implementations, method 200 can be implemented, for example, on a server system, e.g., messaging server 101, as shown in FIG. 1. In some implementations, some or all of the method 200 can be implemented on a system such as one or more client devices 115 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 200.

In block 202, it is checked whether user consent (e.g., user permission) has been obtained to use user data in the implementation of method 200. For example, user data can include messages sent or received by a user, e.g., using messaging application 103, user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, videos viewed or shared by a user, etc. One or more blocks of the methods described herein may use such user data in some implementations.

If user consent has been obtained from the relevant users for which user data may be used in the method 200, then in block 204, it is determined that the blocks of the methods herein can be implemented with possible use of user data as described for those blocks, and the method continues to block 208. If user consent has not been obtained, it is determined in block 206 that blocks are to be implemented without use of user data, and the method continues to block 208. In some implementations, if user consent has not been obtained, blocks are to be implemented without use of user data and with synthetic data and/or generic or publicly-accessible and publicly-usable data.

Implementations described herein may provide embedded application programs that are executed in association with messaging applications providing chat conversations in chat interfaces. The messaging application may be a messaging application 103 as described above, and may execute wholly or in part on a user device (e.g., client device or other device), or may execute wholly or in part on a server (e.g., messaging server 101) and provide data to the user device to display at the user device.

In some examples, messaging application 103 may be an instant messaging application, a social network application, an email application, a multimedia messaging application, and the like. For example, if the messaging application is an instant messaging application, messages may be received as part of an instant messaging communication between a particular user 125a and one or more other users 125 of participating devices, e.g., in a messaging session (e.g., chat, group, or "chat conversation") having two or more participants, etc. A chat, or chat conversation, is a messaging session in which multiple participating users communicate messages (e.g., including various types of content data) with each other. In some implementations, users may send messages to other users by inputting messages into a chat conversation implemented by a messaging application. In some implementations, users may send messages to particular other users by messaging a phone number (e.g., when the messaging application 103 works over SMS, or another messaging application that utilizes phone numbers) or selecting a recipient user from a contacts list (e.g., when the messaging application 103 works over rich communications services (RCS) or another chat interface). In some implementations, messaging application 103 may provide real-time communication between participating devices, e.g., audio (voice) calls and/or video calls, where real-time audio data and/or video data is captured at one or more participating devices (e.g., using a camera and microphone), and this data is sent to and output in chat interfaces (and speakers) of the other devices participating in a chat conversation (e.g., conference call).

The messaging application 103 may display a chat interface that displays messages of the chat conversation, e.g., messages sent by the user of the user device, and messages received by the user device from other devices. As referred to herein, a chat interface has a user interface component that is displayed (e.g., including displayed interface elements), as well as having a data reception and exchange component that performs receiving of user input, sending and receiving messages, displaying of messages, etc.

In implementations described herein, one or more embedded applications can be executed in association with a messaging application. An embedded application herein refers to a messaging-embedded or chat-embedded program, e.g., a program that is executed in association with, or within a context of, a running messaging application and is dependent on the execution of the messaging application. For example, an embedded application is code (e.g., a script) able to be executed on a device if a messaging application is currently providing output (e.g., a chat interface) on the device, and the embedded application is exited (e.g., no longer executing on the device) if the messaging application is exited and no longer provides output on the device. For example, in some implementations, an embedded application can receive input provided to or in an embedded interface, e.g., selections of user interface elements, text, or other displayed objects in the embedded interface, gestures of an input device (such as taps, tracings of shapes, curves, or lines, etc. on a touch-sensitive input surface of a touchscreen, touchpad, etc.), and/or other user input received by the embedded interface via touchscreen or other input device. As referred to herein, an embedded interface includes a displayed component, which can include a user interface component (e.g., displayed user interface elements) as well as displayed output data including content data, e.g., media item content data, game data, document data, user comments, messages, etc. The embedded interface also includes a data reception component that performs receiving of user input at the user device, e.g., via a touchscreen, keyboard, or other input device by a user. In some implementations, the embedded interface is displayed in association with the chat interface. For example, the embedded interface can be displayed as part of the chat interface, e.g., within the borders or display area of the chat interface, partially overlapping the chat interface, or adjacent to the chat interface. In some implementations, at least a portion of the chat interface is visible and the embedded interface is visible on the display.

In some implementations, the embedded application can receive input provided in the associated chat interface for the associated chat conversation, e.g., as text commands or selection of chat interface elements. In some implementations, an embedded application provides output in the embedded interface, and/or can provide output in the chat interface, e.g., provides output as text to a chat conversation displayed in the chat interface or provides other chat interface output. For example, output of the embedded application to the embedded interface can be referred to as embedded output data, and can include data generated by the embedded application and/or data that the embedded application has received from one or more other sources via the associated messaging application (e.g., sources including a different application program executing on the first device, one or more servers connected over the network, one or more chat devices in a chat conversation of the associated messaging application, etc.). Data sent from the embedded application to other application programs and/or other devices can be provided from the embedded application to the messaging application, which then conveys the data (or a processed form of the data) to other programs or devices. Similarly, data received at a user device from other programs or devices, to be provided to an embedded application executing for that user device, can be received by the messaging application and provided from the messaging application to the embedded application.

Some examples of embedded applications are described throughout the description. In some example implementations, an embedded application can be code executed within a sandboxed display procedure to display application data and an embedded interface, e.g., within display area of a chat interface or in other visual association with a chat interface. For example, in some implementations, an embedded application can implement a web interface view to provide an embedded interface within the chat interface, where the view can display data from a web page and/or implement code that executes in connection with web pages (Javascript, CSS, HTML, etc.). In some implementations, embedded applications can be supplied by a third party, e.g., a different party than the party that supplies the associated messaging application and/or other components communicating with the embedded application. In some implementations, buffering (e.g., double buffering techniques) can be provided when transitioning from the display of one embedded application to a different embedded application. For example, embedded application code and/or output data for a second embedded application that is not being displayed can be downloaded, installed, and/or loaded into memory for display in the background of an operating system of a device while a first embedded (or other) application and embedded interface are displayed and used in the foreground. The first, displayed embedded interface can be swapped with the second embedded interface via displayed animations and user interface transitions. In some examples, when an embedded application is being downloaded, a loading indicator can be displayed while the code is being downloaded and/or installed on the user device in the background.

In some examples, the embedded application can communicate and interface with a framework implemented by the messaging application using an application program interface (API) that provides a set of predefined protocols and other tools to enable the communication. For example, the API can be used to communicate particular data from devices participating in an embedded session (e.g., member devices), where the data connects and synchronizes the embedded application programs (e.g., shared embedded application) of the embedded devices. In some implementations, the messaging application framework can provide a set of APIs to provide embedded-application developers capabilities to enable interactions between a chat conversation, a device, an embedded session, and the embedded application.

In some example implementations, if a member user exits an embedded application, that embedded application can be kept executing in the background of the member device of that member user, e.g., the background of the messaging application or operating system of the member device, for a period of time (e.g., 20 seconds, 1 minute, etc.). For example, this can be performed in case the user switches back to using the embedded application soon after interacting with the chat interface. In some examples, the user can open an embedded game application, input a move to the game, close the embedded game application and embedded interface (so that they execute in the background), send or attach a file into the chat conversation in response to another user's request, and immediately re-open the embedded game application and embedded interface to switch them to the foreground. The background-running embedded application can be terminated if the chat conversation is ended, e.g., if the user closes the messaging application or, in some implementations, switches to a different chat conversation. Similarly, if the messaging application is closed or exited by the user, the messaging application can be sent to the background of the user device for a particular time period, and the active embedded application can be paused during this time. The user can switch to using another application, and then resume use of the embedded application when the messaging application is selected to execute in the foreground. Thus, embedded applications can be tied to the lifecycle of the chat conversation.

In various implementations, one or more of the users may be bots. For example, a chat user or member user as referred to herein can be a bot in some implementations. In such a case, the "user device" associated with the "chat user" (bot) can be a server device that provides the bot. In some examples, the bot can be an assistant bot, a shopping bot, a search bot, etc. In some implementations, bots may be automated agents that are implemented in software and/or hardware. In some implementations, bots may represent or be associated with cameras (e.g., security cameras, web cameras, surveillance cameras, etc.), appliances (e.g., a smart refrigerator, an alarm device, an industrial appliance, etc.), imaging devices (e.g., microscopes, medical imaging devices, etc.) and send one or more images via messaging application 103. In the implementations that include one or more of the users that are bots, consent is obtained from an owner or operator of the bot to use messages generated by the bot. In some implementations, consent may be specified as a configuration parameter of the bot, camera, appliance, etc. and be provided to the messaging application 103 upon the bot interacting with the messaging application 103.

In block 208, a first messaging application is caused to display a first chat interface on a first user device. The chat interface is a user interface configured to receive information and output information related to one or more chat conversations in which the first device can participate. For example, the chat interface can be displayed on a display device of the first device, e.g., a display screen, in response to user input from a first user using or otherwise associated with the first device or other input. In some implementations, the first messaging application executes on the first device, while in other implementations, the first messaging application can execute partially or wholly on a different device connected to the first device via a network (e.g., a messaging server) and can send data to the first device to be displayed by the first device.

The first user and first device can join one or more chat conversations using the chat interface. For example, user input from a user of the first device can initiate a new chat conversation with one or more other users using user devices, and/or join an existing chat conversation with one or more other users and devices communicating over a network. Each chat conversation includes a group of chat users (and their associated user devices) who are participating in that particular chat conversation. In some implementations, a user can be concurrently participating in multiple different chat conversations. In some implementations, each chat user is associated with a respective chat identity in a chat conversation. A chat identity can refer to a visual representation of the user in the chat interface (e.g., depiction of a user's head, username, user image, etc.). The chat identity includes text, image, or multimedia data effective to depict the chat user (e.g., a user photo, a user icon, a username, an animation depicting the chat user, etc.) A chat identity can also or alternatively refer to a user identifier (e.g., identification (ID) data, ID number, etc.). The chat identity includes a unique identifier for the chat user in the context of the messaging application. For example, the unique identifier may be the username. In another example, the unique identifier may be an identifier for a database of chat users (e.g., a primary key for a database table that stores user identities). In providing a chat identity to an embedded application, the database identifier or username may be provided.

In some implementations, a chat conversation can be considered a chat group of users, and may have an ongoing existence whether or not its users are currently participating in the chat conversation or are currently logged in or using a user device. For example, if all the chat users exit the chat conversation, a conversation identifier (ID), and the chat identities and user identities of the chat conversation can be stored by the messaging application, and the chat conversation can be resumed when one or more of the chat users log in or resume the conversation using the chat interface. Some implementations of the messaging application can assign and store a conversation ID that identifies a particular chat conversation, and store identities of the associated current chat users (and/or chat devices) in association with the conversation ID. In some implementations, new users can be added to a chat conversation, and one or more users can be removed from a chat conversation.

The chat interface can display information of each chat conversation in which the first user is participating, including messages received by the first device from other chat devices and chat users participating in the chat conversation, as well as information related to statuses of chat users, options for message functions, events occurring in the chat conversation, etc. The chat interface can include interface features allowing a user of or associated with the first device (e.g., a first user) to provide user input, including interface elements to enable such features. For example, a user can compose messages on the first device and input the messages to a chat conversation. In some examples, a user can provide user input to the chat interface via touchscreen, physical buttons or keyboard, voice input, or other types of input.

In block 210, input is received by the first device that selects a first embedded application to initiate (e.g., to open or execute the embedded application on the first device) and to be shared with chat users. The input can be user input received from the first user locally at the first device. In some examples, a menu or other set of options listing available embedded applications can be displayed (or otherwise presented or output) by the first device, and user input can select the first embedded application from the options. The first embedded application is associated with a particular chat conversion that is currently active in the message application. For example, in some implementations, one or more options to select and open the first embedded application can be displayed or otherwise enabled in the chat interface displaying a particular chat conversation, and selection of such an option causes the first embedded application to run in association with that chat conversation. In some additional examples, the user input can include one or more text commands input in the chat interface as if part of a composed message, where the text commands are received as a command to select the first embedded application to initiate. In some examples, text preceded by a particular syntax character(s) or other predefined format can indicate such a command.

In some implementations, the input that selected the first embedded application to open can also specify that the first embedded application is to be shared with one or more other chat users and user devices participating in an associated chat conversation. This sharing selection allows an embedded session to be created (see block 214 below) between the first device and one or more other devices executing local versions of the embedded application and participating in the chat conversation. In some implementations, the first embedded application can be alternately selected to open without sharing with other chat users, which would cause the first embedded application to be executed without initiating an embedded session and without other devices receiving data related to the first embedded application. In some implementations, a selection to initiate an embedded application causes a shared embedded session to be initiated automatically (or based on stored user preference data). In some implementations, an embedded application does not output display (e.g., in an embedded interface as in block 212 below) until at least one other chat user has joined the embedded session associated with the first embedded application.

In block 212, the first embedded application is downloaded over the network and/or executed on the first device and an embedded interface is displayed in association with the chat interface. For example, the first embedded application can be downloaded in response to the selection received in block 210. In some implementations, the first embedded application can be downloaded from a server system hosting embedded applications, e.g., embedded application server 150. In some implementations, the download of the first embedded application can occur in the background of the operating environment of the first device, e.g., as a background process of the messaging application and/or operating system of the first device. This allows programs and features (such as the chat interface of the messaging application) to execute, provide output on the first device, and/or be used by the first user during the download. After (and/or during) the first embedded application is downloaded, it can be executed by the first device. In some implementations, after the first embedded application has been downloaded, it can remain stored in local non-volatile memory of the first user device, such that upon subsequent initiations of the first embedded application, it is available from the local memory and is not downloaded (e.g., unless updates are available for the first embedded application). In some implementations, or more parts or components of the first embedded application can be executed by one or more other devices in communication with the first device, e.g., one or more server systems. The embedded application code may be provided (e.g., transmitted) specifically to those devices of users that have provided consent for the system to access user data. In some implementations, because the embedded application is downloaded when initiated, regional and/or time-sensitive embedded applications can be provided from the embedded application server in a particular download, e.g., specialized for current holidays or calendar events, geographical regions, etc. Access to specialized embedded applications can be restricted based on the particular geographical region, language, and/or other characteristics or restrictions of the user device and user that is receiving the download.

In some implementations, the first embedded application causes an embedded interface to be displayed by the first device. The embedded interface is a user interface to the embedded application allowing user input to be received in the embedded interface to be provided to the first embedded application, and allowing output from the first embedded application to be displayed by the first device. In some implementations, information from the first embedded application that is to be output to other devices over the network can be provided from the embedded application to the messaging application, and the messaging application can send the information from the first device over the network to other devices.

In some examples, the embedded interface can be displayed in association with the chat interface on a display device of the first device such that at least a portion of the chat interface is visible, e.g., one or more chat messages (such as newly input chat messages) in the chat interface remain visible during display of the embedded interface. For example, the embedded interface can be displayed as part of the chat interface, e.g., within a display area or borders of the chat interface, partially overlapping the chat interface, or adjacent to the chat interface in some implementations. For example, the embedded interface can include an embedded view displayed within the chat interface. In some examples, the embedded view can be a portion of the chat interface that is dedicated to displaying output data of running embedded application(s) such as the first embedded application and/or dedicated to receiving input to running embedded application(s) such as the first embedded application. In some examples, the embedded view can be a rectangular or other shaped window or other portion of the display screen.

In various implementations, an embedded interface can be displayed based on an orientation of the user device, e.g., where a rotation of the user device to landscape mode causes the embedded interface to expand to a fullscreen display, e.g., to allow a more immersive game experience, more screen space for an editing task, etc. In some implementations, if an embedded interface is in a fullscreen mode providing a fullscreen display (and not in a partial-screen mode), chat messages input in the chat conversation by chat users can be displayed within the fullscreen embedded interface, e.g., as notifications (if the first user has selected to display such chat messages in this way). In some implementations, suggested responses (described with respect to FIG. 7) can also be displayed within the fullscreen embedded interface.

In some implementations, a size and/or shape of the embedded interface can be based on a type of the first user device, and/or a type of information displayed by the first embedded application in the embedded interface. In some examples, if the first user device is a type that is a mobile device or other device having a small display area (e.g., display screen), the embedded interface can be sized to occupy a particular percentage of the display area and allow at least one chat message to be displayed in the chat interface. For a type of device having a larger display area (e.g., desktop computer, larger tablet device, etc.), the embedded interface can be displayed to occupy a smaller percentage of the display area, allowing a larger area for chat messages. In some implementations, in response to user input selecting a displayed control, the embedded interface can be maximized to occupy the entire display area. In additional examples, if the embedded application is a media player application that displays a particular type of content data such as movie data and image data (or a game application displaying a particular type of game, e.g., with graphical environments), the embedded interface can be sized larger to view the content data, while if the embedded application displays a type of content data such as lists of text items or outputs audio from audio data, the embedded interface can be sized smaller. In some implementations, the embedded interface can be displayed as a three-dimensional (3D) display by a display screen, virtual reality display device, etc., or can be displayed in augmented reality display device, etc.

In some implementations, setup parameters can be input to the embedded application by the first user prior to initiating the embedded session and prior to sharing the embedded application with other chat users. For example, the first user can create a new game instance of an embedded game application and set up parameters of the game, select a player name, game board size, player color, the number of players allowed to join that particular session, etc. In further examples, the user can search a media item menu for a video to play, select a travel destination, flight, hotel, etc. online using the embedded application before sharing the selected options, pre-select shopping items (clothes, furniture) before asking for opinion/votes by other member users, etc.

In block 214, a shared embedded session is initiated. The embedded session is a designated event dedicated to shared use of a shared embedded application by a group of particular chat devices that are participating in the embedded session and in a chat conversation over the network, e.g., a shared communication of information between the particular chat devices and the shared embedded application. In some implementations, each chat device of the embedded session executes, at least in part, an instance of the shared embedded application (e.g., a corresponding embedded application). The group of associated chat devices, and a group of the chat users that use the associated chat devices, share user interactions with and output of the shared embedded application. For example, one or more states of the corresponding embedded applications executing on the user devices of the group of chat users are synchronized. In some implementations, the embedded session includes only one or more chat devices from the chat conversation with which the first embedded application is associated, e.g., the chat conversation in which the first embedded application was opened in block 210. Chat users that have joined an embedded session are "member users" and their chat devices are "member devices," which are a subset of the chat devices that are participating in the embedded session. In some implementations, the embedded session can be associated with a particular embedded session identifier (ID) that is associated with the identifier of the associated chat conversation. The session ID can be associated with the current user members of that embedded session. For example, the user of the first device can be added to a session user list for the embedded session, which lists the members of the embedded session. The first device and/or session server can store and update such a session user list.

In some implementations, the embedded session can be managed by a server, e.g., (embedded) session server 152, which can be a server system that receives data from one or more member devices participating in the embedded session, synchronizes states of the embedded applications on the member devices, and outputs data to one or more member devices. In this example, the first device (e.g., the first messaging application) can send data to the session server in response to receiving the input in block 210 and/or in response to executing the first embedded application in block 212, where the data indicates to the session server that the first embedded application has been initiated. In some implementations, the session server can initiate the embedded session in response to receiving this data and can execute application(s) that can perform some processing for the embedded session (e.g., store objects, perform processes, etc.). In some implementations, one or more client devices, e.g., the first device that initiated the embedded application of an embedded session, can manage the embedded session, and/or member devices can communicate messages between each other without server processing. For example, data can be sent from each member device to a message router that relays the data to the other member devices without processing that influences the embedded session.

In block 216, notification information is transmitted to other devices of the chat conversation indicating that the embedded session is active. In some implementations, the notification information can be transmitted from the session server to other devices participating in the chat conversation ("chat devices") over the network, e.g., to all chat devices. In some implementations, notification information is generated at the session server (or at the first message application) and sent to the other chat devices via the session server. The notification information can include the identification of the embedded session and the identification of the chat conversation, as well as the list of identifications of session users who are currently members of the embedded session (which in this example is currently the first user).

In block 218, chat users are enabled to join and/or leave the embedded session, and chat devices can be notified of such joining and leaving events. For example, the first device can transmit join information to the one or more other user devices participating in the chat conversation (e.g., which can be included in the notification of block 216 in some implementations, or can be transmitted separately from the notification). The join information can cause display of an interface element at the other chat devices that is receptive to user input at each chat device. In response to receiving user input at the interface element on a particular chat device, the particular device is designated as a member device of the embedded session. In some example implementations, chat users are enabled to join the embedded session as member users by selecting a displayed "join" button presented on their user devices. In some implementations, a chat user can input a command to join an embedded session, e.g., in response to a notification of block 216 being displayed on the chat user's device. Some examples of a device joining an embedded session are described below with respect to FIGS. 3 and 4.

Member users can leave the embedded session by exiting or closing the embedded application and/or by exiting or closing the messaging application. In some implementations, exiting or closing the messaging application and/or embedded application does not trigger the user losing membership in the embedded application or session. In such an implementations, users are still members of the embedded application, and are simply indicated as being offline, e.g., in a chat interface or embedded interface displayed on other member devices. In examples of such implementations, users can leave the embedded session (discontinue embedded application membership) by leaving the chat conversation the embedded application is associated with. In some examples, chat devices are sent a notification indicating that a user has joined or left an embedded session and the identity of the user (or user device). The notification can be sent to chat devices that may or may not be member devices of the embedded session. In some implementations, only the devices of member users are sent the notification in response to a member user of the embedded session leaving the session.

Each of the member devices that has joined the embedded session downloads and/or executes a respective embedded application (corresponding to the first embedded application and the embedded session) that provides a respective embedded interface associated with a respective chat interface displayed on the respective particular user device. The embedded applications of the member devices communicate with each other in the embedded session over the network.

In block 220, the first embedded application executing on the first device operates to receive input, update states, and provide output. For example, the input received by the first embedded application can include user input provided from the user of the first device. In some examples, the user input can be received in a displayed embedded interface, e.g., to select elements displayed within the embedded interface, specify directional data with a controller or gesture, specify text data, etc. In additional examples, the user input can be received in the chat interface, e.g., text commands input as messages or selection of interface elements in the chat interface. Input received in the chat interface can be processed and/or conveyed from the messaging application to the embedded application. In some implementations, the embedded application can have access to chat conversation information (e.g., user names or chat identities, user icons, etc.) and/or access to user profile information (user name, profile picture, chat obfuscated ID) which can allows for a personalized experience. In some implementations, the embedded application does not have access to the chat stream (e.g., the chat messages input in the chat conversation). In other implementations, the embedded application can have full access to the chat stream, and/or the embedded application can request higher-level access to chat input (to be permitted by the user), and/or can be provided summaries by the messaging application of chat messages input by chat users in the chat conversation. In additional examples, the embedded application can directly read the input chat messages from a chat conversation database associated with the chat conversation (e.g., stored on the user device or a server), and/or can receive chat messages and other user input in the chat interface via a server or bot. The user input can be touchscreen input, text input provided from a displayed keyboard or physical keyboard, commands provided from voice input, or other types of input.

Furthermore, the first embedded application can receive input (data) including event information received over the network from member devices of the embedded session. For example, event information can include user input provided by other member users to associated embedded interfaces displayed on their devices by embedded applications executing for those devices and corresponding to the first embedded application. This user input and/or other data (e.g., updates to or states of the embedded application based on that user input), can be sent to the first user device over the network.

In addition, input can include event information indicating one or more events and/or application states occurring in one or more corresponding embedded applications executing on one or more other member devices (and/or a session server), and this event information can be sent to the first user device over the network. For example, the event information can describe events occurring within a corresponding embedded application running on a particular device based on user input received by that embedded application, and this information is sent to the other member devices to synchronize the embedded applications of the embedded session. In some implementations, the event information from other member devices can be conveyed by a server system to the first embedded application (e.g., the messaging server, session server, etc.). In some implementations, input is received by the first messaging application of the first device, which provides the information to the first embedded application.

Furthermore, the first embedded application can receive content data from one or more other devices (e.g., member devices, server systems, etc.) over the network. For example, if the first embedded application is a video playing application, it can receive a stream of video data from a content server over the network and display the video data in the embedded interface. If the first embedded application is a game, it can receive game data from other member devices and/or a game server and display game data in the embedded interface. If the first embedded application displays a shared content document (e.g., list of items or events, text document, etc.), travel itinerary, or other information, it can receive the content data of these items from other member devices and/or a server system and display the content data in the embedded interface. In some implementations, the content data is received by the first messaging application of the first device, which provides the content data to the first embedded application.

In some examples, the first embedded application is updated based on the input. For example, the first embedded application can receive data based on input data received from the first user and/or one or more member devices (and/or server system) that, e.g., change one or more states of the embedded application. In some examples of changed states, playback of a media item may be updated to a different point in the media item (e.g., a different time point in a video), a game may be updated to one or more different game states (e.g., a state of the game indicating a different position of a game piece or player character in a game environment, a state of the game indicating a win, loss, or change in a player's score, etc.), a shared list may be updated to add, remove, or change one or more items on the list, a reservation of a theater seat may be input, changed in time or place, or removed, etc. Similarly, input can include event information describing an event of the embedded session (e.g., an event in a corresponding embedded application of a member device or a server providing data in the embedded session), such as an event occurring in a game based on user input (e.g., a game event determined by game code running at a different member device or a server). This event information can cause the first embedded application to update its state to synchronize with the embedded session, e.g., synchronize with one or more corresponding embedded applications. In some implementations, other embedded applications of other member devices can be similarly updated based on the input received at the respective member devices and event information.

Output provided by the embedded application be based on received input and/or events occurring in the embedded application. For example, the output can include output data displayed in the embedded interface. For example, the embedded interface can display interface elements, controls and other features provided by the embedded application. In another example, an embedded application can cause data to be displayed in the embedded interface to provide a graphical game environment, three dimensional (3-D) environment, etc. (such as display on a display screen(s), display by virtual reality and/or augmented reality display devices, etc.). In some implementations, the output can include data received by the first embedded application and the first device from a different device, e.g., content data received from a server such a content server 154 or from a member device of the embedded session.

In some implementations, the output data displayed by the embedded interface can be customized for the particular user of the device on which it is displayed. For example, the first user may have stored user preferences indicating a location, size, shape, etc. of the embedded interface on the display, and a user-preferred color scheme or other visual features of output data displayed in the embedded interface. In some examples, the first user may have stored user preferences specific to a particular embedded application, e.g., preferences indicating a user-preferred user status or role in a specified embedded application, a user-preferred interface element layout for particular types of embedded applications, etc. Such preferences can, for example, be provided from the messaging application to the embedded application and implemented by the embedded application.

In some examples, the output provided from the first embedded application can include visual updates to the embedded interface (e.g., embedded view) displayed by the first device. For example, media data playable (e.g., image or video data) at a new time point can be displayed based on an update to that time point, one or more changes to a displayed game can be displayed, changes to a content document (list, document, chart, etc.) can be displayed, etc.

In further examples, the first embedded application can process content data from the chat conversation (e.g., parse and/or otherwise process chat messages provided by the messaging application) to present output data in the embedded interface, and/or an embedded interface itself, that is contextually relevant to one or more topics mentioned in the associated chat conversation. For example, chat messages in the conversation may have included indications of a particular media item to play, and that media item can be automatically selected and played by the embedded application. In another example, the chat messages can indicate that a user desires to play on a particular side or team in a game, and the user can be automatically assigned to that team by the embedded application. Multiple visual appearances of the embedded interface (e.g. colors, visual styles, etc.), and/or different available selections or controls displayed in the embedded interface, may be provided in different versions of the embedded interface. For example, the embedded interface may be displayed in different versions for different member devices, based on a user status or role of the user, type of media item played (e.g., video vs. image), etc.

In additional examples, an embedded application can summarize conversations and automatically store important information that can be displayed at a later time. For example, a user can open a "summary" embedded application and the embedded application can display a summary overview of the messages input by chat users of a conversation over a period of time specified by the user and/or a period of time that the user was offline, instead of (or in addition to) displaying a record of many chat messages to read.

In additional examples, the embedded application can be a "lightweight" (e.g., reduced-feature or reduced-functionality) version of a full application that executes on the user device or on a different devices. The lightweight version is a version of the full application that requires less storage space, memory to execute, etc., can be executed without launching the full application, and may have a subset (e.g., fewer than the full set) of the features and/or functions of the full application. In some examples, a full game application can be installed on a different device of the first user's (e.g., a desktop or laptop computer) and a lightweight version of the game application can be executed as an embedded application on the user device. Such a lightweight game application can allow the first user to provide user input in the embedded interface to change game settings or game data relating to the first user or the first user's account used in the full game application. Such changes can include managing game resources of the first user used in the full game application, e.g., organizing inventory of game items, buying or selling items within the game, allocating points for particular game abilities of the first user's account, changing preferences or display settings, perform simple game actions, etc. Changes made by the user with the lightweight application are saved to the full game application, e.g., saved in the user's account at a server, and accessed by the full game application when that full application is executing and can, e.g., synchronize with the server. Similarly, changes can be made with a lightweight version for a media item player program, graphical editing program, word processor, or other application program. In some implementations, other member users in an embedded session can share the lightweight application to adjust their data and settings of the full application and/or change the first user's data and settings, e.g., when the first user is not online. In some examples, the lightweight version embedded application can provide a shared, second-screen experience on user devices of an application that executes on different devices.

In some implementations, an embedded application can trigger initiation and execution of an external application, e.g., a different embedded application or other application external to the messaging application, on the first user device or other device in communication with the first user device. For example, the external application can be a full application corresponding to a lightweight version implemented by the embedded application, similarly as described above. In some examples, the embedded application can initiate the external application to complete processing a task (e.g., determine the result of a transaction, provide a rendered display bitmap, etc.). In some implementations, an embedded application can provide selectable data (e.g., words, links, buttons, etc.) to be displayed in the chat interface and chat conversation. For example, the embedded application can provide the selectable data to the messaging application, and the messaging application can display the selectable data in the chat interface and chat conversation. The selectable content is selectable by user input, e.g., can be clicked on via a touchscreen or other input device. When selected by user input, the selectable data can cause a command to be sent to the operating system of the device to initiate and execute the external application (e.g., on the user device), where the other application can be identified in or associated with the selectable data (e.g., a default application associated with a type of the selectable data).

In further examples, when initiating the external application as described above, associated data such as parameters, configuration settings, and/or arguments can be passed to the external application to present particular data from the external application. In some examples, the embedded application can generate a map icon associated with a specific address, and the icon is displayed in the chat interface. When the icon is selected by user input, a map application program is initiated and displays a map in a view that includes a selected location of the associated address. In additional examples, an external shopping application can be initiated by selection of an item description sent to the chat interface by the embedded application, and a checkout shopping display of the external shopping application can include information of the user automatically filled into fields of the shopping display. In further examples, users select a hotel location and room using a shared embedded reservation application, and selecting a displayed control (e.g., "reserve hotel room" button) in the chat interface or embedded interface opens an external full reservation application on the user device. The full reservation application displays a reservation interface that is automatically filled in with the reservation information from the embedded application, and a user can select a "pay" button in the reservation interface to provide payment to the hotel for the reservation.

In some implementations, the first embedded application can detect one or more external applications that are installed on the first user device and modify content data that is displayed on the first user device by one or more of the external applications. For example, the embedded application may be a lightweight version (e.g., lightweight application) of a full version (external) application (full application). For example, if the lightweight application on the first user device detects that the corresponding full application is installed on the first user device, then the lightweight application can enable special features (e.g., additional controls, displayed data, etc.) in the full application by communicating with the full application, e.g., via the messaging application. In some implementations, a complementary relationship can be provided between the full application and the lightweight application (embedded application). In some examples, a full application can communicate data in the background (e.g., not displayed by the first user device), such that the lightweight application can directly communicate with the full application in the background to access or exchange data. This communication can trigger displayed data and options in the lightweight application and/or full application, e.g., with no need for additional authentication between the lightweight application and an authentication server. For example, a login process on a full reservation application can be triggered by the corresponding lightweight application using the full application account of the user registered within the full application on the user device and not requiring the user re-authenticate within the lightweight application to perform a reservation.

In some implementations, the output from the first embedded application can include data provided to the chat interface of the first device and/or provided to the chat conversation, e.g., data that is displayed on the chat interfaces of chat devices participating in the chat conversation. For example, the first embedded application can provide data to the first messaging application, which outputs the data in the chat interface and/or to the other chat devices. In some examples, the embedded application can send data describing events or notifications to the message application (and/or the message application can receive data describing events and notifications from other devices), and the message application can display the data describing the events or notifications in the chat conversation to improve the engagement, retention, and awareness of users about the occurrence and events within embedded sessions. For example, output to the chat interface can be provided as text or other type of chat message (or image, video, audio, etc.). The output to the chat conversation can be transmitted to all chat devices such that it is displayed in the chat interface of all the user devices participating in the chat conversation. In some implementations, the output to the chat conversation can be transmitted to a subset of the participating chat devices to display the output. For example, the output can be provided in the chat conversation and visible to member users, or to particular chat users selected or designated by the first user. In some implementations, such data output to the chat interface and chat conversation can be shared outside of the messaging application, e.g., to other applications executing on the first user device. In some examples, such data shared outside the messaging application can, when selected by a user or processed by a different application, cause the messaging application to open or move to the foreground on the user device, and can cause the embedded application to execute and the user to join the embedded session.

In some examples, notifications output to the chat conversation can include descriptions of events occurring in the embedded session related to user actions, content data, events in a game, etc. provided by the embedded application in the session. For example, such notifications can include, "User1 and User2 are watching the party scene movie Adventure in Time," (triggered by the scene being played), "User1 re-took the lead score in the Toads game!" (triggered by this game event), or "User2 just reserved tickets to the Jubilee concert!" (triggered by the user reserving these items in the embedded application). In some implementations, the notifications can include text, images, videos, audio output, cinemagraphs, or other types of content data. In some implementations, such descriptions of events can be displayed on interactive cards, described below, which can allow a chat user to provide input to the notification/card to join the embedded session or provide input to the embedded application. In additional examples, the embedded application can have access to a list of the chat users (e.g., obfuscated chat Ds) in the chat conversation and can issue invites to the chat conversation to bring non-member chat users to join the embedded session, where, e.g., the non-member chat users can select the invite to cause their device to join the embedded session.

In some examples, the embedded application can send chat messages to the chat conversation on behalf of the user (e.g., with user's approval, as described below). In some implementations, the attribution of such messages can be to the embedded application and not to the user's chat identity, e.g., the embedded application can assume a chat identity of its own as the originator of its chat messages. Such chat messages can include memes, text, images, videos, or other type of content data resulting from editing performed by the user in the embedded application, web content snippets edited by a user in the embedded application, etc. In some examples, the attribution or name of the embedded application, as displayed in the chat interface of other chat devices, can be selectable by user input, and if selected, causes the embedded application to open to edit the same shared content data or edit another content data item.

The embedded interface can present displayed options to modify, setup or enable additional features to the chat conversation. For example, such features can include an auto-reply feature (selecting a random suggested reply or auto-answering questions with prior answers from the first user to prior similar questions), censoring or replacing particular words before the words are sent to the chat conversation or received for display on the first device, etc. For example, the embedded application can use APIs to modify the chat conversation experience for the user. Thus, in some implementations, the embedded application provides a visual interface enabling modified settings and/or provided features within the messaging application (e.g., providing messaging application features instead of—or in addition to—providing shared content data for chat users).

In additional examples, notifications (or other data) output to the chat conversation can include messages based on chat messages input by chat users. For example, the first embedded application can check a list of chat messages input by a user in the chat conversation, determine usage of slang vs. proper vocabulary in the chat messages (e.g., by consulting a stored dictionary, using a machine learning model trained with slang and vocabulary, etc.), and output a rating in a notification indicating a score for the user's writing in the chat. The embedded application can determine and indicate in notifications, e.g., the frequency of usage of particular words by the user in chat messages, or a challenge to the user to use particular words (and can verify that the user has used the particular words in later notifications). In some implementations, notifications output to the chat conversation can include messages from one or more member users in the embedded session to a different member user as an indication of events occurring in the embedded session, e.g., invitations, challenges to other users ("beat my score," "guess my drawing," "I built a tower, try to destroy it"), or boasting/whining messages or notifications (e.g., a player killed another player's character, a player complaining that another player stole their pet, etc.).

In some additional examples, an embedded application having access to the chat conversation message stream can provide information related to the chat conversation, e.g., a high-level summary of the conversation, a record or list of content data that was shared in the chat conversation by chat users, displaying (e.g., pinning) controls or other options in the chat interface or embedded interface allowing a user to select collected topics, information, or shared content data from the chat conversation to save for later, to save on a favorites list of the user, etc. For example, the embedded application (e.g., a particular "summarizer" type of embedded application) can detect topics shared in the chat conversation and provide reminders, summaries, and/or actions related to those topics. In some examples, User 1 tells User 2, "don't forget Kenny's birthday on Saturday" and the embedded application, when initiated, automatically adds a calendar event to the calendars of User 1 and User 2 stored on their user devices, or displays a suggested command or notification that causes the embedded application to add the calendar event when the command or notification is selected by the user. In another example, User 3 inputs a message in the chat conversation that includes an address or location of a restaurant for next week's reunion dinner, and the embedded application auto-pins (persistently displays) in the chat interface, or otherwise stores, the location as a summary so that the first user does not have to review and scroll through old chat messages a week later to find the location. For example, summaries can include descriptive and identifying information (e.g., times, locations, names, phone numbers, addresses, etc.) input into the chat conversation, and/or can include messages that received reactions from other chat users in the chat conversation (e.g., user approvals, exclamatory messages, etc.). In another example, User 1 shares images captured from the latest company trip in the chat conversation, and the embedded application automatically (with user consent) uploads the images to a shared group photo album "Company trip to Vegas" that is shared with all the chat users e.g., stored on a server over the network). In some implementations, if an embedded application does not have the capability to execute such actions based on chat conversation content data, it can trigger the initiation and execution of a different embedded application (or other application) that has that capability, and which executes the actions. In some implementations, one or more such actions of the embedded application can be presented as suggested commands and/or suggested messages which can be selected by the first user to implement the selected commands, as described herein.

In some implementations, the notification to the chat conversation can be provided in response to one or more particular events or particular types of events that have occurred on a server (e.g., server events) in communication with the messaging application and/or embedded application over the network, e.g., events that have been processed in a server application executing on the server. The server can send server event information to one or more of the member devices such that the messaging application displays the server event information in the chat conversation. In some examples, this server can manage second content data for other network users, where the second content data is the same or related to first content data that the server is providing to the embedded application on the first user device (e.g., media item data, game data, etc.). For example, the server may send the second content data over a network to one or more other users accessing the content data on other user devices (e.g., that are not participating in the chat conversation) via other embedded applications and/or other mechanisms (e.g., web sites, dedicated viewing applications on user devices, etc.). The server can detect whether the second content data is the same or similar to the first content data provided to the embedded application (e.g., same title of media item, game, etc.). Furthermore, the server can detect user actions associated with the first content data and second content data, which may qualify as server events. For example, the server can detect that the second content data has received a number of favorable user ratings from other users, e.g., over a threshold number of favorable ratings. This can be predefined as a server event, causing the server to send server event information (e.g., "this movie has received 1 million approvals!") to the first embedded application to display in the embedded interface, and/or to the messaging application to display in the chat interface.

In some implementations, if user consent has been obtained, output provided from the embedded application can include input information based on user input received from the first user in the embedded interface, where the messaging application sends the input information over the network to a server, e.g., for display at other member devices, etc. The messaging application can also or alternatively determine and send input information to the server (if user consent has been obtained), where the input information is based on user input that was received in the chat interface outside the embedded interface. For example, the user input can be a chat message, user comments or ratings associated with a content item (e.g., media item or game) being played in the embedded session, etc. In some implementations, these comments or ratings can be received by the server and associated with the content item that the server provides to devices. The server can provide the comments or ratings to user devices accessing the content item on the server. For example, other user devices that are not participating in the chat conversation may access that content item on the server, e.g., via different embedded sessions or other applications. Such other user devices can also access the comments or ratings provided by the first user. For example, user input such as user comments or ratings can be sent to the other user devices and displayed in embedded interfaces or other application programs on the other user devices.

In some implementations, if user consent has been obtained, the input information sent to the server can include information indicating the particular content items that have been played in embedded applications on the first device. The server can update a stored history of user selections of content items based on the input information, where the history is associated with the first user of the first device. The stored history can also indicate user selections of content items stored by the server and viewed in other applications used by the first user. In some implementations, the server can use the stored history to determine suggested content items for the user that are related (e.g., in genre, viewings by other users, etc.) to content items previously accessed on the server by the first user. In some implementations, such server-suggested content items can be displayed in the chat interface and/or by an embedded application that plays the type of the content items.

In addition, information generated by an embedded application, bot (see bot descriptions below), or server can be updated by the embedded application, bot, or server if new conditions are triggered. In an example, User 1 uses an embedded media player application to share a video in an embedded session in the chat conversation. User 2 opens a corresponding embedded media player application at his or her device and comments on or rates the video with a rating. The embedded application, bot, or server can update the shared video, and update a notification describing the video that is displayed in the chat conversation to reflect and propagate the new information to the chat users (e.g., display an indication that the video now has +1 user approvals, +1 user comments). In some implementations, updatable "interactive cards" about an embedded session are shared in the chat conversations, which can be controlled by a server, bot or embedded application.

In some implementations, when output data from the first embedded application is to be output to the chat conversation and/or to a server for display, a prompt is displayed (e.g., with a user-selectable option) to allow the first user to select whether to allow the data to be output in the chat conversation or not. For example, the prompt can display the message that is to be sent to the chat conversation or server if approved by the user. In some implementations, the prompt can be displayed for particular types of output data to the chat conversation (e.g., particular types of messages, having predefined keywords, indicating events of particular types, output data that is a response to a particular type of action or command provided by a member user to the embedded application, etc.) and not displayed for other types. The prompt can be displayed for particular types of embedded applications, and not displayed for other types. In some implementations, the first user may have stored accessible user preferences that are accessed to determine the conditions under which a prompt is to be displayed. For example, user preferences can indicate that the prompt should ask for user consent to send output from a game types of embedded applications to the chat conversation, and not provide the prompt for a media player types of applications or other types of applications.

Output can also include data transmitted to corresponding embedded applications executing on other member devices over the network, e.g., via an associated messaging application and/or a server system. For example, the transmitted data can include user input (or data derived therefrom) received by the first embedded application from the first user, e.g., selecting elements or changing states in the first embedded application. The transmitted data can include event information indicating one or more events occurring in the first embedded application (e.g., based on user input from the first user, program events based on execution of code and particular conditions, or other events occurring local to the first embedded application), similarly as described above. The data can be provided to the first messaging application, which can transmit the data (or a processed form of the data) over the network to other devices. For example, the data can be sent to a message router, e.g., a session server as described above, which can send the data to other member devices, and/or the data can be sent directly to one or more member devices. The other member devices can receive and use the user input and/or event information to update the states of the corresponding embedded applications to synchronize with the first embedded application.

In some examples, the output from the embedded application can include event data that indicates one or more particular events (or types of events) that have occurred in the embedded session. The event data can be provided from the embedded application to the messaging application, which can generate a notification based on the event data and causes the notification to be displayed in the chat interface and sent over the network to be displayed in the chat conversation (e.g., chat interfaces) for member devices and/or chat devices. For example, the events may have occurred in the first embedded application. In various examples, the events in the embedded session may have occurred in response to the first user input from the first user and other user input received from the one or more member users of the embedded session. In some examples, types of events may be changing a playback position of a media item, or an initiation or ceasing of playback of a media item in an embedded media player application; achieving an objective, ending a game or a particular phase or portion of game duration, or other game event in a game provided by an embedded game application; modifying a content document (e.g., an item in a shared list) in an embedded list application; reserving a seat via an embedded reservation application; etc. In some implementations, the events in the embedded session may have occurred on a server managing the embedded session (e.g., a session server), which provides the event data to the messaging application, which can generate a notification for display in the chat conversation. Types of events on such a server may include reception of input data at the server over the network from other users external to the chat conversation, availability of a new content item related to a content item playing in the embedded session (e.g., the new media item has the same artist, author, actors, production company, genre, etc. as the playing media item, or the new content item is known to be on a favorites list of one or more member users, if they have provided consent), a disconnection of one or more member users from the server, etc.

In some examples, the embedded application can output control information (e.g., via the messaging application) to an external application executing (or initiated) on the first user device or executing on a different device in communication with the first user device over the network. In some examples, the embedded application can output control information to applications that control home appliances, vehicle functions (lock/unlock doors, change thermostat, etc.), or other types of devices. For example, such control information can be output in response to selection of displayed controls in the embedded interface (e.g., buttons, dials, etc.), or automatically in response to chat messages input by the first user (e.g., "open my front door", causing output of control information to unlock the door of the user's house) or based on chat messages in the chat conversation input by chat users (e.g., messages discussing going into a car, causing the embedded application to send control signals to unlock doors of that car). In another example, the embedded application can send application data to affect game states of a console/desktop game in response to receiving input from the first user and/or other chat users in the embedded interface or in the chat conversation. For example, the chat users may select controls in the embedded interface to send data to a server, where the data is read by a game application on a different game device to change game resources (as described above), or start a game on the game device, perform game actions in the game, etc. In another example, the embedded application can automatically send information to the game that causes game characters of the chat users to be formed into a group in the game based on chat messages from the chat users in the chat conversation (e.g., "let's join up in the game"). The chat conversation provided on the chat devices can act as a chat interface between players of the game executing on the game device. In some implementations, control information can be presented in the chat interface as suggested commands for the external application, as described below, which can be sent to the external application in response to selection by user input.

In additional examples, the embedded application can provide data to the messaging application to permanently or temporarily modify a visual representation of the first user in the chat conversation. For example, a user status or role can be displayed next to every message or user name (e.g., "User1—player") or a title bestowed by the embedded application (e.g., "User1—the Conqueror" for a game). In additional examples, a filter can be applied to modify a user profile image appearing in the chat interface and/or modify chat messages input by the first user (e.g., highlighted with colors, borders, frames, stickers, etc.). Such modifications can be provided while the first user is participating in the embedded session and/or as rewards for achievements within the embedded application. Rewards can include unlocking other embedded applications for use by all chat users. The integration between the messaging application and the embedded application via exposed APIs can allow such features.

Some embedded applications can change a displayed keyboard layout, displayed buttons, or other displayed controls in the chat interface (or controls provided by the operating system or other interface displayed by the user device) based on the type of embedded application and/or in response to events in the embedded application or chat conversation. For example, a layout of a keyboard displayed in the chat interface can be changed to match a game controller specialized for a particular embedded game application. In another example, events such as achieving an objective in a game, or being defeated in a game, can cause one or more displayed buttons to be added to or removed from the chat interface in accordance with increased or decreased options in the game for the user. In another example, when a user in inputting a text query to perform a search for an item (e.g., a product), as more characters are input, the embedded application can cause additional suggested characters for the query that do not match any search results to be removed from display, or displayed with lower visibility than matching characters (e.g., grayed out).

In additional examples, embedded applications of various types can execute in association with the messaging application. For example, an embedded media player application can receive user input from member users in an associated embedded interface and/or chat interface. The input can select playback functions of media items such as videos, images, audio data, documents, etc., and output from the embedded application can provide playback of the media item. An embedded game application can receive user input from member users which can change game states, and output of the application can include visual, auditory, and tactile output indicating a game environment and game states. An embedded shared document application can receive user input from members users which can change a shared content document (e.g., list or other document) and output of the embedded application can display the updated content document. An embedded travel itinerary application can receive user input from members users which can select travel destinations, routes, times, and other travel-related preferences, and the output of the embedded application can include display of available travel routes, options to select particular routes, times, and method of travel with user input, etc. An embedded reservation application can display selectable options allowing member users to reserve places or attendance at hotels, restaurants, movies, conventions, rides, parks, entertainment performances, and other future events. For example, such an embedded application can receive user input from member users that specifies times, places, and events at which to reserve places (e.g., including user selections of seats, tables, or other places in a graphical display), and the embedded application can output suggested events and dates/times, indications of reservations being successfully made or denied, etc. In some implementations, various types of embedded applications (e.g., having different functions or purposes) can be combined into a single embedded application.

In block 222, it is determined whether the first messaging application has been exited at the first device. For example, user input received by the first device may close the messaging application. If the first embedded application has been exited, then in block 224, the chat interface is removed from the display of the first device, including removal of the embedded interface. In some implementations, the embedded application is also removed from memory of the first device. In addition, information can be sent to a device managing the embedded session, e.g., the session server, to indicate that the first device has exited the embedded session. In some implementations, the managing device (e.g., session server) updates the session user list to remove the first user and provides this update to other member devices of the embedded session.

If the messaging application has not been exited, then in block 226 it is checked whether the first embedded application has been closed at the first device. For example, user input can be received at the first device from the first user that selects a displayed element in the chat interface or embedded interface to close the embedded application. If the first embedded application has been closed, then in block 228 the embedded interface is removed from the display of the first device. In some examples, the removal of the embedded interface allows the chat interface to occupy the area formerly occupied by the embedded interface. In addition, information can be sent to a device managing the embedded session (e.g., session server) to indicate that the first device has exited the embedded session, similarly as described for block 224.

In block 230, in some implementations, an indication is displayed in the chat interface indicating that the embedded application is in use by one or more other member devices, if such a condition exists. For example, the indication can be an icon or other element displayed in the chat interface while the embedded application is continued to be used in the embedded session that was exited by the first user. In some implementations, the indication can be selected by user input to cause the first user and first device to re-join the embedded session of the embedded application, e.g., re-execute the embedded application from code stored in memory of the first device and/or download and execute the embedded application. Some implementations can remove the displayed indication if all users have exited the embedded application, and/or if no member users have interacted with (e.g., provided input to) the embedded session or embedded applications after a threshold period of time.

In some implementations, multiple embedded applications can be executing simultaneously and multiple embedded interfaces can be displayed by the first user device in association with the chat interface (e.g., similarly as for the embedded interface as described above). In some examples, multiple embedded applications can execute simultaneously on the first user device. In some implementations, the multiple embedded applications can communicate data to each other. For example, one embedded application can send a command to the other embedded application to cause the other embedded application to update one or more states, remove or add a member user, etc.

In some implementations, the messaging application can manage a conversation "currency." This can be a virtual currency that can be generated by embedded applications, earned by chat users, and exchanged with other chat users within the embedded applications and/or within the messaging application. In some examples, a user can receive tokens or "coins" when performing particular tasks or goals in embedded applications, e.g., completing an objective in a game, editing a video or image for a threshold amount of time or threshold number of edit operations, playing a media item for a threshold amount of time, editing a shared list, completing a travel reservation, etc. In various implementations, the currency can be spent by a user to obtain rewards, e.g., the ability to change visual features of the chat interface, select new options, or use other features of the chat interface. In additional examples, the currency can be spent to enable use of (e.g., unlock access to) visual text characters, icons, or images that can be inserted into chat conversations (e.g., "sticker packs"), use of particular conversation features (e.g., change message text fonts, add colors or titles to chat identities, use a particular image or avatar in the chat conversation, etc.), use of particular embedded applications, etc. In some implementations, the currency can be used to unlock or improve features in embedded applications (e.g., use of particular avatars or characters in games, access to particular media items with a monetary discount, use of different displayed appearances for embedded interfaces, etc.). In another example, a user can send a particular amount of the currency to a different chat user, or can transfer (or copy) obtained rewards or access rights to a different chat user in exchange for an amount of the currency. In some implementations, the currency can be converted to a real currency, allowing for person-to-person payments (e.g., splitting a bill at a restaurant, or small debt settling).

Figure 3:
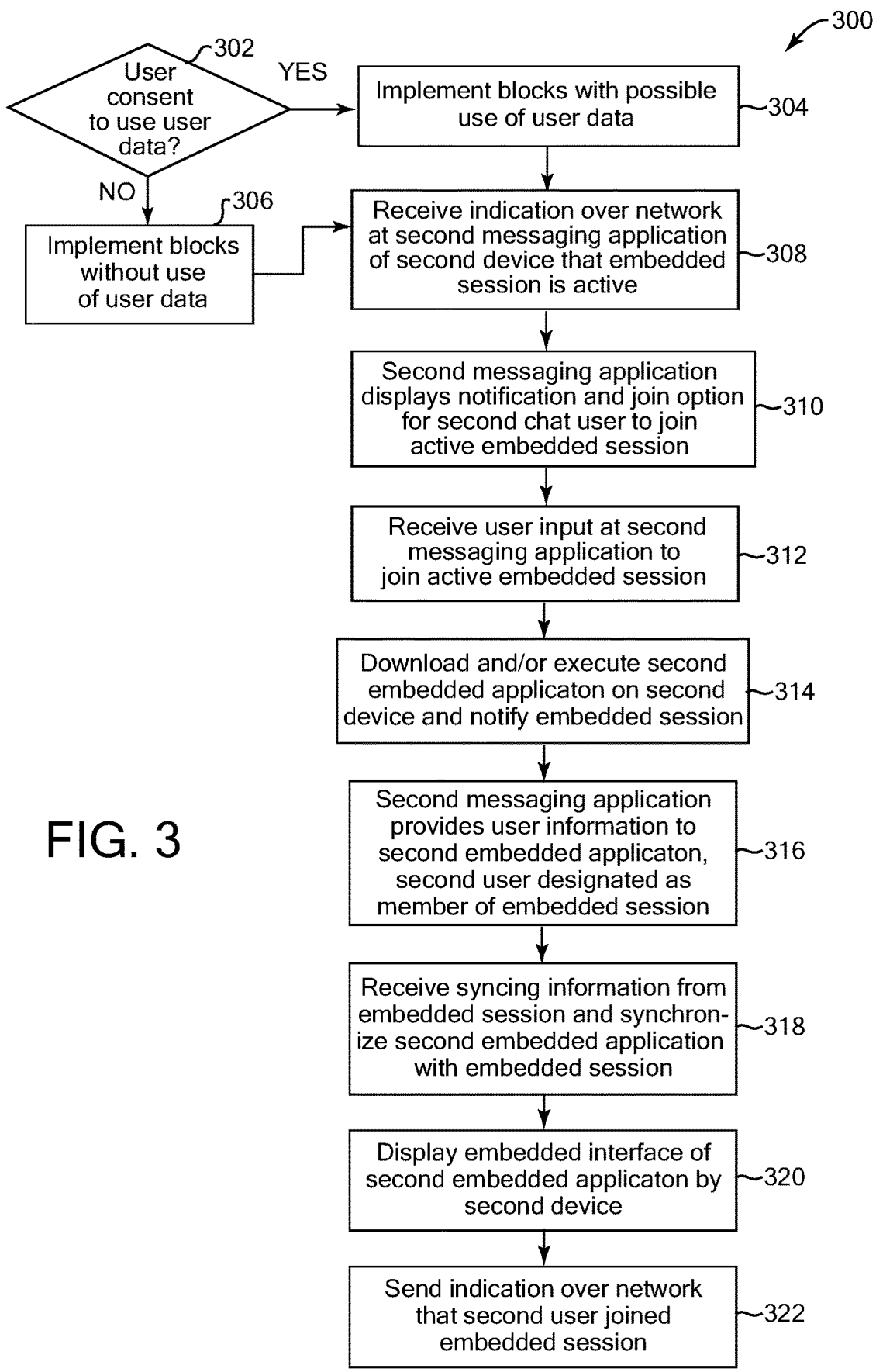
FIG. 3 is a flow diagram illustrating an example method to enable a user to join an embedded session, according to some implementations.

FIG. 3 is a flow diagram illustrating an example method 300 to enable a user to join an embedded session, according to some implementations. In some examples, method 300 can be included in block 218 of FIG. 2. In some implementations, method 300 can be implemented, for example, on a server system, e.g., messaging server 101, as shown in FIG. 1. In some implementations, some or all of the method 300 can be implemented on a system such as one or more client devices 115 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 300.

In some implementations, method 300 can be implemented on a different user device than the method 200 of FIG. 2, e.g., a second user device. For example, the second device can communicate with the first device of FIG. 2 over a network. The second device is participating in a chat conversation, and the embedded session has been initiated by a chat user of a different device participating the chat conversation. In the example of FIG. 3, the embedded session was initiated in association with the first embedded application of the first device as described with reference to FIG. 2, and the second device is participating in the same chat conversation in which the first user and first device are participating.

In block 302, it is checked whether user consent (e.g., user permission) has been obtained to use user data in the implementation of method 300. For example, user data can include messages sent or received by a user, e.g., using messaging application 103, user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, videos viewed or shared by a user, etc. One or more blocks of the methods described herein may use such user data in some implementations.

If user consent has been obtained from the relevant users for which user data may be used in the method 300, then in block 304, it is determined that the blocks of the methods herein can be implemented with possible use of user data as described for those blocks, and the method continues to block 308. If user consent has not been obtained, it is determined in block 306 that blocks are to be implemented without use of user data, and the method continues to block 308. In some implementations, if user consent has not been obtained, blocks are to be implemented without use of user data and with synthetic data and/or generic or publicly-accessible and publicly-usable data.

In block 308, an indication (e.g., notification) is received at a second messaging application of a second device that an embedded session for an embedded application is active. In some examples, the indication can be data indicating the particular embedded application that has been initiated and indicating that an associated embedded session has been initiated. In some implementations, the indication can include an identification of the chat user from the chat conversation that initiated the embedded session. In some implementations, the data of the indication may have been sent by a session server, e.g., after the embedded session was initiated.

In some implementations, identifications (e.g., user IDs) of the chat users who are currently members of the embedded session (e.g., who have joined the embedded session) are included in the received indication. For example, the list of session users described with reference to FIG. 1 can be provided in the indication. Alternatively, the current number of member users can be indicated without the identifications of the member users. In some implementations, the received indication can include additional information. For example, the information can include the amount of time since the embedded session was initiated, one or more current states of the embedded application(s) in the embedded session, and/or other information related to the embedded session. In some examples, the additional information can include the name of media item(s) currently being played, in queue to be played, or otherwise being processed for the embedded session, the current number of items of a shared list (or other shared document data) being edited in the embedded session, statuses of one or more of the member users with regard to the embedded session (e.g., identifying users as controllers, players, observers, etc., and/or identifying a user who is currently editing a document or winning a game implemented in the embedded session, etc.), a list of objectives so far achieved in the embedded session (e.g., finished playing a video, game objectives completed, a list is finalized, etc.), a specific request from one or more current member users of the session for additional user members to join the embedded session, etc. In some implementations, the additional information can include messages from one or more member users in the embedded session to the second user, or to other member users as an indication of events occurring in the embedded session, e.g., invitations, challenges to other users ("beat my score," "guess my drawing," "I built a tower try to destroy it"), boasting or whining notifications (e.g., a player killed another player's character, a player complaining that another player stole their pet, etc.). In some implementations, updates to this information can be received by the second device at later times, e.g., updates to the current number of member users, a current state of the embedded application, etc.

In block 310, the second messaging application causes display (or other type of presentation or output) of a notification and a join option by the second device. The notification can include one or more items of information that were received in block 308, e.g., descriptive information about the active embedded session indicated in block 308. For example, such items of information can include the name or identifier of the embedded application used in the embedded session, content data being shared (e.g., media item played, content document edited, etc.), current member users who have joined the embedded session, statuses of one or more of the member users with regard to the embedded session, current state(s) of a participating embedded application, messages from member users, and/or other information received in the indication of block 308. In additional examples, information in the notification can refer to content data or states of the embedded application (playback position of media item, high scores in a game, game state information) or content data of the chat conversation (as allowed by user privacy controls). Further, notification information can include embedded application download size and application description, indication that user permission is requested for use of user data and the types of data (e.g., user data) the embedded application will access, a list of users that have already joined the embedded session, etc. In some implementations, the displayed notification can take the form of an "interactive card" as described herein.

The join option is a selectable option that, if selected by user input, allows the second user to join the active embedded session. In some implementations, the join option can be an interface element displayed in the chat interface of the messaging application where data of the chat conversation is being displayed. For example, the join option can be displayed as a selectable control (e.g., button) in the notification displayed in the chat interface.

In some implementations, the join option can be displayed, or can be highlighted (e.g., displayed in a bright color, flashing, etc.) or otherwise emphasized in the display, if one or more conditions are met. For example, the conditions can be specified in stored user preferences of the second user. Such conditions can include, e.g., the embedded session is a specified type or is associated with a specified embedded application, one or more specified users are currently member users of the session, a specified user status (e.g., user role) is still available for the second user in the embedded session (e.g., not yet assigned to other member users), the embedded session has not been active for more than a specified period of time (e.g., the time period after initiation of the embedded application by the first user of FIG. 2), the output of a sequential media item being played in the embedded session (e.g., video or audio data) has not yet progressed past a specified percentage of the total playing time, or other conditions.

In some implementations, the join option can include one or more displayed additional options in addition to join the embedded session (e.g., displayed user interface elements corresponding to the additional options). For example, the additional options can include an option to select a command or request for one or more particular user statuses (e.g., user roles) that the second user can or is to be assigned in the embedded session. The user statuses or roles can be selected by the second user from a set of predefined user statuses or roles. A user status can define one or more functions of the embedded application able to be activated by the user participating in the embedded session and/or can define the capability of the user to modify data and/or states of the embedded application and embedded session. Examples of user statuses or roles can include a controller (e.g., a user able to modify data such as a content document (e.g., list), or control playback of a media item), a player in a game (e.g., able to be winner or loser in the game), an observer of application events (e.g., view displayed playback of a media item or playing of a game and not able to affect media item playback or input game actions), a referee in a game (e.g., adjudicating rules of the game, initiating next rounds of play in the game, etc.), an administrator (e.g., initiating and stopping embedded application output or processing such as media item playback or games, assigning or dividing resources to players in a game, etc.), a leader of a team of multiple users in a game, a user status or role allowing the user to modify operation of the embedded application (e.g., designate rules or conditions of a game, control playback of media data, or other output), etc. Some user statuses or roles can be restricted or limited, e.g., only qualifying users can be assigned these roles (e.g., a maximum number of players in a game may restrict additional users from being assigned a player role if the maximum number has been reached), while other statuses or roles can be unlimited (e.g., observers of a game). In some implementation, a join option can include a request for permission from the user for the embedded application to use particular types of user data associated with the second user.

In block 312, user input is received by the second device and the second messaging application, the user input instructing that the second user and second device join the embedded session. For example, the user input can be selective user input that selects a displayed join option (as described for block 310) via a touchscreen or other input device, input a text or menu command, etc. In some implementations, the second user and second device can join the embedded session without explicitly receiving user input instructing to do so. For example, one or more conditions can be specified in stored user preferences of the second user that may instruct to automatically join an embedded session if one or more of the conditions are met. For example, the conditions can include one or more conditions as described above for block 310.

In some implementations, user input can be received by the second messaging application which specifies additional input related to the joining of the second user to the embedded session. For example, the user input can select a status of the second user in the embedded session. In some examples, the user input can select or specify a user status (e.g., role) in the embedded session to be assigned to (or requested by) the second user, as described above. In other implementations, the user status or role can be selected by the second user, by the second embedded application, or by the session server after joining the embedded session. In some implementations, the user input can include other designations or selections, such as a time at which the user wishes to exit the embedded session, a selection of an icon, avatar, image, or other data to be associated with the user while being a member of the embedded session, etc. In some implementations, the user status or other designations can be selected, by user input, from a menu or other list of options displayed in the chat interface.

In some implementations, the second user and/or one or more other chat users can be automatically joined to an active embedded session, or can be automatically provided a customized option (e.g., in block 310) to join an active embedded session. In some examples, such chat users may have been detected to be interested in the embedded application based on their input messages in the chat conversation. In an example, three chat users input chat messages to the chat conversation describing a vacation to a particular geographic location (e.g., Hawaii). One of the chat users issues a command in a chat interface to start an embedded travel itinerary application, and the other two users are automatically joined to the associated embedded session, or are provided a notification that indicates that the embedded session relates to their discussed travel destination (e.g., Hawaii), based on the messaging application or other device application parsing the messages input by these users in the chat conversation (e.g., parsing the location name, etc.).

In block 314, a second embedded application is downloaded and/or executed for the second device, in response to the user input to join the active embedded session of block 312, and the embedded session is notified of the joining event. For example, the second device can send a request to and download the second embedded application can be downloaded from a server system hosting embedded applications similarly as described for FIG. 1. The download of the second embedded application can occur in the background of the operating environment of the first device, e.g., similarly as described above. After (and/or during) the second embedded application is downloaded, it can be executed on the second device. In some implementations, one or more parts or components of the second embedded application can be executed by one or more other devices in communication with the second device, e.g., one or more server systems. In some implementations, the second embedded application corresponds to the first embedded application and to embedded applications executed on other member devices of the embedded session. For example, the second embedded application can include the same code (or substantially the same code) as the first embedded application of FIG. 1.

The second messaging application can send notification information to the embedded session indicating that the second user has selected to join the embedded session. For example, the notification information can be sent to the session server, which conveys the joining event to the other member devices (including the first device) by sending the notification information (or information derived therefrom) to those member devices. In some implementations, the session server can update the session user list for the embedded session stored by the session server, e.g., add the second user to its session user list. Some implementations can send the notification information directly to one or more other member devices of the embedded session. In some implementations, the second device sends a request to join the embedded session, and a session server (or embedded device) can send back a response to the second device that causes the second device to connect to the embedded session (and/or initiate the execution of second embedded application on the second device, if it is not already executing).

In block 316, the second messaging application provides user information to the second embedded application on the second device. In some implementations, the second embedded application can request such user information. For example, the user information can include a member update, e.g., an update of the members in the embedded session. In some examples, the user information can include user identities of the member users of the embedded session, which, for example, can be the chat identities of the users and user devices participating in the chat conversation. In this example, the chat identity of the first user can be provided, and chat identities of any other member users. The second messaging application can provide the user identities, e.g., where the second messaging application received the user identities in block 308 and/or has previously received from a messaging server for the chat conversation implemented by the second messaging application.

In some implementations, the user information for a particular user (e.g., the first user) can be provided by the second messaging application to the second embedded application if the second messaging application has obtained consent from the second user to do so. For example, such consent can be included in user information provided for the chat conversation, in some implementations. If no consent from the user has been obtained, then the user information is not provided to the second embedded application.

In some implementations, the second messaging application can, prior to providing the user identity to the second embedded application, anonymize the user information (e.g., anonymize or obfuscate one or more user identities) so that the user information does not describe the particular user nor can be associated with the particular user (or only partially describes or is associated with the particular user). In some examples, if a chat identity is a user name, a "dummy" or "temporary" name may be assigned for use by the embedded application and in the embedded session. For example, the first user chat identity can be changed to a generic identifier or name such as "User 1," "Friend 1", the initials of the first user, the first name of the first user, etc. For example, a name such as "John Doe" may be replaced with a temporary pseudonym (e.g. "Kenny"). The anonymized user information can be provided to the second embedded application as one or more user identities.

In some implementations, the second messaging application also provides additional user information, e.g., a user status or role to be assigned to the second user in the embedded session. In some implementations or cases, this status or role may have selected by the second user, e.g., in the embedded interface or chat interface. The second embedded application can update its output based on the added second user. For example, the user identity of the second user can be added to a user list displayed in the embedded interface.

In some implementations, the user status or role is determined by the messaging application (or embedded application) based on chat messages provided by the second user in the chat conversation (and, e.g., this user status or role need not be selected by the second user). For example, if the second user has previously input a chat message saying, "I want to play the white side" in the chat conversation about starting an embedded chess game application, then the messaging application can detect this message, determine its meaning (e.g., via comparisons to keywords or key phrases and/or using machine learning techniques) and automatically assign the second user to a user role of the white pieces player after the second user joins the embedded chess game session. The messaging application can provide this user status to the embedded application to assign the second user control of the white pieces in the game.

In some implementations, a particular user role in the embedded session may not be available to a member user (e.g., the second user) being added to the embedded session. For example, the user information may indicate that the second user has selected to be a player role in an embedded game application, where such a player role allows a user to affect game states in the game (e.g., input game actions to affect game state). If the number of player roles in the application is limited (e.g., a chess game application limited to two players), there may not be a player role slot available to the second user if, for example, the second user is joining an active embedded session in which other member users have previously joined the embedded session and occupied all the available player roles. If such unavailability occurs, then the second embedded application can determine a different user status (e.g., player role) for the second user and can inform the messaging application of the different user status. For example, the second user can be assigned an observer role, in which the second user is not enabled to input actions to change particular states of the embedded application or session. In some examples, an observer player for the embedded game application can be allowed to display game states on their device but not affect game states with user input. An observer role for a media player or shared content document can be allowed to view a media item or list but not affect media playback or list items.

In some implementations, if the second user's selected role is unavailable, the second user can be provided with a menu of available role(s) in the embedded session, and the second user can provide user input to select one or more of the available roles. In some implementations, if a user role becomes available during an embedded session (e.g., a member user exits the embedded session or changes roles within an embedded session, such as changing from player to observer), then member users who were not assigned requested user roles can be offered such a newly-available user role. In some implementations, a particular user role may be removed or changed during an embedded session as determined by an embedded application. For example, a player role may change to an observer role after a game concludes or after a particular round or phase of the game is over. User roles may also be changed or reassigned during an embedded session by member users having the ability or authorization to perform such changes in an embedded session. In some implementations, one or more of the various changes of user roles during an embedded session can be indicated in data provided to the messaging application by the embedded application, and these changes can be indicated by the messaging application in the chat conversation of the chat interface (e.g., output as text descriptions by devices of all chat users, or only of member users).

In some implementations, an indication that the second user has been assigned the different (newly-assigned) user status, indications of removal or additions of user statuses or roles to the embedded session, and/or indications of any other change in user statuses for member users in the embedded session, are output to the chat interface to be displayed on the chat devices participating in the chat conversation, or alternatively displayed on the member devices of member users of the embedded session.

In an example, the first user initiates an embedded chess game application and the first and second users agree via chat messages input in the chat conversation that the second user will start the game as the player controlling the white pieces. The messaging application parses the chat messages to determine that the first user is assigned a player role to play black pieces, and provides this user status to the embedded chess application to start a game with the white pieces controlled by the second user. A third user (another member user) then joins the embedded chess session, and the messaging application (or the embedded chess application) automatically assigns a user role of observer to the third user for the embedded session, since there are only two player roles provided for the game session and those roles are occupied by the first and second users.

In some implementations, the user information can include other information related to the member users of the session, if user consent has been provided by participating users. For example, geographic locations of the devices used by the member users can be obtained by the second messaging application, e.g., from the chat conversation, if the chat users (including the member users) have provided consent to obtain such geographical information (e.g., geographical coordinates, labels of geographic regions or areas, etc. as determined by GPS or other location sensors of the member devices). In an example using the embedded travel itinerary application described above for three chat users, the messaging application can specify to the embedded application that the travel context is "vacation in Hawaii mid-June" based on the users' chat messages, and specify the respective geographic locations of the three chat user devices so that the embedded application can determine travel itineraries (e.g., travel routes, airplane flights, scheduled visits, etc.) to the destination location based on the users' device locations. In some implementations, location information can specify a location as an associated category such as "home" or "work" for a user. In some implementations, the user information can include a local time (based on local time zone) of each member user. For example, the local times can be similarly used by an embedded travel itinerary application to determine a travel itinerary for each user. In some examples, the embedded application can use location and/or time information of member users to determine output information displayed in the embedded interface, e.g., travel itineraries, reservations at events, written language of text output (e.g., subtitles, messages, etc.), regional customizations in output, notifications based on time, etc. In various examples, access to member users' locations (with user consent) can enable embedded applications to use shared locations to provide output, e.g., as status updates of member user locations to a group of member users that are waiting for other member users at a restaurant, to provide user locations in races and fitness challenges, and/or to provide locations of children users for viewing by parent user who are parents of those children users.

In some implementations, the user information can include current or available data bandwidths over the network of one or more of the member devices used by member users, e.g., bandwidth, lag, or other network connection characteristics of each member device to a session server implementing the embedded session and/or to one or more member devices implementing the embedded session. In some examples, the embedded application can use the bandwidth information to cause a modification of transmission of input data received at the first user device and the first embedded application over the network. For example, the modified transmission can include a different amount of data to be transmitted over the network to the first user device, causing a different rate of data transfer over the network to the first user device, and/or causing compression of the transmitted data from other devices to the first user device (e.g., a content data stream from a content server). In some examples, bandwidth information can be used by the embedded application to assign particular user statuses (e.g., roles) to particular member users in the embedded session. For example, high bandwidth (e.g., over a threshold) may be suited to roles requiring sending data from the user device to other devices, e.g., particular player users in a real-time game, while lower bandwidth may be more appropriate for observer players in particular game applications.

Other user information provided to the second embedded application can include other information if consent by the associated chat users for access and use of such data has been obtained, including social network information (e.g., posts, ratings, comments, etc. posted to a social networking service), history of the use of the embedded application by the member users (e.g., particular media items previously viewed in the embedded application, games previously played by member users and the roles assigned to member users in those games, the win/loss record of member users in previous games, dates and times of previous embedded application use, etc.).

In block 318, syncing information can be received at the second device (e.g., from the session server and/or other member devices such as the first device) and the second embedded application is synchronized with the embedded session. In some implementations, the syncing information can be received in block 308 with the indication of the embedded session. For example, the syncing information can include one or more states of corresponding embedded applications executing on member devices of the embedded session, reference time information from a session server, etc. In some implementations, the syncing information can be received from the session server or other device that can provide the syncing information to all the member devices of the embedded session to enable the embedded applications to be synchronized with each other. In some examples, the session server receives updates of the embedded applications of the member devices based on user input (e.g., user playback commands of media items, game actions, modification of shared content documents, itineraries, etc.) or application events (e.g., a timer expiring, a new media item in a queue starting to be played, a game event occurring, etc.) at those member devices, and sends syncing information to the other member devices. In some implementations, the member devices can update a global synchronizing value or timer stored on an accessible device such as a server to maintain synchronization with each other, an example of which is described with reference to FIG. 5.

In some examples, the syncing information can include the time point (or change in time point) of a video or audio data segment that is currently being played in the embedded session, a change in state of a game played in the embedded session, an update to a shared content document in the embedded session, etc. In another example, the syncing information can include clock information for other member devices that can be used for synchronization of timed events in the embedded session. For example, spawning of enemies or treasures in a game may be synchronized across all member devices at a particular time, or registering the member user inputs at (or relative to) a particular time to cause an effect in a game. Registering the synchronized times at which states occur or change in the embedded session may allow accurate replaying of a recorded version of the embedded session at a later time by a different member user. Precisely timing events among the member devices also allows for competition between users (e.g., to determine which member user is the first player in a game to collect or select a specific item in the game environment).

In some implementations, a leader device can be elected among the member devices (e.g., randomly, or based on network characteristics, e.g., the device having the lowest latency to a server handling synchronization of the user devices, etc.) to allow synchronization of real-time events and output among embedded applications in an embedded session. For example, the leader device can be the authority for validating and propagating state changes to the other member devices, e.g., instead of using a server system for such tasks. If the leader device goes offline, the online member devices elect a new leader device, and when the former leader device comes back online, it will be considered a regular (non-leader) device since its leader status was revoked. Such a leader device configuration can allow multi-device shared experiences over a network without the use of server-side synchronization and authority.

In block 320, the embedded interface of the second embedded application is caused to be displayed by the second device. For example, the embedded interface can be displayed in association with the chat interface of the second messaging application similarly as described above. The embedded interface is a user interface to the second embedded application and allows output from the second embedded application be displayed by the second device (e.g., in an embedded view of the embedded interface) and allows user input to be input in the embedded interface to be provided to the second embedded application.

The embedded interface displays output from the second embedded application that is synchronized with the other embedded applications of the member devices in the embedded session. For example, if a media item is being played in the embedded session, then a media item being played by the corresponding embedded applications on other member devices is also played by the second embedded application, synchronized with the member devices. Thus, if the second user has joined an embedded session in which a media item has previously been playing for some time and is currently halfway through its duration, the second embedded application plays the media item starting at the halfway point. For example, this synchronization can provide to the second user an experience of sharing media items and other output of an embedded application with other member users.

In an example using an embedded travel itinerary application, the embedded application can provide an embedded interface that displays information about airplane flights departing from the geographic locations of the member users' devices to the travel destination for specified dates. In some implementations, customized airplane flight information can be displayed in the embedded interface for each member user, where each embedded interface shows only the airplane flight information for the location of the user viewing the information in the embedded interface.

In block 322, an indication is sent over the network that the second user has joined the embedded session. For example, the second messaging application can send the indication of a join event to a session server, and the session server can send the indication of the join event to member devices (and not to chat devices that are not member devices). For example, the session server can send the indication to the first device, as described below with respect to FIG. 4. In some implementations, the second messaging application can send the indication directly to member devices.

During the embedded session, the second device can receive user input from the second user to the embedded application via the embedded interface and/or to the messaging application via the chat interface as described herein. Input can also be received from the other member devices, e.g., via a session server, and/or from one or more servers (e.g., synchronization and other updates to the embedded application from the session server, content data from a content server, etc.). Output can be displayed in the embedded interface and/or in the chat interface.

If the second user has been assigned a user status (e.g., role) within the embedded application and embedded session, then the second user can be enabled by the embedded application to activate one or more functions of the embedded application that are associated with the assigned user status. For example, in an embedded game application, a user assigned a player role can be enabled to perform game actions with user input to affect the state(s) of the game. A user assigned an observer role can be enabled to provide input to perform view functions in the game, e.g., cause display of different player scores, attributes, etc. with user input, but not affect the game states. A user assigned an administrator role or referee role can be enabled to initiate a game, assign player users to different teams, adjudicate a game, etc., but not affect game states. In some implementations, a member user can be assigned a role of a passive observer or an active observer. For example, an active observer status may allow a user to modify states in the embedded application (e.g., game states, playback position of a media item, etc.), or modify some types of states (e.g., guide certain types of game objects, add comments but not change playback position, etc.), while a passive observer may be prevented from modifying any such states. In some examples, a single-player game may allow the first user to be the main character moving through a game environment, facing obstacles, etc. The other member users can be assigned passive observer roles by default, or one or more passive observer users could select to be assigned active observer roles allowing them to affect game states, e.g., instruct enemies in the game to attack or assist the first player's character, directly assist the first player's character, tap on the first player's character to slow it down, etc.

In additional examples, a particular graphical interface for the embedded interface can be displayed on a member device based on a role that has been assigned to the user of that member device, while other member devices of the embedded session may display other graphical interfaces based on different roles (or lack of roles) of their member users. For example, different controls and functions can be displayed in different graphical interfaces for different roles. In some examples, only particular roles can have access to certain features of the embedded application. In an example of an embedded reservation application (e.g., similarly as described above), the first user initiates the embedded reservation application and thus has a "reserver" status allowing that user to finalize the reservation (e.g., pay a reservation fee to reserve a hotel room). The first user selects reservation information such as a destination and itinerary, and the embedded application shares the selected reservation information with the rest of the member devices (e.g., including the second user's device) for display in their embedded interfaces of the embedded reservation application. The second user assists the first user select a hotel room to reserve by selecting or changing reservation information (which is synchronized on all member devices). In this example, only the first user device of the member devices displays a "pay" button in its embedded interface, because the first user set up the embedded application/session and has reserver status. When the pay button is selected by user input, data is caused to be sent to a server to finalize the reservation.

In various implementations, "interactive cards" can be displayed in the chat interface of chat devices of the chat conversation, such as the second user device. An interactive card can be a displayed information area or window that displays information and controls (user input options) related to events, output data (e.g., content data), and input from members users provided in an embedded session of the chat conversation. The information can include text, images, videos, audio output, cinemagraphs, or other types of content data (e.g., captured and stored images of the output displayed in the embedded interface). In some implementations, the interactive card can be displayed in the chat interface of the chat devices, regardless of whether or not a chat device is a member device of the embedded session.

An interactive card can also include one or more displayed input controls which can be selected by user input to cause association actions to be performed by the embedded application. When the control is selected by user input, arguments or parameters of the selected control and/or the interactive card are provided to the embedded application and the embedded application performs the related action(s). In some examples, the notification indicating the initiation of an embedded session as displayed in block 310 can be an interactive card that displays the information described above, including the join option (for non-member users) that, if selected, causes the user device to execute the embedded application and join the embedded session. In some implementations, one or more actions are executed in the embedded application in response to the user joining the embedded session, as described above. In another example, an interactive card can include a displayed control that, when the control is selected by user input, causes the embedded application to start playing a media item, trigger an in-game action (e.g., accept a different user's challenge, unlocking an in-game item, etc.), and/or other actions. The embedded application can display a request in the interactive card for confirmation from the user to perform the association action(s). In some implementations, the information and options in the interactive card can be continually updated based on the current input received from member users (and/or chat users), current output provided by the embedded application, and current processing/states of the embedded application.

In some examples, a media item is being played in an embedded session for a media player embedded application, and an interactive card is displayed in the chat interface of the chat devices related to the playing of the media item. The information and options can be continually updated based on the playback of and commenting on that media item by the chat users of the chat conversation. For example, the interactive card can display an identification of each media item being played or in queue for playback. The information and options in the interactive card can be continually updated based on the playback of and commenting on that media item by the chat users of the chat conversation. For example, the card can display one or more of the following features: identifications (or the number) of the chat users who have watched the media item (if consent from those users has been obtained), identifications (or the number) of the chat users who have commented on the media item (as in block 518 below, if consent from those users has been obtained), a displayed option to comment on the media item for member devices (e.g., as in block 518), and a displayed option to make the card displayed persistently on the user device, e.g., as a reminder to the user to play the media item. If multiple interactive cards are made persistent, a carousel display of cards can be displayed which can be scrolled or rotated to view the multiple cards, e.g., one at a time. Causing a media item to be played in the chat conversation, or commenting on the media item (e.g., as in block 518), updates a corresponding interactive card stored on each chat device, which can be displayed in the chat interface of each chat device of the chat conversation. The interactive card indicates the latest plays and comments for the media item by chat users. In some implementations, selection of the comment option of the interactive card by user input can cause an input field to be displayed, allowing the user to input comments to be displayed in the embedded interface during current and later playbacks of the media item (e.g., as in block 518), and or displayed in the chat interface of the chat conversation during current and later playback of the media item.

In some implementations, interactive cards related to other types of embedded applications can be displayed in the chat interface. For example, an embedded game application and session can cause an interactive card to be displayed indicating one or more of the following, if user consent has been obtained: the number of players and observers in the game, identifications of member users, current scores of players, game objectives achieved, one or more images showing screenshots or portions thereof of game events or objects, a displayed option to input a comment or rating to the game or to a particular player of the game (e.g., to be displayed in the chat interface, and/or in the embedded interface of member devices), a displayed option to make the card displayed persistently on the user device, e.g., as a reminder to the user to join the embedded session, etc. Similar information and displayed options can be displayed in interactive cards for embedded sessions providing content documents, travel itineraries, reservations, shopping, etc.

In some implementations, the second user exiting the embedded session can be implemented similarly to joining the embedded session. For example, the second messaging application receives an indication that the second user is exiting the embedded session, e.g., by exiting the second embedded application, by exiting the chat conversation, or by exiting the second messaging application. The second messaging application sends information to the other member devices (e.g., via a server) indicating that the second user is exiting, so that the other (corresponding) embedded applications executing for the other member devices can update their states (e.g., remove the user identity of the second user from their embedded interfaces, remove the second user as a participant in the embedded session, etc.).

Figure 4:
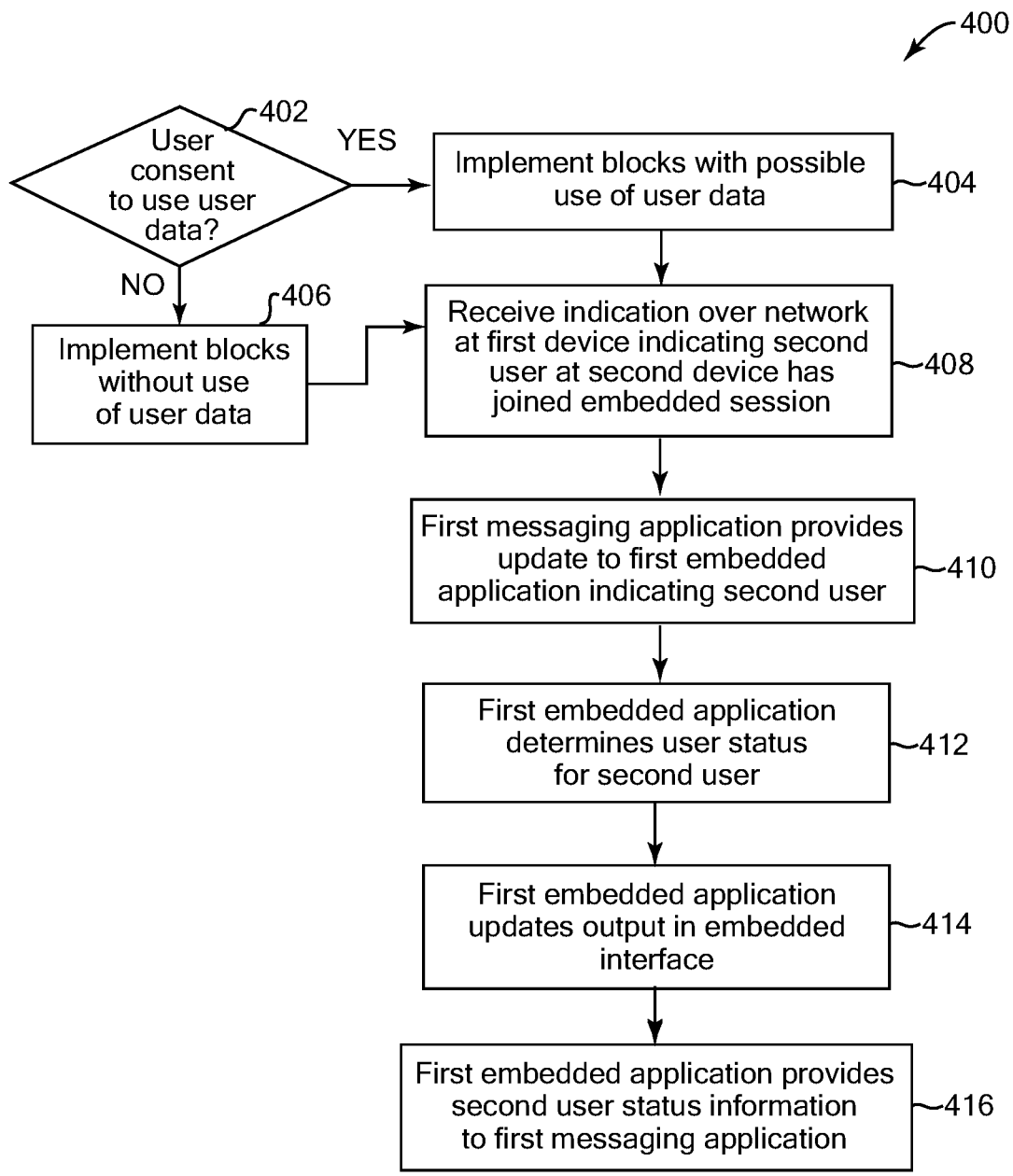
FIG. 4 is a flow diagram illustrating an example method in which a first device processes an event in which a second device has joined an embedded session, according to some implementations.

FIG. 4 is a flow diagram illustrating an example method 400 in which a first device of FIG. 2 processes an event in which a second device has joined an embedded session. In this example, method 400 illustrates blocks performed at the first device in response to the second user joining the embedded session as described with reference to FIG. 3.

In block 402, it is checked whether user consent (e.g., user permission) has been obtained to use user data in the implementation of method 400. For example, user data can include messages sent or received by a user, e.g., using messaging application 103, user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, videos viewed or shared by a user, etc. One or more blocks of the methods described herein may use such user data in some implementations.

If user consent has been obtained from the relevant users for which user data may be used in the method 400, then in block 404, it is determined that the blocks of the methods herein can be implemented with possible use of user data as described for those blocks, and the method continues to block 408. If user consent has not been obtained, it is determined in block 406 that blocks are to be implemented without use of user data, and the method continues to block 408. In some implementations, if user consent has not been obtained, blocks are to be implemented without use of user data and with synthetic data and/or generic or publicly-accessible and publicly-usable data.

In block 408, an indication is received over the network at the first device that indicates the second user and the second device have connected to (joined) the embedded session. For example, the indication may indicate that the second device has downloaded and/or executed a corresponding embedded application for the embedded session (or is in process thereof), e.g., as in block 314 of FIG. 3, and/or that embedded application has synchronized (or is synchronizing) with the embedded session, e.g., as in block 318 of FIG. 3. For example, the indication can include, or be derived from, notification information as described for block 314 of FIG. 3. In some implementations, the first messaging application can receive the indication, which can include notification information in some implementations, as described. The indication can include information indicating the joining event, a user identity of the second user, and any other options selected by or provided for the second user (e.g., user status in the embedded application, etc.). In some implementations, the first messaging application previously obtained user identity information of the second user for the chat conversation, e.g., to display the user identity of the second user in the chat interface of the first device. In some implementations, the indication is received from a server system, e.g., the session server that received the notification information from the second device in block 314 of FIG. 3. In some implementations, the indication is received at the first device directly from the second device (e.g., a peer-to-peer configuration).

In block 410, the first messaging application provides a data update to the first embedded application, where the update indicates the joining of the second user to the embedded session. The embedded application designates the second user as a member user of the embedded session. For example, the update can include user information such as a user identity of the second user, and an indication to add the second user as a participant in the embedded session. In some implementations, the first messaging application has obtained the user identity of the second user and other user information in the chat conversation. In some examples, the user identity can be the chat identity of the second user participating in the chat conversation.

The user information for a particular user (e.g., the second user) can be provided by the first message application to the first embedded application if the first messaging application has obtained consent from the second user to do so. For example, such consent can be included in user information provided for the chat conversation, in some implementations. If no consent from the second user has been obtained, then the user information is not provided to the first embedded application. In some implementations, the first messaging application (or a server application) can anonymize, or partially anonymize, the user information such that the information does not describe the second user nor can be associated with the second user (or only partially describes or is associated with the second user). For example, the second user chat identity can be changed to a generic name or placeholder name such as "User 1," "Friend 1", the initials of the second user, the first name of the second user, etc. In additional examples, the user identity can be the real name of the second user name, a user name previously registered by the second user in the messaging application, a user name previously registered in a contact list or other data stored on and obtained from the second user device (if consent from the second user has been obtained), a user name previously registered in the embedded application, a placeholder name, etc. This information can be provided to and/or determined by the embedded application as a user identity for the embedded session. In some examples, the application may choose the user name to display to other member users in one or more particular contexts of the embedded application and embedded session, where different user names can be displayed in different contexts. For example, contexts can include within the name used in the messaging application and chat interface, the name attached to the second user's messages composed within the messaging application, the name used within the embedded application and its content data, the name attached to chat messages or system messages generated by the embedded application, etc.

In some implementations, the user information can include a user status (e.g., role) selected by or provided for the second user, geographic location of the second device, and/or other information related to the second user, if consent has been obtained from the second user for use of such information. The first embedded application can update its processing based on the addition of the second user, e.g., display the user identity of the second user in the embedded interface, check for input from the second user, etc. In some implementations, the first messaging application also designates the second user as a member user of the embedded session, e.g., updates its own session user list for the embedded session to add the second user identity.

In block 412, the first embedded application (and/or first messaging application) may determine one or more user statuses for the second user. In some implementations, the user status can be determined based on the user information received from the first messaging application, e.g., in block 410. For example, the user information can include a user status for the second user in the embedded session. The user status may have been selected by the second user, and information indicating this selection may have been provided to the first embedded application by the first messaging application. For example, a user role of "observer" for a game embedded application may have been selected by the second user, and the first embedded application assigns this role to the second user.

In some implementations, the first embedded application (and/or the corresponding embedded applications executing on other member devices) can generate the user status or role. In some implementations, a server (e.g., a session server) can generate the user status or role and provide the determined user status to the first messaging application and first embedded application. In some examples, the user status can be assigned based, at least in part, on one or more current states of the first embedded application and/or embedded session. For example, if one or more roles are available to be assigned to a joining user, then the second user (joining user) can be automatically assigned to an available role (e.g., player in a game). If the embedded session does not have any selected roles available, the second user can be assigned to another (e.g., default) role. For example, if the second user selected to be assigned a player role but no player roles are available, the second user can be assigned an observer role. In some implementations, particular states and/or data can be stored (e.g., on a server) from previous embedded sessions that a particular user has participated in, such as user statuses and roles previously assigned to the particular user in previous embedded sessions using the same embedded application, e.g., if privacy and security measures are performed for such states and data. In such implementations, a history of use of embedded applications of the second user can be used in determining a user status or role for the second user, if second user consent has been obtained for such use of user data. For example, if the second user has been a referee role in a threshold number of previous embedded sessions using this embedded application, then that role can be automatically assigned to the second user. In some implementations, the second device can be sent a prompt (e.g., by a member device and/or session server) to allow the second user to accept or reject a particular user status or role that has been automatically assigned to the second user in the embedded session.

In some implementations, other user statuses and roles can be determined for users in an embedded session. For example, a user can be assigned a "controller" or "leader" role if the user initiates the embedded session (e.g., the first user), where the controller is the only user to be able to modify data processed in the embedded session, e.g., change the playback point in a media item, change data in a shared content document, etc. In some examples, the second user can be assigned a handicap or advantage as a player in a game of the embedded application based on history of the second user in previous games similar to the embedded session.

In some implementations, the user status can be determined based on messages and other user input provided in the chat conversation from which the embedded session was initiated. For example, the messaging application can parse the second user's text messages (or text messages derived from second user voice input) to match predefined words or phrases, and/or use other language processing techniques to determine semantic meanings of user input to the chat conversation. For example, the second user may have previously input into the chat conversation, "let's play!" or "I'll watch you two," indicating that the second user intends to be a player role or an observer role, respectively, in the initiated embedded application game. The second user may have input, "I'll show you the place in the video," indicating that the second user should be assigned a controller role that has control over a playback position in a played video in the embedded session.

In some implementations, a member user that is assigned a particular status or role in the embedded session may have a status or role that is changed, and/or may select to change his or her status or role to a different status or role, while continuing to be a member user. For example, a user that is assigned a player role in the embedded session may automatically become an observer user based on certain conditions, e.g., the user's player character has been eliminated in a game, becomes a "ghost" that can only observe and move within the game environment but not act to change objects within the environment, or, e.g., in a 2-player game, the player is offline for longer than a threshold period of time and loses player status, while an online observer user is automatically assigned the player role by the embedded application. In another example, in turn-based games where a player user is only active during their turn, the player may automatically become an observer player when their turn is not currently active. In further examples, predefined additional user statuses or roles may become permanently or temporarily available in an embedded session, and/or existing user statuses or roles may become permanently or temporarily unavailable in the embedded session, during the embedded session. For example, such user status or role changes can occur based on a change in the number of member users currently in the embedded session, a length of time the session has been active, a member user indicating he or she is doing an external task such as answering a phone call, particular events occurring in the embedded application (game events, completion of a shared list, etc.), etc.

In some additional example implementations, a lobby can be provided in the embedded application and embedded interface, e.g., a displayed area listing the member users who do not yet have an assigned role. For example, such users can wait to be assigned a user status or role in a game, e.g., wait for a game to finish, wait for a player user to change to a non-player role, etc. In some examples, a subset of the member users can be associated with a sub-session within the embedded session, where the subset of users interact via the embedded application within the sub-session and other member users have different ability or no ability to interact. For example, an embedded session can include multiple sub-sessions, each sub-session associated with a different subset of the member users. In some examples, each sub-session can be a particular game within a tournament structure executed in the overall embedded session, where each game is executed simultaneously and the winner of each game plays each other in a new game. In some examples, two or more users in a lobby can be associated with each other and/or be assigned particular roles in a sub-session (e.g., individual game) that is initiated in the embedded session. Team-based implementations can also be provided, where users that join the embedded session are assigned to an existing team in a particular game, and each team has multiple players. In some examples, the embedded session can provide multiple games running in parallel, a single game with two players and N observers, a single game with two teams and N players per team, etc. In some implementations, multiple such sub-sessions can be implemented as separate concurrent embedded sessions, each embedded session provided by a single embedded application.

In block 414, the first embedded application updates its output in the embedded interface based on the addition of the second user. For example, a second user identifier can be displayed in the embedded interface, as well as the second user status (user role, etc.).

In block 416, the first embedded application provides determined user status information to the first messaging application. For example, if the first embedded application determined a user role and/or other user status information, this is provided to the first messaging application. In some implementations, the first messaging application can update a session list of users, output the user status information in the chat interface, etc.

In some implementations, the second user exiting the embedded session can be implemented similarly to joining the embedded session. For example, the first device can receive an indication over the network that the second user is exiting the embedded session, e.g. by exiting the second embedded application, by exiting the chat conversation, or by exiting the second messaging application. The first messaging application sends information to the first embedded application indicating that the second user is exiting, so that the first embedded application can update its states (e.g., remove the user identity of the second user from the embedded interface and no longer expect input from the second user).

In some implementations, a user device can cache a state of the embedded application to enable offline mode, where the user device (and/or the messaging application) is no longer visible over the network to the other user devices and server devices. When the user device (and/or messaging application) goes back online, the cached state of the embedded application can be used to synchronize the embedded application with the other member devices and corresponding embedded applications, and provide merge/conflict resolution. In some examples, before the user device loses network connectivity, the embedded application can first write any state changes to storage on the user device. While the user device is online, the local state is constantly synchronized with a server global state stored on a server, where the global state is shared by the instances of the embedded application executing on the member devices in the same chat conversation. On loss of network connectivity, the local state can be accessed and written to by the embedded application on the user device, but no client-to-server synchronization can occur. Once network connectivity is restored to the user device, the local state is synchronized with the global state (e.g., pulling server-side changes and pushing client-side changes) and a merge occurs, using conflict resolution if needed (e.g., using a last-write-wins strategy or other merging strategy). This offers limited offline support, e.g., it provides protection against short-term network disconnections that are common among mobile devices during cell tower switches or environmental changes (such as going underground, etc.). If users are offline for a longer period of time, the local state on the user device may diverge significantly from the server global state.

Figure 5:
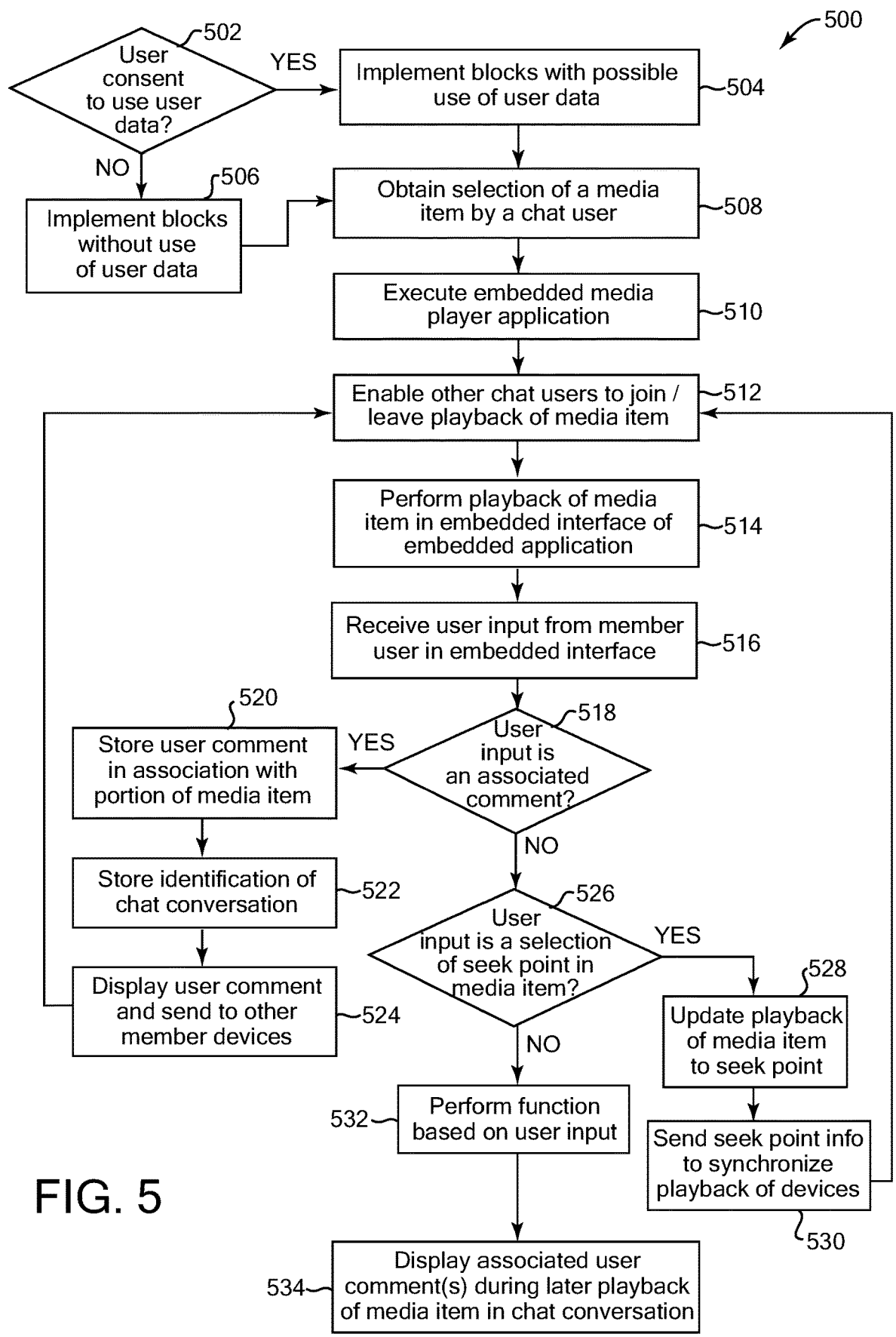
FIG. 5 is a flow diagram illustrating an example method to provide output of a media item using an embedded application in association with a messaging application, according to some implementations.

FIG. 5 is a flow diagram illustrating an example method 500 to provide output of a media item using an embedded application in association with a messaging application. In some examples, method 500 can be implemented similarly as one or more blocks of FIG. 2 in which an embedded application is initiated from a chat conversation and data is processed in an embedded session involving chat users.

In block 502, it is checked whether user consent (e.g., user permission) has been obtained to use user data in the implementation of method 500. For example, user data can include messages sent or received by a user, e.g., using messaging application 103, user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, videos viewed or shared by a user, etc. One or more blocks of the methods described herein may use such user data in some implementations.

If user consent has been obtained from the relevant users for which user data may be used in the method 500, then in block 504, it is determined that the blocks of the methods herein can be implemented with possible use of user data as described for those blocks, and the method continues to block 508. If user consent has not been obtained, it is determined in block 506 that blocks are to be implemented without use of user data, and the method continues to block 508. In some implementations, if user consent has not been obtained, blocks are to be implemented without use of user data and with synthetic data and/or generic or publicly-accessible and publicly-usable data.

In block 508, a selection of a media item by a chat user is obtained, the selection instructing playback (e.g., output) of the media item by a user device. The chat user is participating in a chat conversation with one or more other chat users using devices connected to the user device and each other by a network, where the chat conversation is displayed in a chat interface by a device similarly as the first and second users and first and second devices described above. The media item can be selected in any of various ways. For example, an identifier of the media item can be input via text, voice input, selection of a displayed element or an item from a displayed menu, etc. In some implementations, the media item is selected from within the chat interface, e.g., via text command, interface element displayed in the chat interface, etc. In some implementations, user input can also explicitly indicate to share the media item with the chat conversation by selecting or inputting a share option (e.g., an interface element, text command or parameter, etc.). Sharing the media item can include making the media item available for playback on the other devices by offering an embedded session to the other chat users of the chat conversation. Some implementations can automatically offer the media item in an embedded session in the chat conversation when the media item is selected for output. In some implementations, the media item can be selected within an embedded interface after an embedded media player application is initiated as described in block 510. In some implementations, a bot can be used to select a media item, some examples of which are described below. The method continues to block 510.

In block 510, an embedded media player application is executed (e.g., initiated) in response to the selection of the media item. The embedded media player application is configured to output the selected media item. In some examples, the embedded media player application is downloaded to the user device from a server similarly as described above and executed at least partially on the user device. In some implementations, the embedded media player application can be executed partially or in whole on a device in communication with the user device, e.g., a server, and provide data (e.g., data describing the embedded interface) for display on the user device. The embedded media player application causes display of an associated embedded interface on the user device in association with the chat interface (e.g., similarly as described above) such that one or more chat messages in the chat interface can be displayed during display of the embedded interface. In some implementations, the embedded media player application can be initiated in response to user input instructing that the embedded application be executed without specifying the media item to be played. For example, the media item can then be selected by user input provided to the embedded interface, e.g., after user input browses displayed menus of available media items in the embedded interface, etc. The method continues to block 512.

In block 512, other chat users are enabled to join or leave an embedded session that is initiated in association with the start of the embedded media player application, where the embedded session can include playback of the media item. For example, a notification can be sent to the chat devices participating in the chat conversation and one or more chat users can join the embedded session as member users, similarly as described above for FIGS. 2-4. The method continues to block 514.

In block 514, playback of the selected media item is performed in the embedded interface provided on a display of the user device by the embedded media player application. For example, after selection of the media item in block 510, the playback is initiated at the start of a sequence of content data of the media item, e.g., a first frame of a video data segment and/or first portion of an audio segment. In some examples, the playback can include displaying frames of video data in the embedded interface and/or outputting corresponding audio data as audio from speakers of the user device. In some examples, the playback can include playing a track for video and/or audio, and playback position can refer to the data which is currently displayed or output at a current time point in that track. In some further examples, e.g., in displaying a virtual reality environment or other displayed 3D environment, playback may have a playback position that refers to direction and/or orientation of a displayed point of view (or other reference view) in a 3D environment, in addition or alternatively to a time point. In some cases, the media item content data can be obtained from local storage of the user device, e.g., memory and other storage included in the user device. In some cases, the media item content data can be received over the network, e.g., as a stream of data from another device such as content server 154, a different member device, etc. In some implementations, playback of a video media item can default to muted audio and displaying captions for speech (e.g., where caption data is included in received video data), where the user can select to enable audio output for the video data.

Playback of the media item occurs on the other member devices of the embedded session. In some implementations, a server (e.g., session server or content server) can manage playback of the media item in the embedded session. In some implementations, the content server can stream the content data to a session server or other server, which manages the embedded session and sends an individual stream of the content data to each member device. For example, the session server can send any commands received from the member devices to the content server or can process the commands into particular command for the content server. In some implementations, a content server can stream the content data independently to each member device of the embedded session, and can receive commands based on user input from one or more of the member devices. Changes made to the playback based on the commands (e.g., in later blocks of method 500) can be provided in all the streams to the member devices.

Playback is synchronized among the member devices. In some implementations, the synchronization can be managed by one or more servers. For example, a content server providing the media item as a stream of data to each member device can synchronize each stream of data using synchronization data, e.g., a reference position, such that the playback on each member device is synchronized. In some implementations, a session server can store a reference position (or other synchronization data), such as a reference frame or time position within the media item data sequence, that can be accessed by member devices and/or sent to member devices by the session server. For example, the playback of the media data can be set to a frame (or time point) on each member device equal to the reference position. In some implementations, the synchronization can be managed by one or more of the member devices. For example, one of the member devices (e.g., the user device) can be a reference device that sends synchronization data (e.g., reference positions) to the other member devices that indicates the current position in the media data being played on the user device. The other member devices can adjust the playback of the media item on those devices to synchronize with the reference position of the reference device.

In some examples, a shared playback timer can be used which can be stored and accessed on a database of a device accessible to all member devices (e.g., a session server, content server, or one of the member devices). For example, a single reference value can act as an authoritative playback position (e.g., a global playback position) to which all member devices should synchronize. In some implementations, a tolerance (e.g., threshold amount of time) can be allowed between the global playback position and the playback positions on the member devices, e.g., plus or minus 5 seconds. If a member device's playback position is at a time greater than the tolerance amount, that playback position is updated to the global playback position.

In some implementations, multiple or all member devices can update the shared timer (global playback position) in an averaging manner. For example, during playback, each member device attempts to synchronize with the server each second (or other time unit), which is a "sync point." At each sync point, each member device attempts to increase the global playback position. In some examples, the amount of increase can be determined using the following formula:

$$g' = g + \frac{[\text{Device current playback position}] - [\text{Device previous playback position}]}{[\text{Total number of member devices}]}$$

where g is the global playback position and g' is the increased global playback position. For example, the device previous playback position is at the previous sync point, and the total number of member devices is the number of member devices in the embedded media session (e.g., if all member devices are able to update the global playback position). Thus, each device updates the global playback position by a fractional amount that is based on the increase in playback position of that device since its last sync point, divided by the number of member devices. If the difference between the increased playback position g' and the [Device current playback position] is greater than the tolerance value, the device maintains or changes the playback position to g (and does not commit g'). Otherwise, the device commits g' to the database. The method continues to block 516.

In block 516, user input is received from a member user in an embedded interface. For example, the user input can be received from the user of the member device that initiated the embedded session in block 508, or the user input can be received from a different member user of a different member device. The user input can be received in the embedded interface, e.g., selection of a displayed interface element such as a button, icon, slider control, etc. In some cases, the user input can be received, or partially received, in the chat interface. For example, user input can select an option to input a user comment directly onto the displayed media item, and then further user input can input the user comment in the chat interface, e.g., as text, emoji, rating symbol, etc. The method continues to block 518.

In block 518, it is checked if the received user input is a user comment associated with the playing media item. For example, such an associated user comment is input in the embedded interface such that the user comment is displayed during display of the media item. For example, the user comment can be displayed during the playback for a predefined amount of time after being input. In some examples, the user comment can be superimposed on a display of video data, or otherwise displayed in the embedded interface. In some implementations, the content of the user comment can be input in the chat interface, as described above, and then displayed in the embedded interface. For example, the user input can select an option in the embedded interface to input the comment, and then the comment is input via the chat interface. In some implementations, the user input can also select or point to a particular location at which to display the user comment in a displayed area of the embedded interface, such as a location in a display window or view of the media item. For example, the location can be specified as coordinates of the location of the comment in the displayed view of a video, image, or other media item. In further examples, the user can toggle (e.g., tap) or continuously select one or more of multiple controls displayed in the chat interface or embedded interface that are associated with an emotion or mood of the user (e.g., emoticon buttons). This selection causes an associated image or icon (e.g., emoticon) to be displayed in the embedded interface (as described below) while the user selects the control or until the user again toggles (e.g., taps) the control, which represents the user's emotion at that time in response to the playback of the media item.

If the user input is a user comment, then in block 520, the user comment is stored in association with an identification of the associated portion of the media item that was displayed when the comment was input and/or displayed. In some implementations, the identification of the associated portion includes an identification of the media item (e.g., title, identification value, etc. of the media item). For example, the identification of the associated portion of the media item can indicate the media item context of the user comment. In some examples, if a user comment was input at a time of 1 minute after the start of playback of a 5-minute video segment, then the associated portion of the media item is the content data of the media item at the 1 minute time point of the video segment (e.g., a threshold amount of data before and/or after the 1 minute time point). In some examples, this portion can be identified by the time point, e.g., indicating where the portion starts or a middle point of the portion. In some implementations, the identification can include a duration of the portion. In some implementations, an identification of the user who provided the comment can be stored (e.g., an identification of the user as displayed in the embedded session, or a chat identity in the chat conversation). In some implementations, an indication of a location of the user comment relative to a displayed area of the media item can be stored in association with the user comment. For example, coordinates referencing the area of a displayed embedded interface window, or the area of a media display window in the embedded interface, can indicate the location where the user comment was positioned by the user. The method continues to block 522.

In block 522, identification of the associated chat conversation is stored in association with the user comment. This allows, for example, the user comment (and other user comments input and stored for embedded applications associated with the chat conversation) to be retrieved and displayed during later playback of the media item for users of the same chat conversation (e.g., for member users from the same group of chat users who participated in the chat conversation when the user comment was input). The user comment will not be retrieved and will not be displayed for future playback of the media item in an embedded interface associated with a different, second chat conversation. For example, that second chat conversation can have its own set of associated user comments to display during playback of the media item, which were input to an embedded media player application associated with the second chat conversation. In some implementations, the user comment is not retrieved and displayed for later embedded playback of the media item in other chat conversations or by other users.

In block 524, the user comment is displayed in the embedded interface of the member device at which the user comment was received, and the user comment is sent (e.g., via the messaging application on the user device) to other member devices during the current playback such that the user comment is displayed in the embedded interfaces of the other member devices. In some examples, the user comment is displayed for a predetermined period of time during the playback of the media item before being removed from display in the embedded interface. The period of time can be determined based on user preferences, settings for the embedded session, etc. In some implementations, the user comment is displayed in response to selection of an associated control by the user, e.g., a toggle or continuous pressing of a displayed control as described above, and the user comment is removed from display when the user stops selecting the control or again toggles the control. The method can then continue to block 512 to enable users to join or leave the embedded session and perform playback of the media item in block 514.

If the user input is not a user comment as determined in block 518, then the method continues to block 526 where it is checked whether the user input is a selection of a seek point in the media item. In some examples, the user can select a seek point on a graphical progress bar or timeline displayed in the embedded interface which represents the entire play length of the media item. In other implementations, the seek point can be selected in other ways, e.g., by receiving input specifying a particular time along the timeline, by receiving selection of a fast forward or rewind control that moves the playback forward or back along the timeline, etc.

If the user input is a selection of a seek point, then in block 528, the playback position of the media item is updated to the seek point. For example, in some cases where the seek point has moved the playback position from its former position, the playback of the media item can be discontinued from its former position and continue at the updated seek point. The method continues to block 530.

In block 530, the seek point information is sent to synchronize playback of devices. For example, information describing the seek point, such as a time value of the adjusted seek point or other value, etc., can be sent to the other member devices (e.g., via the messaging application) to synchronize the playback of the media item on those devices with the playback on the member device that received the updated seek point from a user. In some implementations using a shared timer and/or global playback position as described above, the member device overwrites the value of the global playback position (g) with the new value of the playback position at the seek point. The method can then continue to block 512 to enable users to join or leave the embedded session and perform playback of the media item in block 514.

If the user input does not select a seek point as determined in block 526, then the method continues to block 532, where one or more device or application functions can be performed based on the received user input, if applicable. The method can continue to block 512 in some cases. In some implementations, the method continues to block 534 in response to a later playback of the media item.

In block 534, associated user comment(s) that were stored in association with the media item and chat conversation are displayed during later playback of the media item in the same (e.g., ongoing) chat conversation. The associated user comments can be displayed in the embedded interface during the later playback. For example, in some implementations, if the media item received one or more user comments which were stored in association with the media item in blocks 518 to 524, then the associated user comments can be displayed in conjunction with later playback of the associated portions of the media item by a chat user. In some examples, if the media item is played in the embedded interface in the chat conversation (e.g., having the same conversation ID, or having the same participating chat users as when the comment was originally input, or having a subset of the original chat users), and a portion of the media item that is associated with one or more user comments is displayed, then the associated user comments are retrieved from storage and also displayed in the embedded interface along with the associated media item portions. In some examples, the associated user comments can be displayed at the same location in the embedded interface at which they were input, e.g., same coordinates in a playback window, if the interface locations of user comments has been stored. In some examples, after a predetermined time duration or amount of media item data has been played, the associated user comment(s) can be removed from the embedded interface. In some implementations, the user comments can also or alternatively be displayed in the chat conversation of the chat interface during the later playback, e.g., as chat messages. In some implementations, the user comments may be displayed as a list below or next to the display of the media item during playback or accessible via a control on a playback interface in the embedded interface (e.g., switching between comment view and playback view).

In further examples, as described above, user comments may have been stored in association with a period of time of playback of the media item while the user continuously selected or toggled a control, and these user comments can represent the user's emotion or thoughts during the corresponding portion of the media item playback (e.g., via emoticons, images, etc.). With multiple such user comments stored from input from multiple users who previously viewed the media item, this allows synchronization of the thoughts and emotional states of member users who were concurrently watching and commenting on the media item. The user comments for corresponding portions of the media item can be displayed as markers or icons on a time bar or as overlays on the display of the media item (e.g., displayed over video frames), where a user comment can be displayed in full upon selection of an associated marker or icon. Such user comments can register the thought and emotional state changes in users during replay (later playback) of the media item by same or different users within the same chat conversation.

In some implementations, a save feature can be provided to allow a user to save a playing media item for later playback. This can be useful for media items with relatively long durations (e.g., movies or TV shows) that may not often be viewed in chat conversations. In some examples, a user can be allowed, via provided user input, to access an associated repository of unplayed media items, e.g., stored on the user device and/or on a server (e.g., session server or messaging server), allowing that user to play the media items at a desired time, all in succession at one time, etc. For example, the saved media items may have been previously played by other chat users, and the user did not participate in those embedded sessions.

In some examples, each media item played in an embedded session (e.g., initiated by a different chat user) can be associated with a displayed option (e.g., UI element) in the chat interface and/or embedded interface to save the media item for later playback. For example, this option can be displayed in association with a notification received by the user device that indicates that an embedded session is active (and which also can include a join option), as described with reference to FIGS. 2-3. This option can also or alternatively be displayed within an embedded interface, e.g., next to or otherwise in association with a displayed list of identifications of media items playing and to be played in the embedded application. Selection of the option by user input causes that media item to be stored into a queue associated with the selecting user. In some examples, the media item can be stored in a different chat conversation in which the user and a particular bot participate. In some implementations, a user can request to automatically save all media items initiated by other chat users in embedded sessions in a chat conversation. Any media item stored in the queue can be later selected and played in an embedded session for the embedded media player application that is then initiated to play the media item. In some implementations, the embedded interface and/or chat interface can receive comments from the user during the later playback, where the comments are displayed in the embedded interface and/or sent and provided to the chat conversation in which the media item was originally played. In some examples, when a media item from the queue is selected for later playback, a comment control is displayed to enable comments on the selected media item to be input by the user. In some implementations, selection of the comment control can display the originating chat conversation, insert a media item link as a message in the chat conversation, and enable the user to compose comment messages in the chat conversation. In some implementations, a link to a saved or played media item can be displayed as a selectable message in the chat conversation (e.g., an image of a video with a play button, or a text message), such that selection of the message by a chat user causes the media player embedded application to be initiated and the selected media item to be played. Some implementations can provide a similar save feature for other types of content data output in other types of embedded applications, e.g., game data displayed over time (e.g., to record a particular play of a game), document data, travel itineraries, etc.

In various example implementations that can use features described above, a selection of a media item is received in a first chat conversation that includes a plurality of participants. For example, the chat conversation can be implemented on multiple user devices connected by a network. The media item can be provided by a user device and/or a server connected to one or more of the user devices by the network. Playback of the media item is initiated in the first chat conversation such that the media item is displayed by the user devices of the participants. A comment is received from a first participant, the comment being associated with the media item and associated with a particular portion of the media item. The comment is stored, and, after storing the comment, a user device of a second participant is detected displaying the particular portion of the media item. In response to detecting that the user device of the second participant is displaying the particular portion, the comment is caused to be displayed by the user device of the second participant.

Features for these implementations can additionally include displaying the comment by the second participant's user device in response to determining that the second participant is a participant of the first chat conversation in which the first participant was participating in when the comment was received. Storing the comment can include storing identification information that is associated with the comment, where the identification information includes an identification of the first chat conversation. In some examples, the identification information can also include an identification of the media item, and an identification of the particular portion of the media item. The comment can include a rating and/or a user comment. In some examples, the playback of the media item in the first chat conversation is synchronized among the user devices of the participants, e.g., by providing a reference number accessible by the user devices over a network, where each of the user devices attempts to synchronize with the reference number at regular time intervals.

In further examples, initiating the playback can be performed on a first user device of the user devices, and a notification can be provided to one or more other user devices that the playback of the media item has been initiated by the first user device. The other user devices send data (and/or request) to join the playback, and the other user devices are added to an embedded session including the first client device. In response to adding the user devices, the playback of the media item is synchronized on the other user devices to a current playback position on the first client device. In another example, initiating the playback of the media item includes displaying data of the media item in an embedded interface displayed on each of the user devices in association with the chat conversation provided by a messaging application. The embedded interface is provided by an embedded application executing in association with the messaging application.

In some example implementations, a selection of a media item is received on a first client device from a first participant of the participants in a chat conversation. A first command is sent to one or more client devices associated with the participants to initiate playback of the media item. User input is received, indicative of a seek point in the media item on a second client device from a second participant. In response to the user input, a second command is sent to the one or more client devices associated with the plurality of participants to update playback of the media item to the seek point.

For example, the media item can be a first media item. Input can be received from the second participant selecting a second media item, and the second media item can be added to a playlist queue indicating an order of playback of the first media item and the second media item. A synchronization of the playback of the media item can be performed for the first client device and the one or more client devices, including updating a global value indicative of the position of the playback. In some implementations, a notification is provided to the one or more client devices associated with the plurality of participants that the playback of the media item has been initiated, an indication is received that the one or more client devices are to join the playback, the one or more client devices are added to an embedded session including the first client device, and, in response to adding the one or more client devices to the session, the playback of the media item is synchronized on the one or more client devices to a current playback position on the first client device. In some example, initiating the playback of the media item in the first chat conversation includes displaying data of the media item in an embedded interface displayed on each of the user devices in association with the chat conversation provided by a messaging application.

Figure 6:
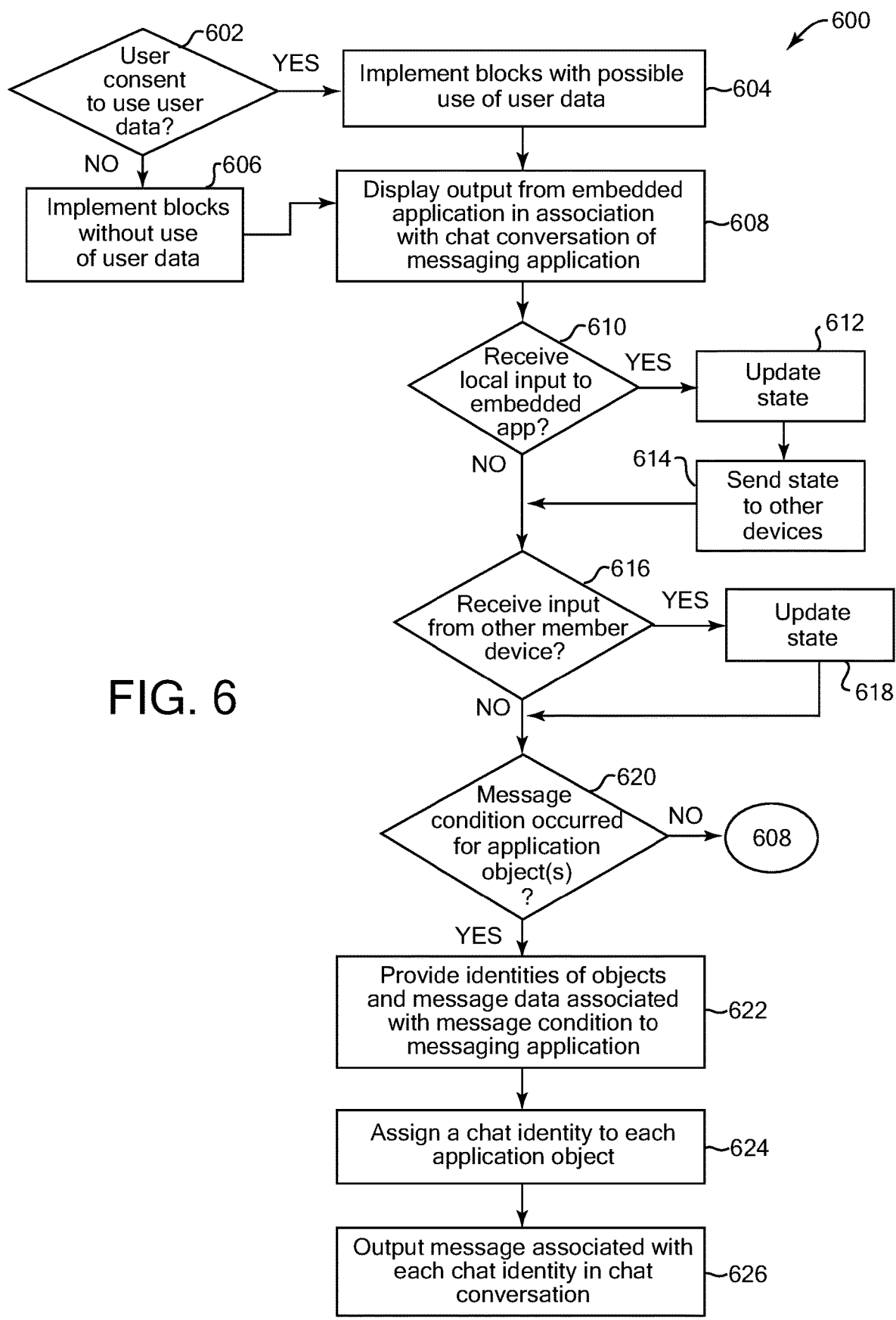
FIG. 6 is a flow diagram illustrating another example method to provide output of an embedded application in association with a messaging application, according to some implementations.

FIG. 6 is a flow diagram illustrating another example method 600 to provide output of an embedded application in association with a messaging application. In some examples, method 600 can be implemented similarly as one or more blocks of FIG. 2 in which an embedded application is initiated from a chat conversation and data is processed in an embedded session involving chat users.

In block 602, it is checked whether user consent (e.g., user permission) has been obtained to use user data in the implementation of method 600. For example, user data can include messages sent or received by a user, e.g., using messaging application 103, user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, videos viewed or shared by a user, etc. One or more blocks of the methods described herein may use such user data in some implementations.

If user consent has been obtained from the relevant users for which user data may be used in the method 600, then in block 604, it is determined that the blocks of the methods herein can be implemented with possible use of user data as described for those blocks, and the method continues to block 608. If user consent has not been obtained, it is determined in block 606 that blocks are to be implemented without use of user data, and the method continues to block 608. In some implementations, if user consent has not been obtained, blocks are to be implemented without use of user data and with synthetic data and/or generic or publicly-accessible and publicly-usable data.

In block 608, an embedded application has been initiated and executes to provide display output in an embedded interface on a user device in association with a messaging application providing a chat conversation, where the user device is one of multiple member devices participating in the chat conversation which have joined an embedded session associated with the embedded game application, similarly as described above for FIGS. 2-4. The method continues to block 610.

In block 610, it is determined whether local input has been received to the embedded application executing on the user device. For example, local input can include user input received from the user of the user device on which the embedded application executes. If local input has been received, the method continues to block 612, where one or more state(s) of the embedded application are updated based on the local input. For example, the local input may include one or more commands to the embedded application which cause one or more application states to be changed. In this example, an application state can include a state that is updated in all the embedded applications of the member devices of the embedded session. For example, in a game application, the update can be to a game state, e.g., a change in position of one or more displayed game objects, a change in score, etc. In a media player application, the update can be to a playback characteristic of a playing media item, e.g., change playback position, stop, pause, rewind, fast forward, etc. In some cases, a state updated at the user device may not be updated at the other member devices, e.g., a change in a view of an environment as displayed in the embedded interface (e.g., a game environment) may not be updated at the other member devices if the view on each member device is independently controlled by the user of that device in that particular embedded application. The method continues to block 614.

In block 614, the updated state is sent to the other member devices of the embedded session, if the updated state is of a type that is updated among the member devices. For example, the embedded application can provide data describing the updated state to the messaging application, and the messaging application can transmit the data to the other member devices of the embedded session. The method continues to block 616.

If local input was not received in block 610, or after block 614, the method continues to block 616, where it is determined whether input has been received from one or more of the other member devices of the embedded session over the network (e.g., remote input). If such input has been received, the method continues to block 618, where the application state is updated based on the input. For example, the input may indicate an updated application state of the corresponding embedded application on a different member device, and the application state of the embedded device on the user device is updated to synchronize with the other member devices. The method continues to block 620.

If input was not received in block 616, or after block 618, the method continues to block 620, where it is determined whether one or more message conditions have occurred in the embedded application or the messaging application for one or more non-user application objects provided in an application environment. For example, the application environment can be a game environment, and the one or more non-user application objects can represent, for example, characters or entities within the game environment that are not controlled by any of the player users in the embedded session, e.g., a non-player game entity that the player users of the game can interact with in the game environment. In another example, application objects (game objects) can include non-player game characters playing with or against the player users of the game, such as a simulated opponent or team member. In another example, the application environment can be a media player environment displaying a media item, and a non-user application object can be a character in displayed content data (e.g., a character in a movie or image). In some examples, the application object can be an assumed character or persona adopted by a bot and displayed as a character.

A non-user application object can be enabled to output a message. For example, if the application object is a character, the message can be in accordance with the character's actions or role in the embedded application and session. In some implementations, multiple different application objects can be implemented in the embedded session that may output different types of messages.

One or more message conditions can be predefined and stored, and can be checked during embedded application execution. The message conditions may cause an associated application object to output a chat message if the message condition occurs. For example, a particular application object can be associated with one or more message conditions, such that if the one or more message conditions occur (or, alternatively, if any one of the one or more message conditions occur), the associated application object(s) are designated to output a predefined message or a message to the chat conversation determined based on a current application state, current member users, etc. A variety of message conditions and/or types of message conditions can be defined to trigger the output of a message by one or more associated non-user application objects. A message condition can include, for example, an event occurring in the application environment which affects the application object (e.g., a player-controlled object colliding with the application object, a user inputting a request addressed to an application character, etc.). A message condition can include, for example, one or more member users joining or exiting the embedded session. A message condition can include, for example, a user action against or assisting a particular character in the application environment.

In some implementations, message conditions can include the input of particular chat messages or types of chat messages by member users in the chat conversation. For example, the input chat messages may refer to an application object. In some examples, if a player user in a game session inputs a message in the chat conversation such as "let's go after that enemy on the left," this message can be parsed and analyzed by the messaging application (or embedded application, other application, or server) and determined to refer to a specific game object. This can satisfy a message condition associated with that game object that is triggered when a player message refers to the game object. If no message condition has occurred, the method can continue to block 608.

If a message condition has occurred as determined in block 620, the method continues to block 622, in which object identities of the application objects which are associated with the message condition are provided from the embedded application to the messaging application. For example, the object identities can be labels that provide names of the application objects as displayed by the embedded application and session, or can be other types of identifiers of application objects. In addition, in some implementations, message data associated with the application object and with the message condition can be provided from the embedded application to the messaging application in block 620. The message data can be text or other form of message (e.g., image, symbols, audio message, etc.) or can be an indication of the message (e.g., a flag or value indicating a particular message or type of message). In some implementations, the embedded application can provide the message condition(s) that were detected to have occurred to the embedded application. The method continues to block 624.

In block 624, the messaging application assigns a chat identity to each application object. In some examples, the chat identity is a chat name that is provided by the embedded game application, or the application object can be assigned a chat name by the messaging application based on data received from the embedded application. In some implementations, the messaging application can determine the message for the application object based on message data provided by the embedded application. For example, the messaging application can receive a value from the embedded application that corresponds to a particular text message in a look-up table or other data structure. In some implementations, the messaging application can receive one or more message conditions that were detected to have occurred in the embedded application, and determine associated messages based on the message conditions. In some examples, the messaging application can send data descriptive of the occurring message conditions to a server that can determine a message for the application object and send the determined message to the messaging application. The method continues to block 626.

In block 626, a message associated with each determined chat identity for an application object is output in the chat interface in the chat conversation. Each chat identity represents an associated application object that provides a message in the chat conversation to chat users (e.g., member users only in some implementations). This allows the member devices of the embedded session to display the message in their chat interfaces and the member users to view the message. In some implementations, the messaging application can output the message in the chat interface of one or more particular member devices and not in the chat interface of other member devices, e.g., a direct message output in the chat interface of one or more particular member devices. For example, if a particular application object is to provide a message to a subset of the member users due to being interacted with by those users in the application environment (e.g., via user-controlled application objects or by direct input from the member users), then the message can be sent to and displayed by the member devices of that subset of users.

The output message can take a variety of forms and can be based on the message condition and a set of stored messages associated with that application object. For example, if the message condition is met by one or more member users joining an embedded game session and the associated game object is a player-enemy game object (e.g., character), the output message for that game object can be, "Another victim!" A similar message condition can be associated with a friendly-to-players game object (e.g., character) which can provide a message such as, "Welcome, User." In another example, in response to a message condition being met by a new user joining the embedded session, an associated application object (e.g., character) can provide assistance to the new user by sending one or more messages including hints or tips for application user (e.g., how to play the game) that are displayed only in the new player's chat interface. In another example, if a message condition is met by an event in the embedded application occurring to an application object, the associated message can include a description of the status of the application object (e.g., a game character that says, "I need help from all of you" or "beware, I am stronger"). In another example, if a message condition is met by a user action against a non-user application character, the non-user character can provide messages such as taunts (e.g., in a game, "your efforts are useless"). In another example, if a message condition is met by user actions that assist a non-user application object (e.g., a character), the application object can provide messages that thank the assisting users (e.g., "your help was greatly needed"). In another example, a message condition can be met by the input of a particular user chat message from a member user in the chat conversation, where the chat message refers to a game object (e.g., "let's go after that enemy on the left"). In response to the message condition being met, the associated message output by a chat identity representing the game object can include text such as, "You will find me a worthy opponent." In some implementations, such messages can include images, emojis, or other types of data.

Examples of Providing Suggested Items in Association with Embedded Applications

Figure 7:
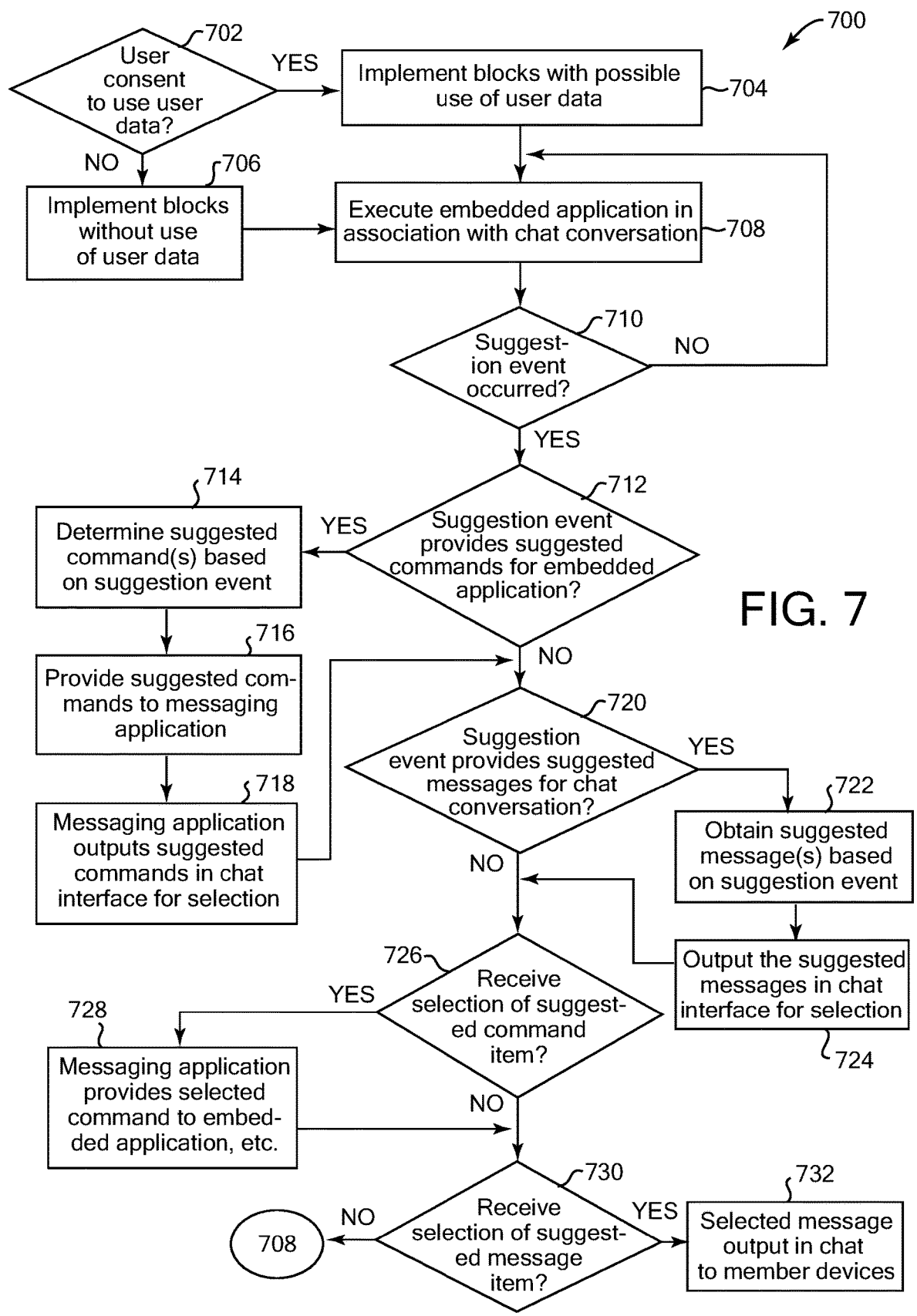
FIG. 7 is a flow diagram illustrating an example method to provide suggested response items in association with an embedded application in a chat conversation, according to some implementations.

FIG. 7 is a flow diagram illustrating an example method 700 to provide suggested response items in association with an embedded application in a chat conversation.

Suggested response items (also referred to as "suggested items" herein) may be generated and provided in the chat interface and/or the embedded interface for selection by a user in a variety of contexts. Suggested response items may be generated and provided to the user automatically, upon consent from the user and one or more other users that sent and/or received the image.

Suggested response items can be determined based on one or more techniques that can provide relevant results to a set of data. In some implementations, suggested response items can be determined based on stored (e.g., in a look-up table or database), predefined associations of suggested response items with particular suggestion events and/or types of suggestion events that have occurred, as described below. Suggested response items can be or include one or more of different content data types, including text, images, animated images (e.g., cinemagraphs), audio segments, video, other types of documents (e.g., spreadsheets, tables, etc.), etc. Suggested response items can also include or be presented as interactive cards. In some implementations, suggested response items can include attached (e.g., lightweight) embedded applications which perform one or more actions or provide output, as described below. Multiple types and suggested responses of these types and features can be presented in a menu (e.g., drop down menu, carousel selection menu, etc.).

In some examples, suggested response items can be determined using one or more machine learning techniques. In some examples, messaging application 103a/103b may implement machine learning or interface with a machine-learning application, e.g., a deep learning model, that can enhance user interaction with messaging application 103. Suggestion server 156, for example, can utilize machine learning to provide suggestions to a messaging application. In some implementations, machine learning can implemented on one or more other components of the environment 100 and, for example, not using suggestion server 156.

A machine learning model can be created, based on training data, prior to receiving a suggestion event for which suggested response items are to be generated, so that upon receiving the indication of an suggestion event, suggested response items can be generated using the existing model. Machine-learning models may be trained using synthetic data or test data, e.g., data that is automatically generated by a computer, with no use of user information. Synthetic data can be based on simulated events occurring in embedded applications and embedded sessions, and responsive commands and messages, where no human users are participants. In some implementations, machine-learning models may be trained using sample data or training data, e.g., commands and messages actually provided by users in response to embedded application and session events and who consent to provide such data for training purposes. Training data is treated before use to remove user identifiers and other user-related information. In some implementations, machine-learning models may be trained based on sample data for which permissions to utilize user data for training have been obtained expressly from users. After the machine learning model is trained, a newly-occurring set of data can be input to the model and the model can provide suggested items based on its training with the sample data. Based on the sample data, the machine-learning model can predict messages and commands to occurring events in an embedded session, which may then be provided as suggested response items. User interaction is enhanced, e.g., by reducing burden on the user to determine a command or compose a message to an application event, by providing a choice of response items that are customized based on the occurring event and the user's context. Some examples of machine-learning application and machine-learning features are described below with reference to FIG. 12.

In some examples, when users provide consent, suggested response items may be customized based on the user's prior activity, e.g., earlier messages provided in a conversation, messages in different conversations, earlier commands provided by the user to the embedded application or to a different embedded application program, etc. For example, such activity may be used to determine an appropriate suggested item for the user, e.g., a playful message or command, a formal message, etc. based on the user's interaction style. In another example, when the user specifies one or more user-preferred languages and/or locales, messaging application 103a/103b may generate suggested items in the user's preferred language. In various examples, suggested items may be text messages, images, multimedia, encoded commands, etc.

In some implementations, machine learning may be implemented on one or more components of environment 100, e.g., suggestion server 156, messaging server 101, client devices 115, either or both messaging server 101 and client devices 115, etc. In some implementations, a simple machine learning model may be implemented on client device 115 (e.g., to permit operation of the model within memory, storage, and processing constraints of client devices) and a complex machine learning model may be implemented on messaging server 101, suggestion server 156, and/or a different server. If a user does not provide consent for use of machine learning techniques, such techniques are not implemented. In some implementations, a user may selectively provide consent for machine learning to be implemented only on a client device 115. In these implementations, machine learning may be implemented on client device 115, such that updates to a machine learning model or user information used by the machine learning model are stored or used locally, and are not shared to other devices such as messaging server 101, servers 135 and 150-156, or other client devices 115.

For the users that provide consent to receiving suggestions, e.g., based on machine-learning techniques, suggestions may be provided by messaging application 103. For example, suggestions may include suggestions of content (e.g., movies, books, etc.), schedules (e.g., available time on a user's calendar), events/venues (e.g., restaurants, concerts, etc.), and so on. In some implementations, if users participating in a chat conversation via their devices provide consent to use of conversation data, suggestions may include suggested message responses to messages input by other chat users that are based on conversation content. For example, if a first user of two users that have consented to suggestions based on conversation content, sends a message "do you want to grab a bite? How about Italian?" a response may be suggested to the second user, e.g., "@assistant lunch, Italian, table for 2." In this example, the suggested response includes a bot (identified by the symbol @ and bot handle assistant). If the second user selects this response, an assistant bot is added to the chat conversation and the message is sent to the bot. A response from the bot may then be displayed in the conversation, and either of the two users may send further messages to the bot. In this example, the assistant bot is not provided access to the content of the chat conversation, and suggested items are generated by the messaging application.

In certain implementations, the content of a suggested item may be customized based on whether a bot is already present in a chat conversation or is able to be incorporated into the chat conversation. For example, if it is determined that a travel bot could be incorporated into the messaging application, a suggested message response to a question about the cost of plane tickets to France could be "Let's ask travel bot!"

In different implementations, suggestions, e.g., suggested messages as described herein, may include one or more of: text (e.g., "Terrific!"), emoji (e.g., a smiley face, a sleepy face, etc.), images (e.g., photos from a user's photo library), text generated based on templates with user data inserted in a field of the template (e.g., "her number is <Phone Number>" where the field "Phone Number" is filled in based on user data, if the user provides access to user data), links (e.g., Uniform Resource Locators), message stickers, etc. In some implementations, suggested messages may be formatted and/or styled, e.g., using colors, fonts, layout, etc. For example, a suggested message that includes a movie recommendation may include descriptive text about the movie, an image from the movie, and a link to buy tickets. In different implementations, suggested messages may be presented as different types of user interface elements, e.g., text boxes, interactive cards, etc.

In various implementations, users are offered control over whether they receive suggested items, what types of suggested items they receive, a frequency of the suggested items, etc. For example, users may decline to receive suggested items altogether, or may choose specific types of suggested items, or to receive suggested items only during certain times of day. In another example, users may choose to receive personalized suggested items. In this example, machine learning may be used to provide suggested items, based on the user's preferences relating to use of their data and use of machine learning techniques.

In block 702, it is checked whether user consent (e.g., user permission) has been obtained to use user data in the implementation of method 700. For example, user data can include messages sent or received by a user, e.g., using messaging application 103, user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, videos viewed or shared by a user, etc. One or more blocks of the methods described herein may use such user data in some implementations.

If user consent has been obtained from the relevant users for which user data may be used in the method 700, then in block 704, it is determined that the blocks of the methods herein can be implemented with possible use of user data as described for those blocks, and the method continues to block 708. If user consent has not been obtained, it is determined in block 706 that blocks are to be implemented without use of user data, and the method continues to block 708. In some implementations, if user consent has not been obtained, blocks are to be implemented without use of user data and with synthetic data and/or generic or publicly-accessible and publicly-usable data.

In block 708, a (first) embedded application is executed for a first user device in association with a (first) messaging application providing a (first) chat conversation, where the first user device is one of multiple user devices participating in the chat conversation and which have joined an embedded session created in association with the chat conversation, similarly as described above for FIGS. 2-4. The user devices are member devices running corresponding embedded applications as described above.

In block 710, it is determined whether a suggestion event has occurred, e.g., an event that can cause one or more suggested response items to be generated as described for FIG. 7. In some implementations, a suggestion event can include an event that occurs in association with an embedded application. Such suggestion events can occur in an embedded application of the embedded session, in the messaging application, in a server used in the embedded session, and/or in a different application or device in communication with the embedded session, member devices, or chat devices. Suggestion events can include reception of user input at a device, a change in state in a program, communication of data between devices, connection of a user device with an embedded session or a device over the network, reception or transmission of data at a device (e.g., between programs, over a network, etc.), detection of content features in media data or other data, detection of particular topics in chat messages, one or more of these events occurring at a previous time (e.g., indicated in historical data), etc. For example, in some implementations, suggestion events can be checked for occurrence in the messaging application (e.g., chat conversation), such as chat users entering or leaving a chat conversation, particular detected content in chat messages input to the chat conversation by chat users, etc. Other examples are described herein. A suggestion event triggers generation of one or more suggested response items that can be presented on a member device (or chat device) in the chat conversation or chat interface and are selectable for use by the user of the device, as described below.

In various implementations, the embedded application and/or messaging application can determine whether an event qualifies as a suggestion event. In some implementations, a suggestion event can be any of multiple predefined types of events in embedded applications, messaging applications, and/or other applications and devices that have been designated to be suggestion events that cause suggested response items to be generated for a user.

In some implementations, suggestion events can be determined based on one or more particular events that occur at one or more of the chat devices that are participating in the chat conversation. For example, such particular events can include user input received by a chat interface and/or by an embedded interface of the first user device and/or of other member devices or chat devices. In some examples, such particular events can be chat user actions and/or member user actions performed in the embedded application based on the user input received by one or more member devices from associated chat user(s) and/or member user(s). The first user device (e.g., first messaging application) can receive indications that particular events have occurred at other devices (e.g., member devices, chat devices, and/or other devices), e.g., by receiving data over the network indicating and/or identifying the particular events.

For example, a suggestion event can be a user joining or leaving the embedded session based on user input at a member device or chat device, or a different action based on user input and affecting one or more states of the embedded session (e.g., affecting one or more states of the corresponding embedded applications running on the member devices for the embedded session). A suggestion event can be an embedded application being selected by a user in the chat interface and/or the embedded application being initiated by a member user. A suggestion event can be an action performed by a member user in the embedded application (e.g., starting playback of a media item, performing a game action, adding or modifying a displayed, shared object provided in the embedded application and displayed in the embedded interface, e.g., a document object, game object, etc.). A suggestion event can be the current display (e.g., in the embedded interface) of a particular user comment that was previously added to a media item by a member user (e.g., as described with reference to FIG. 5). A suggestion event can be a change of an item or element in a shared content document based on local (first user device) or remote (other member/chat device) user input, or other shared data being edited in an embedded application of the embedded session. A suggestion event can be a selection or confirmation of a particular travel itinerary by a member user in an embedded travel itinerary application.

In some implementations, suggestion events can be determined based on one or more particular events that are embedded application events occurring at one or more member devices, e.g., within one or more embedded applications of the embedded session. In some implementations, some types of embedded application events are based on user input, and some types of embedded application events are not based on user input. In some examples, a suggestion event can be based on an embedded application event such as particular content data (e.g., media item data) being played in the embedded application. For example, the particular content data can be one or more content features (or types of content features) that are detected in visual content (e.g., an image or video), or audio content (e.g., an audio segment of data) of a played media item using one or more image recognition and/or voice/audio recognition techniques. For example, the content features can include visual content features (e.g., faces if user consent has been obtained, landscape features, monuments, objects, etc.) and audio content features (e.g., voices, particular sound effects, etc.). The content features can include geographic locations, e.g., provided as metadata with content items such as videos, images, audio segments, games, etc. A suggestion event can be the attainment of (or failure to attain) a particular objective or score in an embedded game application, or attainment of a score difference between a first-place player and the next-place player in a game that is greater than a predefined threshold. A suggestion event can be an opportunity for a player to make a particular action or move in an embedded game application (e.g., a game application waiting on a player action to advance the game state, triggered by a different member user having performed a game action, or triggered by time, non-player events in the game, etc.).

In some implementations, suggestion events can be embedded application events of particular types. For example, user member events can include a chat user starting a new embedded session (e.g., by initiating an embedded application at a chat device), a chat user joining an active embedded session, a member user exiting an active embedded session, or the last member user of an embedded session exiting embedded session and/or otherwise ending an embedded session. Certain designated embedded application events can include starting or ending events, e.g., a game is won by a member user (causing a game to be completed), a content document is created or deleted, a new video starts or ends within a media player application, etc. Synchronize events can include events in which data is provided to member devices to synchronize the embedded applications on the member devices (e.g., an input user action changes a game state, a state is changed of a playback position of a media item played in a media player application, an item on a shared list is changed, etc.). Suggestion events can be defined to be the occurrence of one or more of such defined types of embedded application events.

In some implementations, event information can be sent between applications and/or between chat devices to indicate that particular events (and/or suggestion events) have occurred. For example, event information can be passed from the embedded application to its associated messaging application upon occurrence of a particular event that has occurred in the embedded application. In some implementations or cases, the particular event has occurred in the embedded application, and the event information can indicate the occurrence of the particular event and/or can identify the particular event or the type of the event. For example, the event information can indicate a type of the particular event (e.g., a game action has been performed in a particular game, playback of a media item has been paused or changed to a different playback position, etc.), data associated with the particular event (e.g., time of occurrence of the event, a type of feature being displayed in a played media item that was detected as the event, etc.), circumstances of the particular event (e.g., which member users caused the event or had a role, status, or score affected by the event, etc.). Such particular events can include any of the events described herein, e.g., embedded application events, messaging application events, server events, etc.

In some implementations, event information can be sent from one device to another device over the network, e.g., from a member device (or chat device) to a server device, from a server device to one or more member devices (or chat devices), etc. For example, embedded event information can be from an embedded application indicating an event occurring in the embedded application, server event information can be from a server indicating an event occurring at the server, etc. In some examples, the messaging application on a member device can receive event information from a different device that indicates a particular event has occurred on a different device. In some implementations or cases, the messaging application can determine if an event indicated by the received event information is a suggestion event. In some implementations or cases, the messaging application can pass the event information to an embedded application executing in association with that messaging application, where the embedded application determines if the event indicated by the event information is a suggestion event (and can communicate any resulting suggestion event back to the messaging application).

In some implementations, event information received by the messaging application can indicate that the particular event is a suggested event. For example, the source of the event information may have determined that the particular event qualifies as a suggestion event. In some implementations, the event information can indicate the particular event and the messaging application can determine whether the particular event qualifies as a suggestion event. In some implementations, the messaging application can use such event information to obtain suggested items, e.g., determine one or more suggested items itself and/or send the event information (or a request derived from the event information) to a different program or device to determine suggested items which can be sent back to the messaging application.

In some implementations, suggestion events can be particular events in or provided to the messaging application. For example, a user entering (e.g., logging on, going online) or exiting the chat conversation can be a suggestion event. One or more particular chat messages input by member users in the chat conversation (or a particular set or sequence of chat messages) can be considered a suggestion event. For example, chat messages can be parsed and one or more predetermined topics, words or keywords, and/or phrases can be detected to determine a suggestion event (e.g., "go out to eat," "let's invite User4," "let's watch MovieA," a particular name, address, location, etc.). In some implementations, a machine learning model can be trained in a training stage with synthetic or actual training data and, in an inference stage used in method 700, can be used to process a set of chat messages to predict if a suggestion event has occurred. For example, the model can predict if any particular user actions (e.g., commands or further messages) are likely to be initiated or provided by users based on the content of the set of chat messages, and if such commands are within a threshold probability of occurrence, the input of the set of chat messages (e.g., the input of the last chat message of the set) can be considered a suggestion event.

In some implementations, suggestion events can be particular events in or provided to the messaging application that change one or more states of an embedded application executing on the first device (e.g., which in turn causes a change in one or more states of the corresponding embedded applications executing on the other member devices). For example, user input provided to the messaging application via the chat interface can direct commands to the embedded application (e.g., change playback state of a playing media item, perform a game action, etc., based on text commands input as chat messages in the chat interface). In some implementations, input in the chat interface that are not direct commands to the embedded application can change one or more states of the embedded application. For example, a selection of options for an embedded application may be performed via a menu or interface elements displayed in the chat interface external to the embedded interface. In additional examples, chat messages input in the chat interface may be parsed by an executing embedded application and may cause the embedded application to change one or more of its states to determine or process data, display particular output data, and/or retrieve data from storage, a different device, a network site, etc., as examples described herein.

In some implementations, a suggestion event can be a particular event occurring within a different chat conversation provided by the messaging application that provides the first chat conversation. For example, the particular event can be a user message input in the different chat conversation, particular content of that user message matching predefined words or phrases (or other matches based on machine learning techniques), a user joining or exiting the different chat conversation, etc. In some examples, a chat user of a different chat conversation can input a message indicating interest in joining the first chat conversation, and this message can be detected as a suggestion event to generate a suggested command (e.g., a command to add the users of the different chat conversation to the first chat conversation and/or to the embedded session) or suggested message (e.g., a message to be output in the different chat conversation that greets the other users, invites the users of the different chat conversation to the first chat conversation, etc.).

In some implementations, a suggestion event can be a particular event that is a user action (e.g., input command) instructing the system to generate one or more suggested response items for the user. For example, the user can select an interface element in the embedded interface or the chat interface that is a command to generate one or more general suggested messages or suggested commands. In some examples, such suggested messages can include comments about the embedded application or comments about one or more member users, or such suggested commands can include commands to exit an embedded session, resign a game, etc.

In some implementations, a suggestion event can be based on received data from a different application executing on the user device that is different than the messaging application and embedded application, where the data indicates a particular event has occurred in the different application. For example, a videoconference application can send an indication (e.g., data) to the messaging application indicating that the videoconference has ended, a particular user has joined or exited the videoconference, etc. In some implementations, a suggestion event can be a particular event that has occurred on a server or other device (e.g., in an application executing on the server or other device) that is in communication with the user device over the network and, e.g., is providing data used in the embedded session. For example, the particular event can include user input (e.g., comments or ratings for stored media items) the server has obtained from other user devices not participating in the chat conversation, e.g., user requests for second content data the same as first content data the server is providing to the embedded session, user comments or ratings for the second content data that is being sent to the other user devices, etc.

A suggestion event can include a particular event occurring on the server, e.g., a game event (such as a change in game state, etc.) in a game executed by the server and streamed to member devices over the network, a particular type of content feature being displayed in a media item being streamed to member devices from the server, etc. The messaging application can receive server event information from the server that indicates or describes the particular server event that has occurred, which can qualify as a suggestion event for the messaging application or embedded application.

A suggestion event can include a particular event that occurred at a previous time, if user consent has been obtained. For example, the occurrence of one or more of the particular events described herein can be indicated or described in data stored on one or more devices, with user consent (e.g., a description of device communication, content of chat messages, etc.), and a device can search for such previous particular events in this data.

In block 712, it is determined whether the detected suggestion event is an event (and/or has a type) that is associated with one or more suggested commands for the embedded application. For example, some types of sugges-
tion events can cause generation of suggested response items that are suggested commands for the embedded application.

A suggested command for an embedded application can be, for example, a command to modify one or more states of the embedded application. For example, the suggested command can be a suggested playback command to set a playback position or change a current playback position to a new playback position of a media item that is being played in the embedded application. In further examples, a suggested command can be a command to modify a game state in an embedded game application, e.g., perform a particular game action such as move a game piece or character, change a game display viewpoint, select a game object, etc. A suggested command can be to add, modify or remove a particular item or element of a shared content document (e.g., shared list) provided in the embedded application. Suggestion event types that can provide suggested commands can include, for example, a joining or exiting of one or more member users to or from the embedded session, an action made by a player in a game embedded application, a state of a game in which the game is waiting for an action or move from a player, an event in which a player or player's objects in a game are being interacted with by a different player or player's objects (e.g., an attack or conflict between objects, an offer or request for help from one player to another player, etc.), a detected change in visual or audio content of a media item (e.g., a change from a scene with low movement of objects to a scene having moving objects over a threshold movement speed, a change from a talking scene to an action scene, a change of audio output from lower volume or constant sound to a higher volume over a threshold or sound of rapidly-changing amplitude over a threshold frequency, etc.), a change performed to a shared content document by a different member user (e.g., a suggestion to prompt the user for additional changes or to change back the performed change), a change in the playback position of a played media item, etc.

If the detected suggestion event is of a type that provides one or more suggested commands for the embedded application, then the method continues to block 714, in which one or more suggested commands are obtained and are based, at least in part, on the suggestion event. In some implementations, suggested commands can be based on other factors in addition to or alternative to the suggestion event, e.g., one or more current state(s) of the embedded application and/or messaging application (e.g., current time position of playback in a media item, current game score, current number or identifications of the member users and/or chat users, time of day, etc.). In some examples, the one or more suggested response items may be determined by the embedded application and/or the chat application based on the suggestion event. In some implementations, a user may be provided an option (e.g., displayed interface element) that causes suggested response items to be disabled, e.g., not generated and/or not displayed.

In some implementations, the suggested commands can be determined based on stored, predefined associations of suggested commands with particular suggestion events and/or types of suggestion events. For example, one or more particular types of suggestion events may be associated with one or more particular commands, e.g., in a look-up table or database, such that the associated commands are retrieved based on the detected suggestion event.

In some implementations, the embedded application may implement a recommendation engine (e.g., based on rules used in determining outcomes in the embedded application, other rule sets, decision trees, etc.) to determine the suggested response items. In one example, the suggested response items may be determined based on a decision tree (or other decision construct) in which the states of one or more conditions at nodes of the tree determine the path through the tree to determine suggestion items as end results, where the conditions can include suggestion events and other conditions. In another example, when the embedded application is a rules-based game (e.g., chess, poker, etc.), the suggested response items may be determined based on rules and/or objectives of the game. For example, the suggested response item may be a move (e.g., Bg7, which indicates a movement of a bishop to chess board location g7) in the game. For example, the ruleset or decision tree may determine the move based on predetermined probabilities of winning. In another example, when users permit analysis of user data, the suggested response item may be based on the user's prior accepted suggestions (e.g., the user normally opens a chess game with the move d4, indicating moving the pawn to location d4).

In some implementations, when user permits use of user profile data, the suggested response items may be determined based on user profile data, e.g., user preferences or defaults directly specified by user input and/or inferred based on previous user actions. For example, if the embedded application is a shopping application (e.g., travel app, e-commerce app, etc.), and the suggestion event is that the user has navigated to a "purchase" user interface, the suggested response items may include "pay with credit card," "pay with bank account," "pay with cash," etc. based on the user's profile. Similarly, if user consent has been obtained, other user profile data such as a user's contact information (e.g., address, phone number, email, etc.) may be included in the suggested response items. In some implementations, e.g., when the embedded application is a "quiz" application, the embedded application may provide suggested response items as the multiple choices to answer a quiz question.

In some implementations, suggested commands can be determined using a trained model for the embedded application and/or machine learning techniques as described herein. For example, suggested commands can be a result of an inference stage of the machine-learning model, where the model has been previously trained with particular suggestion events and types of suggestion events and with particular commands input by users in response to those suggestion events as training data, such that the model can produce likely or relevant suggested commands at the inference stage based on a newly-occurring suggestion event. In some implementations, the suggested response items may be determined by a machine-learning application that is trained to provide response items for the specific embedded application. In some examples, a machine learning model used for suggested responses can be trained to recognize various game actions that can be performed in a particular embedded application, where the machine learning model can provide suggested commands in the embedded application that triggers a responsive action in that embedded application, e.g., "build a tower", "move pawn to space D1", "play this video next", etc.

In various implementations, the suggestion event may be analyzed to determine the one or more suggested commands (or other response items). In some implementations, analysis of the suggestion event may include looking up a rule set or decision tree for the suggestion event. In some implementations, analysis of the suggestion event may include determining a state of the embedded application (e.g., a progress level in a game, a user setting related to assistance during a game, etc.) to determine context of the suggestion event.

In some example implementations, the embedded application is playing a media item, and the suggested commands can be provided to modify the playing of the media item. For example, if the suggestion event is a chat user joining the embedded session to view the media item, then a suggested command can be to restart the playback from the start of the media item (e.g., start a video or audio segment from the beginning of the segment), which can allow the new member user to view the media item from the beginning. In some implementations, such a "restart" suggested command can be generated in response to the media item being at a current playback point that is a threshold time period after its start, such that the restart suggested command is not generated if the playback position has been playing for a time period more than the threshold time period (e.g., since the existing member users may not wish to restart a media item that has been playing for a long time). In another example, if the suggestion event is a particular detected type of scene or sequence (e.g., a detected action scene or sequence) that has been detected to have occurred in the media item, suggested commands can include rewinding the playback position a particular amount of time to replay the detected scene or sequence from the start of that scene. Another example suggested command can cause the embedded application to display a prompt or input field to allow the user to input a user comment that is then displayed (e.g., superimposed) on the displayed scene of the played media item (e.g., as described with reference to FIG. 5). In another example, if the suggestion event is a change in the playback position of the media item by another member user, a suggested command can be to undo or revert the change in the playback position to the position it held prior to the change. In another example, if the suggestion event is a change in the playback position, the suggested commands can include one or more further changes in the playback position to the nearest (in one direction or either direction) scene transition, chapter division, segment division, or other marked division in the media file (e.g., commands such as, "adjust to nearest previous chapter heading?" and "adjust to nearest later chapter heading?"). In another example, if the suggestion event is a change in the audio volume output by the media item (e.g., by a threshold amount, or to a volume level above a threshold level), suggested commands can be to raise or lower the volume.

In some example implementations, the embedded application is providing a game, and the suggested commands can be directed to the game. For example, if the suggestion event is a game action by a second player of the game, a suggested command for the first player can cause input of one or more possible actions to the game in response to the game action, e.g., as determined by game algorithms that can evaluate game strategy and actions. In some examples, if the suggestion event is a move of a game piece by an opponent player, the suggested commands can include various possible responding moves of the user's pieces in the game (e.g., in an asynchronous or turn-based game). In another example, if the suggestion event is an invasion of a user's game territory by enemy game pieces, the suggested commands can include commands to move pieces to intercept invaders, defend an invaded location with a player's pieces at the invaded location, etc. In another example, if the suggestion event is another player joining the game, suggested commands can include requesting the new player to join the user's team in the game, and requesting a different player to form a team against the new player. In another example, if the suggestion event is a member user exiting the game (or changing of a player role to an observer role in the game), a suggested command can be to request that the game be paused until a replacement player joins the game. In another example, if the suggestion event is the user's score (or other game objective) differing from (e.g., trailing or leading) other players' scores or objectives by a threshold amount, suggested commands can include sending hints to other players or requesting other players to provide hints to the user, requesting other players to handicap or boost themselves in the game, restarting the game, etc.

In some example implementations, the embedded application is providing a shared object, e.g., a game object in a game, a shared content document such as a list or other document of items, etc. Suggested commands can be commands to change or affect the shared object, e.g., edit, remove, etc. the shared object, change one or more of its characteristics (e.g., type, color, size or dimensions, etc.). For example, if the suggestion event is the initiation of a shared list in the embedded application, a suggested command can be to add, delete, or change an item on the list. In another example, if the suggestion event is the addition of an item to the shared list by a different member user, a suggested command can be to highlight or otherwise graphically indicate the added item in the embedded interface. In some implementations, the highlighting command can be accompanied by suggested text that can be output in the embedded interface or in the chat interface, e.g., "do we need this item?" or "I suggest removing this" (e.g., a suggested message as described below). In another example, if the suggestion event is removal of an item, a suggested command can include outputting text in the embedded interface (or chat interface), e.g., "why did you remove that?" In another example, in response to a suggestion event of highlighting a particular item by the user, suggested commands can include moving the suggested item within the list one, two, or more places, up or down, to the beginning or end, etc.

In additional examples that can be applied to many types of embedded applications, if the suggestion event is a member user joining the embedded session, a suggested command can instruct that control over specified functions of the embedded application be assigned to the new member user, if the new member user has been assigned a user status (e.g., user role) in the embedded application that allows such assigning of control. For example, the suggested command can be to allow the new user a status able to change a playback position of a media item played in the embedded application, change items on a shared list, etc. In some implementations, a suggested command can be to remove such control abilities from a designated user (if the commanding user is able to do so), e.g., if abusive or inappropriate language has been detected by the messaging application (or other program or device) in messages from the designated user in the chat conversation.

Suggested commands can, if user consent has been obtained, also or alternatively be based on a history of prior actions and/or messages performed by the user in the same or similar types of embedded applications and/or for same or similar types of output data (e.g., media items, games, etc.). For example, if the user has previously rewound or skipped the playback of a particular scene or type of scene in a video, a suggested command can be generated which causes the playback position of a currently playing media item to be rewound or moved in the same manner.

Suggested commands can also or alternatively be based on member user input in the (first) chat conversation, as displayed in the chat interface of the messaging application. In various implementations, this user input can considered part of the detected suggestion event, or can be considered external to (e.g., supplementary to) the detected suggestion event. For example, a suggested command can be generated to initiate an embedded session involving an embedded application that implements a media player, a game, a content document, or other functions, based on chat messages that mention such an activity (e.g., "let's watch Funny Movie 2," "let's play Chess," or "we need a shopping list", etc.). In another example, a suggested command can be generated to assign a user status or role to a particular member user in the embedded session if that member user has sent a message in the chat conversation indicating a desired user role (e.g., "I'll play" to indicate a player role, or "I only want to watch" to indicate an observer role). In another example, a suggested command can be generated that moves a playback position for a played media item past a current scene or to a particular later scene if one or more member users have input messages in the chat conversation such as, "let's skip this scene" or "let's watch the car chase."

In some implementations, user data can be used to determine suggested commands and/or suggested messages, if consent to use such user data has been obtained from the user(s) related to or associated with such user data. For example, the current geographic locations of member users or chat users (or their devices) can be obtained by the messaging application and/or provided to the embedded application for use in determining suggested response items. For example, suggested commands can refer to the current geographic locations of users (with user consent), e.g., to instruct an embedded travel itinerary application to provide an itinerary based on current user location. Other types of user data can cause generation of suggested items, if user consent has been obtained. In additional examples, user data such as a list of applications installed on the device (e.g., applications external to the messaging application) can be used to generate suggested items. For example, suggested messages can be generated that recommend one or more applications for use by other chat users in the chat conversation.

In additional examples, user data such as SMS messages and phone calls received by the user device can be used to generate suggested commands to forward or annotate messages. For example, the messaging application intercepts that an SMS message has been received and can generate forwarding or annotation capabilities, e.g., a suggested command and/or suggested message to share that SMS message with the chat conversation, a suggested command to annotate an SMS image to another message (e.g., chat message, email message, etc.) and send it to another user, etc. In another example, the messaging application can detect that a phone call is being received while a user is actively inputting messages in the chat conversation, and the embedded application can generate suggested messages to the chat conversation (e.g., "I'm answering a phone call, will be back"). User data such as fitness tracker information can be used to provide suggested messages that challenge other chat users in the chat conversation to fitness exercises. User data such as current system audio volume/mute state on the user device can be used to provide suggested commands that automatically adjust media playback volume/on-off state before or during playback of the media item. User data such as browsing history can be used to generate suggested commands to display shopping suggestions for the user, e.g., in a browser embedded application. User data such as user account information (e.g., login/password) to particular systems or network sites can be used to provide suggested commands that access those systems in an embedded application. User data such as recently-added users to a contact list (e.g., added within a threshold amount of time from the current time) can be used to provide a suggested command to add one or more of those users to the chat conversation or a suggested command to invite one or more of those users to join a particular embedded session in which the user is participating.

In some implementations, suggested commands can be to the embedded application to cause the embedded application control an external application executing on the first user device or on a different device in communication with the first user device over the network. Some examples of such control are described herein.

Some suggestion event types can cause generation of both suggested commands from blocks 714-718 and suggested messages from blocks 722-724. In some implementations, suggested command items that provide suggested commands can be visually distinguished from suggested message items that provide suggested messages to be output in the chat interface. For example, different colors or highlighting can be used for these types of suggested response items to assist a user in distinguishing the different types of suggested response items.

In some implementations, a plurality of suggested commands can be generated and can be ranked based on one or more predetermined criteria. For example, a ranking score for a suggested command can be based on how likely the suggested command is to be selected in response to the detected suggestion event, e.g., as indicated by the machine learning model and its training based on synthetic or actual data of prior commands provided in response to prior suggestion events. In some implementations, suggested responses can be provided with confidence ratings or rankings which indicate how likely that the suggested response will be selected by the user. For example, such confidence ratings can be based on prior selections by the user (or multiple users) of suggested responses provided for the same or similar suggestion events, if consent from such users has been obtained. In some implementations in which machine learning models are used, the suggested responses may have rankings indicating which responses are most likely to be selected as determined based on the training of the model. A particular number of top-ranked suggested commands can be selected for output on a user device. In some implementations, suggested responses can be displayed in order of their ranking or confidence rating. In an example, a suggested response having a high confidence rating (e.g., over a threshold rating, or within a threshold number of top ratings) may be selected by user input as a command or message that triggers an action in an associated embedded application. In some implementations, after the high-confidence suggested response is generated and before it is selected by user input, the associated embedded application can be pre-loaded (e.g., downloaded in the background and stored in local storage) to the user device and its code initiated. This allows an instant display of output from the embedded application on the user device after the high-confidence suggested response is selected by user input. Such pre-loading of embedded applications can be omitted for lower-confidence (e.g., below threshold) suggested responses since they are less likely to be selected.

In some implementations in which multiple embedded applications can be simultaneously executing for the first user device as described above, one or more suggested commands can be commands provided to multiple or different executing embedded applications.

In some implementations, one or more of the suggested commands can be commands to the messaging application. For example, a suggested command can include a command to the messaging application to add one or more particular chat users to the embedded session, where the particular chat users are specified in the suggested command. For example, such a suggested command can be generated based on a suggestion event that is detected to have occurred by the messaging application (or embedded application) based on one or more chat messages being input by the first user and/or other member user of the member session (e.g., "let's ask Kenny if he wants to join", etc.), or by one or more chat messages input by chat users that are not member users (e.g., "maybe we should join that movie"). The suggested command can be presented to a member user, and/or to a chat user who is not a member user. In some implementations, to determine such a suggestion event, particular chat user names, member user names, names of content data, general words relating to an embedded session (e.g., "movie," "game," etc.) and other words can be detected in chat messages in conjunction with predefined keywords and key phrases, and/or parsing and analysis of chat messages via machine learning techniques. In some implementations, the suggestion event can also or alternatively be a detection by the messaging application that a content item (e.g., a played media item, a game, a content document, etc.) provided in the embedded session (a first embedded session) is the same as a content item being provided to other chat users in a second embedded session concurrently with the display of the content data in the first embedded session. This can cause the messaging application to generate a suggested command to add the member users of the second embedded session to the first embedded session. User comments associated with the content item by chat users outside the embedded session can also be a basis for a suggestion event similarly as described below.

In some implementations, a suggested command to the messaging application can include a command to add a user to the chat conversation of block 708 (e.g., first chat conversation), or add the user to the first chat conversation and the embedded session of block 708 (e.g., the first embedded session). For example, the suggested command can instruct that an external user who is currently not participating in the first chat conversation be added. Such a command, when executed, causes the external users' devices to join the chat conversation. In some examples, the external user can be participating in a different chat conversation that is provided by the first messaging application or provided by a different messaging application in communication with the first messaging application. In some cases, one or more member users of the first embedded session may be participating in the different chat conversation simultaneously with participating in the first embedded session and the first chat conversation, and such member users can be provided the suggested command (e.g., in blocks 716 and 718) to add one or more external users from the different chat conversation. For example, such a suggested command can be generated based on a suggestion event that is detected to have occurred by the messaging application (or embedded application) based on one or more chat messages being input by one or more chat users of the first chat conversation (similarly as described above) and/or by one or more external users of the different chat conversation.

In some implementations, a suggestion event can also or alternatively be a detection by the messaging application that a content item (e.g., a played media item, a game, a content document, etc.) provided in the embedded session is the same as an external content item concurrently being provided to the external users. This causes the messaging application to suggest to add the external users to the first chat conversation. In some implementations, the suggested command can be to add the external users to the first embedded session. In some examples, the suggestion event can be triggered if a current playback position of the content item output by the embedded application is within a threshold amount (of time, data, etc.) of a current playback position of the external content item output to the external users. In some implementations, a suggestion event can also or alternatively be a detection by the messaging application that one or more user comments have been input by one or more external users associated with an external content item being output to the external users, and the external content item is the same as a content item being output by the embedded application. In some examples, a suggestion event can be a detection of a particular type of user comment by the external users, e.g., approval ratings by users for the content data, a reference to one or more of the member users of the first embedded session, etc. Such user comments can cause the messaging application to generate a suggested command to add such external users to the first embedded session (as member users) and/or first chat conversation (as chat users).

In some implementations, if user consent from the relevant users has been obtained, user data can be used to determine a suggestion event causing generation of a suggested command to the messaging application (or other application) to add one or more users (e.g., chat users or external users) to the embedded session or to the chat conversation as described above. For example, user data (e.g., accessible database data or contact list data) can indicate particular users that have one or more particular social relationships with one or more member users (or chat users), and such particular users can be selected to be included in a suggested command to add these users to the embedded session or chat conversation. For example, such particular social relationships can include users that are in the contact lists of member/chat users, users that are in user groups created by member/chat users (e.g., social networking user groups), users within a particular degree of separation from member/chat users, etc.

In some implementations, one or more of the suggested commands can be commands to the first user device to perform one or more tasks external to the messaging application. For example, the tasks can include opening and executing an application external to the messaging application on the first user device, and/or controlling an external application executing on a remote device in communication with the first user device. For example, such an application can include a web browser application, a communication application, a calendar application, a word processing application, a specific application to access a particular Internet service, etc. If the external application is executing on the first user device, it can provide display output on the first user device. The display output can include, for example, information received from a server device in communication with the first user device. In some examples, a suggested command can include a command to open a web browser application, display a user interface of the web browser application on the first user device, instruct the web browser application to access a web page at a particular link, and display the contents of a web page at the particular link in the user interface of the web browser. Use of appropriate communication protocols can be included (e.g., websockets). The particular link can be a link determined based on the suggestion event. In another example, the opened application can be a shopping application that outputs data received from a server indicating an item or service to purchase and providing one or more controls receptive to user input to purchase the item or service, where the item or service is related to the suggestion event.

In some examples, the command can instruct an application to open or initiate on the first user device to display information related to one or more content features included in a content item that is displayed in the embedded interface on the first user device. For example, a suggested command to open or execute an application can be generated based on a suggestion event that is detected to have occurred by the messaging application (or embedded application) based on the output data of the embedded session and/or based on one or more chat messages being input by one or more chat users of the first chat conversation, similarly as described above. In some examples, if user consent has been obtained, content features including visual features (e.g., faces, animals, landscape features, objects, etc. using image recognition techniques), audio features (speech, types of sounds, etc. using audio recognition techniques), or topics (e.g., a subject of a presentation, geographical location of an image or a scene in a video, etc.) can be detected by a system in output data of the embedded application and similar content features can be searched for on accessible sites and databases over the network. For example, if a chat message from a member user includes "I like that coat she's wearing" and the embedded application is displaying output data of a video or image depicting a person with a coat, this combination of the chat message related to the visual feature displayed in the embedded application output can be a suggestion event. This causes the messaging application or embedded application to search for similar coat items in accessible web pages or shopping sites over the network, e.g., by using an image search or text labels determined from one or more image recognition techniques. One or more network sites having matching items can be included in one or more suggested commands. For example, a suggested command can be generated for one or more member users, where the suggested command (if selected) instructs the first user device to open a browser application that displays one of the matched coat items. In some examples, the suggested command can be displayed as a text description of the action(s) it commands, e.g., "Display a website showing the coat."

In other examples, a suggestion event can be detected when the embedded application displays a person giving a lecture, where an identity of the person can be determined (e.g., in metadata of the output data, by detecting a subtitle for the speaker, etc.), and items related to the speaker are searched for and found in content items accessible over the network. In one example, a book written by the speaker is found on a website. A suggested command can be generated for one or more member users, where the suggested command (if selected) instructs the first user device to open a shopping application that displays a description of the book with a selectable option (e.g., displayed element) to purchase the book by the user.

In additional examples, suggested commands can be determined based on one or more images, videos, audio data segments, or other types of content data. For example, a number of images (e.g., representations of media items, items to purchase, etc.) can be displayed in an embedded application, and a suggested command can be to select one or more of the images, where the suggested command is determined based on previous images selected by the user. In another example, a suggested command can be to select a particular color of a clothing item from a list of multiple colors of that clothing item, where the suggestion is based on previous user selections (e.g., where the user previously selected a particular color more frequently than other colors).

In additional examples, a suggestion event can be a user joining a chat conversation, triggering generation of a suggested command in the joining user's chat interface to launch a "discovery embedded application" that (with consent of the chat users) stores and displays, in the chat interface or embedded interface, a history of actions taken and/or content output in the embedded session by the chat users prior to when the joining user joined the chat conversation. For example, the history can include identifications of other embedded applications that have previously been used in the chat conversation (including which embedded sessions are currently ongoing, ongoing shared lists, etc.). In some implementations, the embedded application can display a launch/join control for each of these other embedded applications that initiates the associated other embedded application, allowing the joining user to re-initiate a previous embedded session, join/continue a previous embedded session if it is ongoing, etc. This can allow a new user to discover and catch up on the activities that the group of users in the chat conversation has been doing prior to the new user joining the chat conversation.

In additional examples, a suggestion event can be an external application (e.g., executing on the first user device or a remote device) sending data to the messaging application while a chat conversation is active (e.g., the data can be an indication of an occurrence of an event in a communication application, calendar application, etc.), and a suggested item can be displayed in the chat interface providing a suggested command or suggested message (see below) based on the data (e.g., a suggested command to save the data indicating the event in storage for later review by the user, and/or a suggested message describing the event in text form, which can be selected to be output in the chat conversation). A suggestion event can be a user changing the group information for the chat conversation (e.g., a visual background displayed in the chat interface (wallpaper), chat conversation name or group name, group icon, etc.), and this can trigger a suggestion command to initiate an image editing embedded application that provides controls to the chat users that can create a new wallpaper, e.g., by editing an image in a shared editing interface with the other chat members.

In some implementations, recommendations can be generated in block 714 instead of or in addition to the suggested commands. For example, such a recommendation can describe a particular action that is suggested for the user, but does not initiate a command to cause that action to be performed if the recommendation is selected by the user. Thus, the user would perform the recommended action manually if the user chose to follow the recommendation.

In some implementations, as in the example of FIG. 7, suggested commands can be determined by the embedded application and displayed by the embedded application, e.g., in the embedded interface and/or provided to the messaging application to be displayed in the chat interface. In some implementations, other components of the system can determine suggested commands. For example, the messaging application can determine suggested commands based on, e.g., events in the chat interface and/or based on event information from the embedded application. In some implementations, a server (e.g., messaging server, suggestion server, etc.) can be provided event information and can determine suggested commands. For example, the messaging application can send descriptive information indicating the suggestion event to a server, and the server can determine one or more suggested commands that are provided back to the messaging application.

In some implementations, e.g., when the embedded application does not include suggestion features, the messaging application may provide the suggested response items. For example, if the embedded application is an image-viewer application, the messaging application may provide a suggested command to enhance the image, to download the image, to execute an image search for the image, etc. In some implementations, the suggested commands may be provided by both the embedded application and the chat application. The method continues to block 716.

In block 716, the one or more suggested commands determined in block 714 are provided from the embedded application to the messaging application (if the embedded application generated the suggested commands) on the first user device. In some implementations, the embedded application can send data to the messaging application from which the messaging application can determine one or more suggested commands, instead of or in addition to sending suggested commands to the messaging application. For example, the embedded application can send data describing the suggestion event (e.g., an indication of a user action in the embedded application, a game score, an indication of success or failure achieving a game objective, etc.), and/or can send data providing a context to the suggestion event (e.g., video data, audio data, states of a game, portions of a shared list, etc.). In some implementations, the messaging application can determine suggested commands from this data, and/or can send the data to a suggestion engine, e.g., suggestion server 156, to determine and send back suggested commands based on the data to the messaging application. The method continues to block 718.

In block 718, the messaging application outputs the suggested commands in the chat interface (and/or the embedded application outputs the suggested commands in the embedded interface) for selection, such that the first device displays the suggested commands. In some implementations, the suggested commands can be each displayed as a description of the actions that the suggested command instructs (e.g., "Skip this scene," "Move pawn 3 forward," "add User4 to this movie session", "Display option to purchase a coat", etc.). For example, the suggested commands can be displayed in a list in the chat interface, as selectable messages from a bot, etc. The individual suggested commands can be selectable by the user, e.g., via touchscreen input or other user input. In some implementations, the suggested commands can be displayed as interface elements in the chat interface, e.g., as buttons, in a drop-down menu, etc. Some implementations can display the suggested commands in a persistent area of the chat interface so that the commands do not scroll off the display screen when additional chat messages are displayed in the chat interface. In some implementations, the suggested commands are not displayed to the other chat users of the chat conversation and the member users of the embedded session, e.g., the commands are specific to the first user of the first device. In some implementations, one or more of the suggested commands can be displayed in the chat conversation to all chat devices or member devices, or to a subset of the chat devices or member devices which may have been found relevant to the suggested commands. In some implementations, if one user selects a suggested command, that command is removed from the suggested list of the chat interfaces of all the chat devices.

In some implementations, the suggested commands can have a limited display time before automatically being removed from the chat interface by the messaging application. For example, a predefined time limit can be used, such that the suggested commands are removed after the time limit expires. In some implementations, the suggested commands can be removed based on one or more conditions being met. For example, if a suggestion event or application state caused particular suggested command(s) to be determined and displayed, and that suggestion event or application state is no longer relevant, pending, or valid, then those particular suggested command(s) can be removed from the chat interface. In some examples, if suggested commands present actions in a game responding to another player's action, and the user performs a different action, then those suggested commands are no longer relevant and can be removed. In another example, if an event in a played media item is no longer being displayed, e.g., after a predefined amount of time, then suggested commands reacting to that event can be removed. In some examples, the embedded application can inform the messaging application of new events and states and/or when suggestion events are no longer valid or pending, such that the messaging application can determine when to remove suggested commands from display. The method continues to block 720, described below.

If the suggestion event type does not provide suggested commands as determined in block 712, or after block 718, the method continues to block 720, where it is determined whether the detected suggestion event is an event (e.g., has an event type) that is associated with one or more suggested messages for the chat conversation. For example, some types of suggestion events can provide suggested response items that include suggested messages to be output in the chat conversation. A suggested message can be, for example, a text message that is displayed in the chat interface as if the selecting user has input the message as a chat conversation message. In some implementations, suggestion event types that can provide suggested messages can include one or more of the types of suggested events that can provide suggested commands as described above. In some examples, suggestion event types that can provide suggested messages can include the event examples described above for suggested commands. In some implementations, some types of suggestion events can be designated as providing one or more suggested messages and not providing one or more suggested commands, and vice-versa.

If the detected suggestion event is of a type that provides one or more suggested messages for the chat conversation, then the method continues to block 722, in which one or more suggested messages are obtained based on the suggestion event and/or other conditions. For example, similarly as described for suggested commands (e.g., block 714), the messaging application can determine one or more suggested messages, and/or can send descriptive data to a suggestion server (or other server) which determines and sends back one or more suggested messages to the messaging application, etc. In some implementations, the embedded application can determine one or more suggested messages.

In some implementations, the suggested messages can be determined based on stored, predefined associations of suggested messages with particular suggestion events and/or types of suggestion events, determined using a recommendation engine, determined using a trained model and machine learning techniques, and/or determined using other techniques and features similarly as described herein for suggested commands, e.g., as described for block 714.

In some examples, a suggested message can be a description of the suggestion event that caused the suggested message, or a description of an action that caused the suggestion event. For example, if the first user performs an action in the embedded application that is detected as a suggestion event (e.g., a game action in a game, setting a playback position in a media player application, etc.), the embedded application can provide a suggested message (or provide an indication of the event to the messaging application that provides a suggested message) that describes the action. For example, the suggested message can describe the action performed by the user as "User1 has skipped past the current scene" or "User1 has moved a knight." If the suggested message is selected by the first user (e.g., in block 730 below), the suggested message is output to the chat conversation, e.g., to share the user action with the embedded session and/or the chat conversation.

In some implementations, if the suggestion event is a user action that instructs the system to generate one or more message suggestions about the embedded application and/or embedded session, then various suggested messages can be generated which describe the embedded application and/or the embedded session, e.g., outside the context of a particular user action or particular type of suggestion event. For example, suggested messages can include general comments about the embedded application, e.g., "This game is great!" or "Check this movie out!" etc. Such general messages can also be generated in response to other types of suggestion events.

In some examples, suggested messages can indicate or describe user reactions to a suggestion event. In some implementations, such a suggested message, when selected by a user, can be displayed as a chat message in the chat conversation. Such suggested messages can be text messages, for example. In some examples, suggested messages that describe user reactions can be determined as stored predefined messages that are associated with particular topics, words, or phrases occurring as a basis of the suggestion event, or are associated with particular actions used to detect the suggestion event. In some implementations, a machine learning model can be used that is trained based on synthetic or actual training data, e.g., predetermined synthetic messages or previous actual messages provided by users in reaction to predetermined or previous suggestion events that are the same as the detected suggestion event (e.g., the same types of user actions, chat input, events, etc. that were detected as previous suggestion events).

In some example implementations in which the embedded application is playing a media item, suggested messages can be determined based on the suggestion event. For example, if the suggestion event is a chat user named User2 joining the embedded session to view the media item, then a suggested message can be "welcome User2!". In another example, if the suggestion event is a particular detected type of visual or audio feature or type of scene or sequence (e.g., a detected action scene or sequence) that has been detected in the played media item, suggested messages can include exclamations or observations relevant to the detected type of feature or scene, e.g., "Wow that was great!" or "Cute baby." For example, such message suggestions can be determined based on predefined associations between messages and content features and scenes, and/or with a machine learning model that has been trained using synthetic or actual data including prior content features and prior user comments or responses in reaction to those features. In another example, if the suggestion event is a change in the playback position or output characteristics (e.g., audio volume or visual brightness or contrast) of the media item caused by another member user, a suggested message can be a reaction to the change, such as "good, I was tired of that" or "wait, I wanted to watch that!" In another example, a server event may have been received by the messaging application from a server as described above. In one example, the played media item in the embedded session is a video created by a first member user, User1, the media item has been available for viewing by users from the server, and the server event indicates that a threshold number of approvals by users have been received by the server for the media item. A suggested message for the member users other than the first member user can be "congratulations, User1" or similar praise for the first member user.

In some example implementations in which the embedded application provides a game, the suggested messages can be determined based on the suggestion event related to a game event. For example, if the suggestion event is a game action by a different player of the game, a suggested message can be one or more possible or predefined reaction messages to the game action, e.g., "great move!" or "great answer!" (e.g., to a selection in a quiz game providing a choice of multiple answers). In another example, if the suggestion event is an invasion of a user's game territory by enemy game pieces, the suggested messages can include reactions such as "Hey, don't come after me" or "You'll regret that move!" In another example, if the suggestion event is the user's score becoming different from (e.g., trailing or leading) other players' scores or objectives by a threshold amount or more, suggested messages can include boasts or laments by the player, e.g., "You guys will never catch me." In another example, if the suggestion event is another player joining the game, suggested messages can include a message request to the new player to join the user's team in the game, and/or sending a message request to a different player to form a team against the new player. In another example, if the suggestion event is a member user exiting the game (or has changed from a player role to an observer role in the game), a suggested message can be "Thanks for playing." Such suggested messages can be determined similarly as described above.

In some example implementations in which the embedded application is providing a shared content document (e.g., shared list) of items, the suggested commands can be determined based on the suggestion event related to the list or document. For example, if the suggestion event is the addition of an item (e.g., "steak") to a food list by a different member user, the suggested messages can include messages that inquire about the item or request to remove the item from the list, e.g., "do we need the steak?" or "I suggest removing the steak." In some implementations, the suggested message can be associated with a highlighting command to highlight the item as described above. In another example, if the suggestion event is removal of an item, a suggested message can include outputting text in chat interface, e.g., "why did you remove that item?" Such suggested messages can be determined similarly as described above.

In some example implementations in which the embedded application provides travel itineraries, if the suggestion event is the output of multiple travel itineraries from which to select, suggested messages can include descriptions of the itineraries, requests to other chat users for comments or suggestions as to which itinerary to select, etc.

In another example that can be applied to many types of embedded applications, if the suggestion event is a member user joining the embedded session, a suggested message can be to ask the new member user whether he or she wants control over functions of the embedded application (if the first user has been assigned a user status or role in the embedded application that allows such assigning of control). In some implementations, a suggested message can be to ask a member user to stop using abusive or inappropriate language if the messaging application (or other program or device) has detected such language in messages from the designated user in the chat conversation.

In additional examples, a suggestion event can be the user device receiving a phone call while the user is participating in the chat conversation, and a suggested message can be "Hang on, let me take this call from my boss" for display in the chat conversation. A suggestion event can be the user device receiving a Short Message Service (SMS) message while the user is participating in the chat conversation, and a suggested message can include the content of the SMS message for display in the chat conversation. A suggestion event can be the user device going offline, and a suggested message can include "sorry guys, my phone lost connectivity for a minute." A suggestion event can be the user device alternating between online/offline status, e.g., for a threshold number of times within a threshold time period, during display of a video in an embedded session, and a suggested message can include, "sorry guys my connection is very choppy, I'll watch that video later." A suggestion event can be a chat user exiting a chat conversation (e.g., detected as a server event), and this can trigger generation of a suggested messages to all the other (remaining) chat users, where the suggested messages relate to that user quitting the chat conversation (e.g., "shall we stop the movie?", etc.).

Suggested messages can, if user consent has been obtained, also or alternatively be based on a history of prior messages and/or actions performed by the user in embedded sessions involving that same or similar types of embedded applications and/or for same or similar types of content items (e.g., media items, games, etc.). For example, if the user has previously reacted to a change in playback position of a particular scene or type of scene in a video by sending a message of "Please change it back," then a similar suggested message can be generated in response to the occurrence of a similar suggestion event, where the suggested message provides a similar reaction.

Suggested messages can also or alternatively be based on member user input in the chat conversation, as displayed in the chat interface of the messaging application. For example, if during a game, a member user inputs a message in the chat conversation that says, "help me get this objective," suggested messages can be generated that are "sure, will do" or "I can't help you right now." In another example, if during playback of a media item in the embedded interface, member user inputs, "what time should I start at?" then suggested messages can be generated that indicate various times, such as different chapter headings (e.g., "go to 28:30—The Visit.") or a suggested message can indicate the time or position of a known favorite scene of the user, if user priority history can be accessed with user consent.

Some suggested messages can be associated with one or more suggested commands that have been determined in block 714. If a suggested command is selected by the user, a suggested message associated with that command can be output in the chat interface while the command is provided to the embedded application. In some implementations, such a suggested message can relate to the associated suggested command, e.g., emphasize or explain the command provided. For example, if a suggested command is selected to take an action responding to a different player's previous action in a game, then one or more associated suggested messages can be determined that can accompany that suggested command to emphasize it, such as "Take that!" and "I'm not defeated yet." In another example, if a suggested command is selected to change a playback position for a media item to a new scene, an associated suggested message can explain that change in playback (e.g., "I'm skipping past that scene" or "I got bored with that scene"). Some implementations can similarly display one or more suggested commands in response to a selection of a suggested message. In another example, if there is a discussion or argument between chat users in the chat conversation, one or more of the chat users can be presented with a suggested command to an embedded application to generate a visualization of the discussion, e.g., using other types of content data. For example, the embedded application can generate a cinemagraph or other animated data with a visual representation of the discussion using user profile pictures. Editing options can be presented (e.g., to the user that selected the suggested command) that allow a user to edit the animated data. The embedded application can generate a suggested message that, if selected by the user, causes the animated data to be displayed in the chat conversation as a chat message.

Some suggestion event types can cause generation of both suggested commands from blocks 714-718 and suggested messages from blocks 722-724. In some implementations, suggested commands for the embedded application can be visually distinguished from suggested messages when displayed in the chat interface. In some examples, suggested commands can be displayed with a common first visual feature, and suggested messages can be displayed with a common second visual feature that is different than the first visual feature. For example, a particular color, typeface, highlighting (e.g., boldface text) or other visual feature can be applied to suggested commands, and a different color, typeface, highlighting, or other visual feature can be applied to suggested messages.

In some implementations, a plurality of suggested messages can be generated and can be ranked based on one or more predetermined criteria, similarly to suggested commands as described above. A particular number of top-ranked suggested messages can be selected for output on a user device. The method continues to block 724.

In block 724, the one or more suggested messages obtained in block 722 are output by the messaging application in the chat interface and/or embedded interface. For example, the suggested messages can be displayed in a list in the chat interface and can be selectable by the user, similarly as described above for suggested commands. Some implementations can display the suggested messages in a persistent area of the chat interface so that the suggested messages do not scroll off the display when additional chat messages are displayed in the chat interface.

In some implementations, the suggested messages can have a limited display time before automatically being removed from the chat interface by the messaging application, similarly as described above for the suggested commands. For example, the suggested messages can be removed after a time limit expires and/or based on one or more conditions being met. For example, if a suggestion event or application state caused particular suggested messages(s) to be determined and displayed, and that suggestion event or application state is no longer relevant, pending, or valid, then those particular suggested messages(s) can be removed from the chat interface. In some examples, if suggested messages are in response to a particular action performed by a different user in the embedded application, and that different user performs a different action, then those suggested messages may no longer be relevant and can be removed. In some examples, the embedded application can inform the messaging application of new events and states and/or when suggestion events are no longer valid or pending, such that the messaging application can determine when to remove suggested messages from display. The method continues to block 726, described below.

If the suggestion event type does not provide suggested messages as determined in block 720, or after block 724, the method continues to block 726, where it is determined whether a selection of one or more suggested command items is received in the chat interface. For example, the selection can be received based on user input provided by the user in the chat interface to select displayed suggested command item(s). In some implementations, the embedded interface can display suggested items in the embedded interface where they are responsive to user input for selection, as described above for block 718.

In some implementations, multiple suggested command items can be selected by user input. In some examples, as described above, a selection can be received for a suggested command item, which causes a list of suggested message items to be displayed that are associated with the suggested command item. The user can then select one (or more) of the associated suggested message items. In some implementations, a selection can be received for a suggested message item, which causes a list of suggested command items to be displayed that are associated with the suggested message item. The user can then select one (or more) of the associated suggested command items.

If a selection of one or more suggested command items is received as determined in block 726, then the method continues to block 728, where the messaging application provides one or more selected command(s) to the embedded application which are associated with the selected command item(s). In some cases, one or more selected commands associated with the selected command item are provided to the messaging application and/or the first user device as described above, instead of or in addition to commands provided to the embedded application. In some implementations, multiple commands are associated with a single selected suggested command item. The embedded application, message application, and/or first user device implements the provided command(s). For example, the command may cause a change in state of the embedded application (e.g., change in playback position of a media item, change in position or status of a user-controlled game piece, change in a shared document, etc.). In some implementations, as described herein, the change in state is sent or indicated to one or more servers and/or to the other member devices over the network to allow synchronization of embedded application states in the embedded session. The method continues to block 730.

If a selection of one or more suggested command items is not received as determined in block 726, or after block 728, the method continues to block 730, where it is determined whether a selection of one or more suggested message items is received in the chat interface. For example, the selection can be received based on user input provided by the user in the chat interface to select a displayed suggested message item. In some implementations, multiple suggested message items can be selected by user input. Some implementations can select one or more suggested message items in association with one or more suggested command items as described above.

If a selection of one or more suggested message items is received as determined in block 730, then the method continues to block 732, where the messaging application outputs selected message(s) corresponding to the selected message item to the chat conversation in the chat interface. In some implementations, multiple messages can correspond to a single message item. In some examples, the selected message(s) can be displayed in the chat interface of the (first) device receiving the user selection of the message item, and the selected message(s) can be transmitted over the network to the chat devices participating in the chat conversation and displayed in the chat interfaces of those devices. In some implementations, the selected message(s) can be transmitted to a particular subset of the chat devices for display in their associated chat interfaces, e.g., to member devices in the same embedded session as the first device, to devices of particular chat users based on user selection or preferences, to devices of particular user statuses or roles in the embedded session, to devices on the same team or opposing team in a game of an embedded session, etc.

In some implementations, the number of suggested messages output in the chat conversation can be limited, e.g., so as to reduce the effect of many chat messages crowding the chat interface. For example, the messaging application can impose a maximum number of selected suggested messages that can be output to the chat conversation within a particular period of time, or can impose a minimum amount of time between the output of successive selected suggested messages from a particular member user or from all chat users. Thus, if the selected suggested message does not qualify for output, then the message is not output to the chat conversation in block 732.

If a selection of one or more suggested message items is not received as determined in block 730, or after block 732, the method can continue to block 708 to continue execution of the embedded application.

In some implementations, a particular embedded application can be opened (e.g., minimized in a corner) to continually parse and/or otherwise process chat messages in the chat conversation and provide suggested commands and/or messages based on the chat messages. For example, the embedded application can present suggested messages that are topics, videos, images, cinemagraphs, audio data segments, etc., based on the content of the chat conversation. This can assist a user to post content relevant to the chat conversation. In some of these implementations, suggestion events can be continually being detected based on current chat messages being input by chat users in the chat conversation, and new suggested commands and/or messages can be continually being provided for user selection in the chat interface and/or embedded interface.

In some implementations, suggested responses can be determined and presented to multiple member users (and/or chat users) based on the suggestion event, e.g., displayed on each member device or chat device (or selected member devices or chat devices). In some examples, the suggested responses can be the same suggested commands and/or suggested messages provided on each of the multiple member devices, or different suggested responses can be provided to each of two or more of the member devices. In some examples, member devices of Users 1, 2 and 3 receive a chat message from User 4 of the chat conversation, and each member device (or multiple member devices) of Users 1, 2, and 3 may present a different set of suggested responses (e.g., each set having at least one response different from one or more of the other sets). Each set of suggested responses can be based on the context of the member device presenting the set, e.g., based on the associated chat messages input by the associated user in the chat conversation, a history of chat messages of the associated user (if user consent has been obtained), and/or other factors as described herein. In some examples, the set of suggested responses can be based on one or more particular embedded applications the associated user has been using. For example, if User 4 inputs a chat message, "We need to buy drinks for the party tonight," and if User 2 is a frequent user of a shared list embedded application, the user device of User 2 can provide a suggested command that (when selected) adds an item 'Buy Drinks' to a shopping list in that application. Selecting that suggested command can cause the shared list embedded application to open and can cause the item "Buy Drinks" to be automatically to the shared list of the shared list embedded application. User 3, however, is not a frequent user of the shared list embedded application (e.g., has not used the application more than a threshold number of times within a particular amount of time), and the user device of User 3 does not display that suggested command in this example. The user device (e.g., messaging application) of User 3 may display a different suggested command for a different embedded application that is frequently used by User 3, e.g., a map application that displays a geographical location of businesses at which to purchase drinks. In another example, User 3's device can provide a suggested message that is the same as a previous message previously input or selected by User 3 in response to a similar chat message displayed in the chat conversation (or, alternatively, in any chat conversation) on a previous occasion (e.g., the previous chat message having one or more of same words, the same semantic meaning, etc.).

In some implementations, relevant suggested responses can be determined that are related to one or more particular content items provided in the embedded interface. For example, if member users are using (or have previously used) a shared list embedded application to generate a first list for travel preparation and a second list for party organizing, suggested responses can refer to one of these lists and not the other list, e.g., based on content of chat messages and/or one or more other suggestion events. In some examples, in response to a chat message such as "don't forget to buy drinks for tonight," a machine learning model and/or knowledge graph can determine that "tonight" and "buy drinks" refers to a "party" that the chat members are organizing, and provide a suggested response that (when selected) adds an item "buy drinks" to the corresponding second list for party organizing. In response to a chat message such as "have you booked the plane tickets for our trip," the machine learning and knowledge graph can determine that "plane tickets" and "trips" refer to travel, and provide a suggested response that (when selected) adds an item "book plane tickets" to the corresponding first list for travel preparation.

In some implementations, a suggested response, when selected, can trigger a display of identifications of multiple associated embedded applications, e.g., to allow a user to select a desired embedded application to be executed or to receive data based on the suggested response, thus reducing ambiguity. In some implementations, a suggested response, when selected by a user, can cause display of a request as to which embedded application should be triggered by the selection of the suggested response. In some cases, multiple possible embedded applications that are suitable for a selected suggested response can be displayed, and user input can indicate the embedded application to execute. For example, if a selected suggested response adds an item to a shared list, and two different available embedded applications provide such lists, identifications of these two embedded applications can be displayed and the user can select one of the embedded applications to use.

In some implementations, suggested responses can be displayed within the embedded interface and receive selection from user input while displayed in the embedded interface (e.g., via touch input on a touchscreen, or via a user-controlled cursor positioned in the embedded interface). For example, suggested responses can be displayed in response to occurrence of suggestion events in the embedded application. In some examples, a suggestion event in a game can be a user player causing an opponent player's avatar or game piece to be defeated or removed, and a first set of suggested messages can be displayed on the winning player's member device (e.g., messages bragging about the move), and a second set of suggested messages can be displayed on the losing player's member device (e.g., messages whining about the loss). When selected by user input, such suggested messages cause chat messages indicating the desired content to be provided in the chat conversation. In another example, the suggestion event is a notification in the embedded application and embedded interface of a first user's device that a second user has joined the game, and a suggested response, when selected, causes a taunt or challenge to be output to the second player's user device ("Let's go, User 2," "I'm gonna beat you at this game", etc.) and/or to all member devices (or, alternatively, to all chat devices).

In some implementations, embedded applications (e.g., scripts) can be attached to (associated with) a suggested response by, e.g., being encoded directly in the data of a suggested response or in a user-selectable link (or other displayed selectable control) included in a suggested response. For example, small embedded applications of few hundred kilobytes can be so attached. When the suggested response is selected by the user, the attached embedded application is triggered to open (after decoding), e.g., instead of downloading the embedded application from a source (e.g., embedded application server 150) over the network. In some cases, this feature can eliminate or reduce additional download time of embedded application data, and can provide an immediate execution and display of an embedded interface. In some implementations, the attached embedded application can be a lightweight version and is executed in addition to triggering downloading a more full version of the embedded application in the background of the device that can replace the lightweight version on the device after the downloading has occurred.

In some implementations, an attached embedded application can execute in the background of an operating system (or other software environment) of the device (e.g., in a "headless mode"), which does not cause an embedded interface or other output to be displayed by the embedded application. For example, the attached embedded application can generate suggested responses displayed in the chat interface. Attached embedded applications can provide instant extensions and capabilities to the messaging application that can be created on-the-fly during a chat conversation, e.g., based on messages of a chat conversation and/or associated suggested responses selected by a user. The messaging application can use APIs and capabilities of attached embedded applications without needing to download and execute a corresponding version of the embedded application that, e.g., displays its own associated embedded interface.

In some implementations, an attached embedded application can be associated with or attached to a chat conversation for which it is executed, e.g., in an ongoing association with the chat conversation. For example, the attached embedded application can act as an extension to the chat conversation, e.g., where the embedded application executes in the background while the chat conversation is open and/or displayed on the device. Such an attached embedded application can process chat messages that are input to the chat conversation and perform actions in response to chat messages, e.g., provide auto-replies to certain types of chat messages, auto-translate chat messages into a different language, provide always-on location sharing (indicating a current geographic location of the user device) while the messaging application is open (with user consent), add displayed graphical interface elements to the chat interface, etc. In some examples, the chat messages of the chat conversation can be auto-translated into and displayed as messages in a different language, e.g., by having an attached embedded translation application as an extension of the messaging application. Extension embedded applications can augment a camera application or image picker application, e.g., to modify media items such as images before such media items are shared with other devices in a chat conversation or via a different embedded application. In further examples, an extension embedded application can anonymize a chat conversation or particular users in the chat conversation (e.g., change the displayed user identifiers of the chat users), reorder the display of chat messages in the conversation (e.g., group the messages by theme, by threads including successive replies to an original chat message, etc.), enable functions in the chat interface accessible to user input (e.g., displayed controls to pin chat messages or media items posted in the chat conversation to be persistently displayed in a display area of the chat interface, or controls to attach comments to media messages that are stored, e.g., in a shared database).

In some implementations, an attached embedded application provides a one-time execution for the chat conversation, e.g., to modify and re-share an image input to the chat conversation, or a one-time translation of a chat message. In some implementations, such embedded application extensions and/or one-time scripts can be downloaded from a server, or can be directly attached to user-selectable chat messages or suggested responses (links) (e.g., as encoded scripts provided as a parameter of a web address (e.g., Uniform Resource Locator (URL)).

In a similar manner, attached embedded applications (e.g., small-sized applications that use a few hundred KB of memory) can be encoded in the data of a selectable link in a chat message or in the data for an interactive card that is displayed in the chat interface or chat conversation, and can be executed upon selection of that chat message link or control in the interactive card.

In some implementations, suggested responses can be generated based on suggestion events occurring at external devices or programs outside the messaging application and the chat conversation, e.g., as described above, and the suggested responses can provide commands and/or messages output to the external devices or programs. For example, an embedded application can communicate with an online game (e.g., a game executing on a server), and commands input to the embedded application can affect the state of the game, e.g., be conveyed to the game server. If an event occurs in the game which can be responded to by the first user providing input to the embedded application, a suggested response can include an action providing input to the embedded application that will cause a responsive user action in the online game.

In some implementations, suggested responses can be generated based on suggestion events and/or particular events that occurred in the past, if consent of the applicable users has been obtained to do so. The previous events can be indicated or described in stored historical data, for example. In some examples, a log of previous chat messages input in a previous chat conversation between two users can be used to determine messages to be included as newly-generated suggested responses for a current chat conversation that includes the same two users. A suggested response can be based on a prior history describing a particular user's performance in an embedded game application, such as previous objectives or scores attained by the user in the game. For example, a suggested message of "You're doing better than before!" can be displayed for User 1 based on User 2's current score in the game being higher as compared to User 2's previous score in a previous game in that embedded game application. Recorded previous interactions between users in embedded applications can also be used to generate suggested responses, if user consent has been obtained. For example, previous user interactions in a game application can be used to generate a new suggested game action that was successful in a previous game, and/or generate a suggested message (e.g., "I'm doing better than you this time"), or previous user contributions to a shared document application can be used to generate a suggested command to add the same contributions to a new shared document, etc. In another example, if it is determined that an addition of a list item was previously made by a user to a first shared list in an embedded list application, as described in stored historical data, a suggested command can be generated for that user with respect to a newly-created, second shared list that, e.g., has the same or similar label or title as the first list. For example, the suggested command, when selected, adds the same list item to the second list, where the second list has been determined to have the same label (e.g., "Shopping List") as the first list.

In some implementations, the number of displayed suggested responses can be limited, e.g., by consolidating multiple suggested responses into a single suggested response that is displayed. For example, a single suggested response can, when selected, cause multiple actions or inputs to one or more applications (embedded applications, messaging application, server, etc.). In some examples, a suggestion event is the input of a chat message "Don't forget Timmy's birthday on Friday" by a different chat user in the chat conversation. Determined suggested responses to this chat message can include a suggested message "don't worry" (chat message), a suggested command to add 'Timmy's Birthday' to the first user's calendar, a suggested command to set an alarm or reminder on the first device to activate on Timmy's birthday, and a suggested command to add an item 'Buy a present for Timmy's birthday' to a shopping list in a list embedded application. These three suggested commands trigger actions in embedded applications and/or bots. However, the three suggested commands may occupy a large amount of screen real estate and so can be combined into a displayed consolidated suggested command, e.g., "Set reminders for Timmy's birthday." When selected by user input, this consolidated suggested command causes a selection menu to be displayed that includes the three individual suggested commands. Any or all of these individual suggested commands can be selected by user input.

In some implementations, suggested response items determined for a first chat conversation can, when selected by user input, provide commands or messages to a different, second chat conversation, e.g., implemented by the messaging application (or a different application). Users may be participating in multiple chat conversations in parallel, and selected suggested responses in one chat conversation can trigger actions in a different chat conversation. For example, in a first chat conversation between User 1 and User 2, User 1 inputs the chat message, "User 2, don't forget Timmy's present for his birthday." This message may be a suggestion event that causes a suggested response (command) to be generated on the device of User 2. When this suggested response is selected by user input, an item "Buy present for Timmy" is added to a birthday list that has been created in an embedded application in a second chat conversation in which User 2 is participating. In another example, User 1 and User 2 are inputting chat messages in a first chat conversation about a game that User 1 is playing in a second group conversation, and a suggested response is generated that, when selected by User 1, causes a particular chat message (or other displayed prompt) to be output in the first chat conversation. For example, the particular chat message can invite User 2 to join the game in the first chat conversation, or cause display of an interactive card on User 2's device that includes a displayed join control.

In some implementations, suggested responses may be customized based on embedded applications that have been executed at least once by the first device. In some implementations, suggested responses may be customized for a chat conversation based on embedded applications that have been executed at least once by the first device in that same chat conversation. In some implementations, suggested responses may be customized based on embedded applications that have been executed at least once by a device of one or more member users, or in some implementations by the device of one or more chat users. For example, a command or message to an embedded application can be provided as a suggested response on a device (in response to a suggestion event) if that embedded application has been executed previously by that device. In some examples, if the first device has previously executed a shared list embedded application, then when a chat user inputs chat messages in the chat conversation that include particular items (e.g., words, images, or other content data) related to event organizing or recommendations, a suggested response can be generated on the first device that is a command to add those particular items to an existing or new list in the shared list embedded application. In some examples, member devices that did not previously execute the shared list embedded application would not display the suggested response related to the shared list embedded application. In some implementations, if any member device (or chat device) has previously executed the embedded application, the suggested command or message can be provided on one, some, or all member devices (or chat devices).

In some implementations, one or more suggested response items can be generated based on invoking or requesting information from one or more bots accessible to the device providing the suggested response items. For example, if the suggested item generation component (e.g., suggestion server or other component of the system) determines that an appropriate suggested item would be particular information relevant to the content of a played media item, a bot that can obtain that information can be determined and a command and/or request to the bot can be generated as a suggested item.

In some implementations, if a selected suggested response item is a command or request to a bot, the bot can be added to the chat conversation and obtains and displays requested information in the chat interface, and the users can send further messages to the bot.

In various example implementations that use features described above, a chat interface can be displayed by a first user device as generated by a messaging application as described above. The chat interface is configured to display one or more messages provided in a chat conversation configured to display messages provided by user devices participating in the chat conversation over a network. An embedded interface is provided by a first embedded application and displayed in the chat interface. A suggestion event is determined to have occurred in association with the first embedded application (or the messaging application), e.g., based on received data that indicates that a particular event has occurred at one or more of the plurality of user devices that are participating in the chat conversation, wherein the one or more of the plurality of user devices are different than the first user device. The first user device (e.g., the messaging application) obtains one or more suggested response items based on the suggestion event, and the suggested response items are displayed by the first user device.

For example, the particular event can include user input received by an associated chat interface of the one or more of the plurality of user devices, user input received by an associated embedded interface of the one or more of the plurality of user devices, an embedded application event occurring in an associated embedded application executing on the one or more of the plurality of user devices, etc. The received data can indicate a type of content feature displayed in a media item being played by the first embedded application, achievement of a predefined objective in a game of the first embedded application, user input received by a receiving user device participating in the chat conversation, initiation of the embedded application from a particular user device of the plurality of user devices, etc. The received data can include chat messages. The suggestion event can be based on, e.g., user input received in the chat interface and/or in the embedded interface, and/or based on event information from the first embedded application indicating that a particular event has occurred in the first embedded application (and/or occurred in a corresponding embedded application executing on a different chat device). The one or more suggested response items can be determined by the embedded application, the messaging application, and/or a remote server in communication with the messaging application over the network. In some examples, the embedded interface can be output on a subset of the user devices participating in the chat conversation, where the user devices received a user selection to join an embedded session involving the first embedded application. The first embedded application can display embedded output data that is generated by the first embedded application and/or received from a server over the network.

Features for such implementations can include receiving user input selecting a selected suggested response item from the suggested response items, outputting a chat message associated with the selected suggested response item in the chat conversation of the chat interface of the first user device, e.g., such that the chat message is displayed by one or more other user devices of the user devices participating in the chat conversation. For example, the suggested response items can include one or more chat messages that indicate user reactions to the suggestion event, and/or can include one or more commands provided to the embedded application and/or to the messaging application. In some examples, a command to the embedded application can include a command to perform an action in a game implemented by the embedded application, a command to change a playback position in a playing of media data by the embedded application, and/or a command to change a shared object provided by the embedded application. In some examples, the suggested response items providing suggested commands are visually distinguished from the suggested response items providing suggested messages when displayed in the chat interface.

In further examples, the first embedded application can be a media player application causing display of video data (or other content data) in the embedded interface that is displayed by a subset of the user devices participating in the chat conversation, where the embedded interface is configured to receive user input controlling the playback of the video data, and the suggested response items can include one or more suggested playback commands operative to adjust the playback of the video data. In another example, the first embedded application can be a game application causing display of game data in the embedded interface that is displayed by a subset of the user devices participating in the chat conversation, where the embedded interface is configured to receive user input that changes one or more states of the game application, and the suggested response items can include one or more suggested commands operative to modify at least one state of the game application. In another example, the first embedded application can be a shared document application causing display of a shared content document (e.g., list of items) in the embedded interface that is displayed by a subset of the user devices participating in the chat conversation, where the embedded interface is configured to receive user input that changes one or more items in the shared document, and the suggested response items include one or more suggested commands operative to modify the shared document.

In additional examples, a server device can receive join indications (or requests) over the network from chat devices that have initiated an embedded application associated with an existing embedded session. The join indications are sent by the server device to other chat devices (member devices) over the network that are in the embedded session to synchronize the joining devices with the member devices of the embedded session.

The methods, blocks, and operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

In various implementations, a messaging application, an embedded application running in association with a messaging application, and/or a server in communication with the messaging application may perform one or more blocks of the described methods.

FIGS. 8A-8E are graphic representations of example user interfaces displayed by user devices, e.g., client devices. In these examples, a messaging application is used for a chat conversation between users and an embedded media player application is used in association with the messaging application.

Figure 8B:
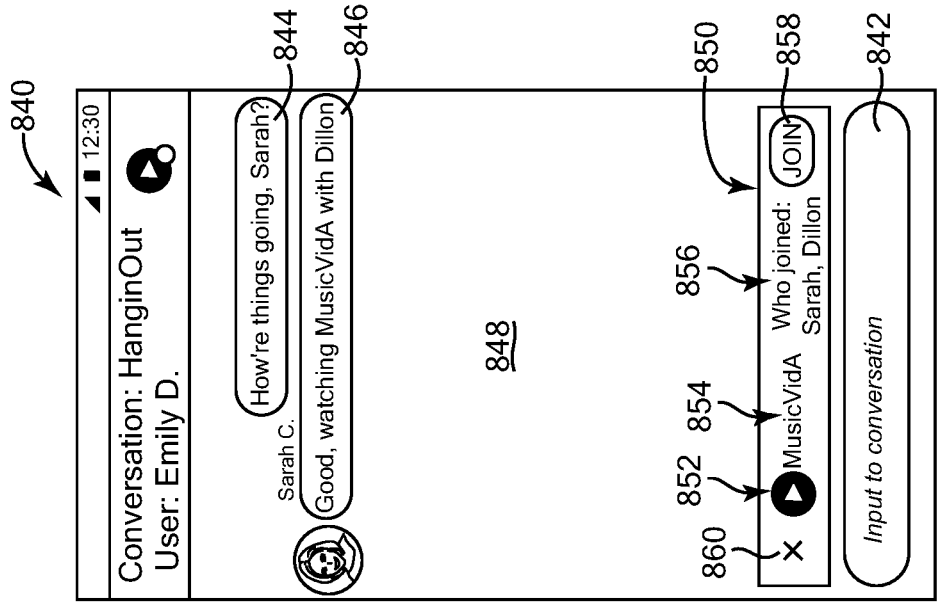
Figure 8A:
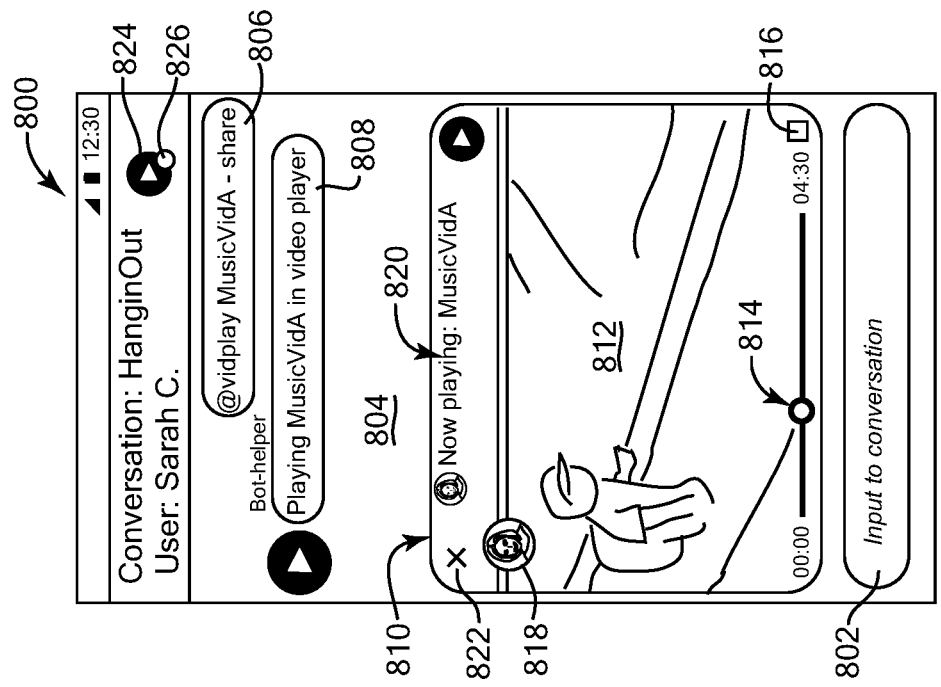

In FIG. 8A, an example of a first chat interface 800 of a first messaging application is displayed on a first user device operated by a first user (e.g., "Sarah C."). In this example, a chat conversation "HanginOut" has been initiated that includes participation of the first user and first device, as well as participation of one or more other users and user devices. Chat messages from the chat users to the chat conversation can be input at respective user devices, sent to the first user device if applicable, and displayed in the chat interface by the messaging application. For example, chat messages from the first user can be input in an input field 802 of the chat interface 800 (e.g., via input devices such as a physical keyboard, displayed touchscreen keyboard, voice input, etc.). The chat messages can be displayed in a message display area 804 the chat interface 800.

In this example, the first user has input a command in the input field 802, where the received command is displayed as message 806 in the chat interface after being input. This command specifies an embedded interface to be displayed in association with the chat conversation. In this example, the embedded interface is provided by an embedded application that is a video player "vidplay" executing on the first device. The command also specifies a media item to play with the video player application, a video segment "MusicVidA." The command also has a "share" parameter to cause the playing of the video to be shared in the chat conversation as an embedded session. In some implementations, the media player application can be selected to display the embedded interface without sharing its output in an embedded session associated with the chat conversation. In some implementations, instead of inputting the command shown, the first user can select to play the media item by browsing a menu that displays media items and selecting the desired media item, or selecting the media item in a different way. In some implementations, the first user can execute the embedded application without selection of a media item, and then select a media item using a menu of the embedded application, e.g., in the embedded interface.

In response to the command 806, a response message 808 can be displayed in the chat interface by a bot or the messaging application, e.g., as if the bot or messaging application were a chat user. Response message 808 indicates that the selected embedded video player application is being executed. In some cases or implementations, the selection of the embedded application (and/or media item) causes the embedded application to be downloaded to the first device in the background, e.g., from an embedded application server over the network connected to the first device.

The embedded application executes on the first device and displays an embedded interface 810. In this example, embedded interface 810 is displayed within chat interface 800, e.g., within message display area 804 of the chat interface. In some implementations, the embedded interface 810 is displayed based on data received by the first device over the network, e.g., from an embedded application at least partially executing on a remote session server or other device connected over the network. In this example, the embedded interface 810 is displayed such that message display area 804 is at least partially displayed, e.g., allowing one or more chat messages in the message display area 804 to be simultaneously displayed with the embedded interface 810.

Embedded interface 810 includes a display area 812 for displaying content data of a media item (e.g., video data, image data, etc.), a seek control 814 allowing the first user to provide user input to change the playback position of the media item along a timeline (e.g., moving the control left or right), and a full screen control 816 allowing user input to enlarge the embedded interface 810 to the entire screen (or other display area) of the first device. A user identifier 818 can be displayed to indicate which user of the chat initiated the embedded session associated with the interface 810. The user identifier 818 is shown as an identifying image, but can also or alternatively be text (e.g., name), etc. A list 820 can show the media item that is current playing in the display area 812 and other media items that are queued to play after the media item is completed. A close control 822 allows user input to close the embedded interface 810 and close the embedded application, e.g., so that it is no longer executing on the first device.

In some implementations, one or more embedded application indicators 824 can be displayed in the chat interface to indicate which embedded sessions are current active. Some implementations can also display an indicator in the chat interface to indicate updates to the embedded session (e.g., user input to a corresponding embedded interface) since the last time that the first user was a member user of that embedded session. For example, such an indicator can be an indicator 826 displayed in association with (e.g., adjacent to or overlapping) the embedded application indicator 824.

In FIG. 8B, an example of a second chat interface 840 of a second messaging application is displayed on a second user device operated by a second user (e.g., "Emily D."). In this example, the second user is a participant in the chat conversation "HanginOut" that includes the first user and first device as described for FIG. 8A. Chat messages can be input by the second user in the chat interface 840, e.g., via the input field 842 and an input device (e.g., on-screen keyboard, etc.). In this example, the second user has input a message 844 to the chat conversation, which is displayed in a display area 848 of chat interface 840. In response to message 844, the first user has input a message 846 to the chat conversation, as displayed in display area 848 of chat interface 840.

In addition, an embedded session notification 850 is displayed in chat interface 840. Notification 850 indicates that an embedded session is active, which in this example utilizes the embedded video player application that was executed by the first user in FIG. 8A. Notification 850 can be displayed in chat interface 840 after the second device receives information from a session server or a chat device that the embedded session has been initiated and is active. Notification 850 is displayed in this example below the display area 848 in the chat interface 840, or can be displayed in other areas of the chat interface 840 (or outside the chat interface 840) in other implementations.

In this example, notification 850 includes a designation 852 (e.g., icon or symbol) of the embedded video player application that was executed by the first user in FIG. 8A to initiate the associated shared embedded session. Notification 850 also includes the name 854 of the media item that is being played in the embedded session. Notification 850 also includes a list 856 of the chat users who have joined the embedded session, e.g., are currently member users of the embedded session. Notification 850 also includes a join control 858 which is receptive to user input to cause the second user and second device to join the embedded session if selected. Notification 850 also includes a close control 860 which is receptive to user input to cause the notification 850 to be removed from the chat interface 840.

In FIG. 8C, the chat interface 840 of FIG. 8B is shown with an example update after the second user has selected to join the embedded session indicated in the notification 850 of FIG. 8B. For example, the second user may have selected the join control 858 of FIG. 8B. In FIG. 8C, an embedded interface 870 has been displayed in the chat interface 840. For example, embedded interface 870 can be provided by a second embedded application that has been downloaded (in some cases) and executed by the second device in response to the second user joining the embedded session. In other implementations, the embedded interface 870 is displayed based on data received over the network, e.g., from an embedded application at least partially executing on a session server or other device. The second embedded application corresponds to the video player application that provides the embedded interface 870 on the first device of FIG. 8A. In this example, the embedded interface 870 is displayed such that message display area 848 is at least partially displayed, e.g., allowing one or more chat messages in the message display area 848 to be displayed during display of the embedded interface 870.

After the second user and second device have joined the embedded session, the playback position of the media item displayed in the embedded interface 870 is synchronized with the current playback position of the embedded session, e.g., as shown on the embedded interface 810 of the first device of FIG. 8A. Thus, the second user starts viewing the playing media item at a playback position after the start of the media item, and shares the viewing experience with the other member users of the embedded session. The embedded interface 870 includes features similar to embedded interface 810, e.g., a display area 872, a seek control 874 allowing the second user to provide user input to change the playback position of the media item along a timeline, a full screen control 876, a user identifier 878 that indicates the user who initiated the embedded session associated with interface 870, and a close control 882. A list 880 shows the media item 884 that is current playing in the display area 872 as well as an identifier of the user that instructed to play media item 884. In this example, list 880 also includes a second media item 886 that is queued to play after the media item 884 completes playing, and includes an identifier of the user that instructed to play media item 886.

In this example, the second user has been permitted control over playback functions in the embedded session, and the second user can manipulate the seek control 874 to change the current playback position of the media item, e.g., to a position before or after the current position. Such a change is imposed on all the embedded interfaces displayed by the member devices of the embedded session, such that the media item viewing is synchronized among member devices. In other cases or implementations, the second user may not have been provided permission or privileges (e.g., from the first user that activated the embedded session) and would not be able to adjust the playback position of the media item.

In FIG. 8D, the chat interface 840 of FIG. 8C is shown with an example update after the second user has selected to input a new message in the chat conversation of the chat interface. For example, the second user may have selected input field 842 of chat interface 840 during playback of the media item in embedded interface 870. In some implementations, this can cause a displayed keyboard 890 to be displayed in or adjacent to the chat interface 840 (e.g., such that at least a portion of the message display area 848 is still displayed), which can be used to input a new message such as text 892. Text 892 can be displayed as chat message 894 when the text 892 is entered (e.g., via a return control in keyboard 890). Some implementations can provide message suggestions 896 as responses to the last chat message 846, any of which can be selected by user input to provide a chat message having the selected message suggestion 896 in message display area 848 and to the chat conversation.

In some implementations, the embedded interface 870 can be resized to allow display space for both the keyboard 890 and chat messages of the chat conversation. In this example, embedded interface 870 has been reduced in size as shown. Chat message 846 and new chat message 894 can be displayed alongside the embedded interface 870.

In FIG. 8E, chat interface 840 is shown similarly as in FIG. 8C, with an example user comment displayed in the embedded interface 870 and associated with the playing media item. At the current playback position of the media item displayed in the embedded interface 870, a user comment 897 is displayed. In various implementations, displayed user comment 897 can include a comment as well as an identification of the user that input the comment.

In some implementations or cases, the information of user comment 897 is input by a member user who is currently viewing the media item in the embedded session. For example, the user comment 897 can be displayed at a location in the display area of the embedded interface that is pointed to by the user, for a predetermined amount of time and then removed from the display. In some cases, user comment 897 may have been previously input by a chat user while the chat user was viewing the same media item on a previous occasion while participating in the chat conversation (which, for example, can be an ongoing chat group). For example, the media item may have been played in a previous embedded session in the chat conversation by a chat user, who input the user comment at a particular playback position and location in the display area. The user comment was stored in association with the chat conversation, media item, and playback position. When the media item is displayed in the current embedded session, the user comment 897 is displayed when the playback position is at (or near, e.g., within a threshold time of) the same position where the user comment was previously input.

In some implementations, one or more suggested response items 898 can be displayed in chat interface 840 and/or in embedded interface 870. In this example, suggested response items 898 are displayed in response to a detected suggestion event which is the display of the user comment 897 in the embedded interface. In this example, a suggested command has been determined by the embedded application (e.g., as generated by a machine-learning model or other technique) and provided to the messaging application for display in chat interface 840. The suggested command would, if executed, cause the embedded application to skip the video playback of the media item to the next user comment stored for the playing video. If the user selects the suggested command, the command is sent to the embedded application and playback in embedded interface 870 is changed to a playback position at the next user comment. A suggested message has also been determined, in this example in reaction to user comment 897 as determined by the system (e.g., machine learning model based on training data providing sample user messages to similar comments). Other suggested messages can be determined in response to any member user actions in the embedded session, one or more chat messages in the chat interface, etc. If the user selects the suggested message, the message is displayed as a chat message in chat interface 840, e.g., in message display area 848. In some implementations, a selected suggested message can be added to the media item as a user comment similar to user comment 897. For example, the selected message can be positioned within the embedded interface 870 and/or display area 872 adjacent to (e.g., below) existing user comment 897 as a default position. In some implementations, suggested response items such as suggested commands and/or suggested messages can be displayed in association with a displayed keyboard or other input controls, e.g., similarly to message suggestions 896 shown in FIG. 8D.

FIGS. 9A-9C are graphic representations of additional example user interfaces displayed by user devices. In these examples, a messaging application is used for a conversation between users and an embedded game application is used in association with the messaging application.

In FIG. 9A, an example of a first chat interface 900 of a first messaging application is displayed on a first user device operated by a first user (e.g., "Sarah C."). In this example, a chat conversation "HanginOut" has been initiated that includes participation of the first user and first device similarly as described for FIG. 8A. Chat messages from the first user can be input in an input field 902 of chat interface 900 (e.g., using an input device or keyboard similar to keyboard 890 above) and the chat messages can be displayed in a message display area 904 of chat interface 900.

In this example, the first user previously input a command in input field 902, and the received command is displayed as message 906 in the chat interface after being input. This command specifies an embedded interface to be displayed in association with the chat conversation. In this example, the embedded interface is provided by an embedded application that is a game "Toads" which can execute on the first device in some implementations. The command also has a "share" parameter to cause the game to be shared in the chat conversation as an embedded session. In some implementations, the game application can be selected to display the embedded interface without sharing its output in an embedded session associated with the chat conversation. In other implementations, the first user can select to initiate the embedded game application by selecting the embedded game application from a menu, list, etc.

In response to command 906, a response message 908 can be displayed in the chat interface by a bot or the messaging application, e.g., as if the bot or messaging application were a chat user. Response message 908 indicates that the selected embedded game application is being executed. In some cases or implementations, the selection of the embedded game application causes the embedded game application to be downloaded to the first device in the background, e.g., from an embedded application server over the network connected to the first device.

After the embedded application (or a portion thereof) has been stored on the first device, the embedded application executes and displays an embedded interface 910. In this example, embedded interface 910 is displayed within chat interface 900, e.g., within message display area 904 of the chat interface such that a portion of the message display area 904 remains displayed. In some implementations, the embedded interface 910 is displayed based on data received by the first device over the network, e.g., from an embedded application executing on a remote session server or other device connected over the network.

Embedded interface 910 includes a display area 912 for displaying output of the game. The display area 912 can be receptive to user input, e.g., selections of locations within the display area as commands to or actions within the game, in this example. A full screen control 914 allows user input to enlarge the embedded interface 910 to the entire screen (or other display area) of the first device. A user identifier 916 can be displayed to indicate the first user of the chat interface as a player of the game. In some implementations, a game score 918 can be displayed next to (or otherwise associated with) the user identifier 916 to indicate the current score of the identified user. A close control 920 allows user input to close the embedded interface 910 and close the embedded game application, e.g., so that it is no longer executing on the first device.

In some implementations, one or more embedded application indicators 924 can be displayed in the chat interface to indicate which embedded sessions are current active, similarly as described above.

In FIG. 9B, an example of a second chat interface 940 of a second messaging application is displayed on a second user device operated by a second user (e.g., "Emily D."). In this example, the second user is a participant in the chat conversation "HanginOut" that includes the first user and first device as described for FIG. 9A. Chat messages can be input by the second user in the chat interface 940, e.g., via the input field 942. In this example, the second user has input a message 944 to the chat conversation, which is displayed in a message display area 948 of chat interface 940. In response, the first user has input a message 946 to the chat conversation, as displayed in display area 948 of chat interface 940.

An embedded session notification 950 is displayed in chat interface 940. Notification 950 indicates that an embedded session has been initiated and/or is active, which in this example utilizes the embedded game application that was executed by the first user in FIG. 9A. Notification 950 can be displayed in chat interface 940 after the second device receives information from a session server or a chat device that the embedded session has been initiated and is active. Notification 950 can be displayed in display area 948 or other areas of chat interface 940, or outside the chat interface 940 in various implementations.

In this example, notification 950 includes a designation 952 (e.g., icon or symbol) of the embedded game application that was executed by the first user in FIG. 9A to initiate the associated shared embedded session. Notification 950 also includes a list 956 of the chat users who have joined (e.g., are currently member users of) the embedded session. Notification 950 also includes a join control 958 which is receptive to user input to cause the second user and second device to join the embedded session, if selected. Notification 950 also includes a close control 960 which is receptive to user input to cause notification 950 to be removed from the chat interface 940.

In FIG. 9C, chat interface 940 of FIG. 9B is shown with an example update after the second user has selected to join the embedded session indicated in the notification 950 of FIG. 9B, e.g., by selecting join control 958 of FIG. 9B. In FIG. 9C, an embedded interface 970 is displayed in chat interface 940 such that a portion of the message display area 948 (and one or more chat messages) remain displayed. For example, embedded interface 970 can be provided by an embedded game application that has been downloaded (in some cases) and executed by the second device in response to the second user joining the embedded session. In other implementations, embedded interface 970 is displayed based on data received over the network, e.g., from an embedded application executing on a session server or other device. The embedded game application corresponds to the embedded game application that provides embedded interface 910 on the first device of FIG. 9A.

After the second user and second device have joined the embedded session, the game states of the embedded interface 970 are synchronized with the current game states of the embedded session as implemented on the corresponding embedded game applications. In some implementations, a session server or other server can synchronize game states on the member devices during the game by continually receiving game states from the member devices and sending synchronization updates to the member devices. Some implementations can provide peer-to-peer synchronization between the member devices.

The embedded interface 970 includes features similar to embedded interface 910 of FIG. 9A, including a display area 972 to display output of the game and which can be receptive to user input. A full screen control 974 allows user input to enlarge the embedded interface 970 to the entire screen (or other display area) of the first device. A close control 976 allows user input to close the embedded interface 970 and close the embedded game application, e.g., so that it is no longer executing on the second device. A user identifier 978 can be displayed to indicate the second user of chat interface 940 as a player of the game. In some implementations, a game score 980 can be displayed next to the user identifier 978 to indicate the current score of the user. In this example, other user identifiers 982 and associated game scores 984 are displayed to indicate the other player users participating in the embedded game session and their current scores in the shared game. In some implementations, member users having an observer role or referee role in the game can be displayed and visually differentiated in the display from users having player roles.

In some implementations, the game provided in the embedded session can be a real-time game in which player users may provide user input (e.g., game actions) to the game at any time to change game states, and the embedded game application can provide output continuously in real-time, e.g., based on its own events and/or in response to the user input. Some implementations can provide an embedded game application that is asynchronous or turn-based, e.g., where the game waits for input from one player (or multiple players) to change the game state and/or output, and the game waits for the next input from the same or different player(s), etc. Game output is displayed in the embedded interfaces of observer users, where input that the observer users are able to provide to the game is more restricted, e.g., does not affect game states.

Output from the game can be displayed in embedded interface 970 and/or as messages displayed in message display area 948 of chat interface 940. For example, messages from game objects can be displayed as chat messages in message display area 948 as described above with respect to FIG. 6.

In some implementations, one or more embedded application indicators 986 can be displayed in the chat interface to indicate which embedded sessions are current active, similarly as described above.

FIGS. 10A to 10D are graphic representations of additional example user interfaces displayed by user devices. In these examples, a messaging application is used for a chat conversation between users and an embedded application is used to provide a shared content document in the form of a shared list of items.

Figures 10A, 10B:
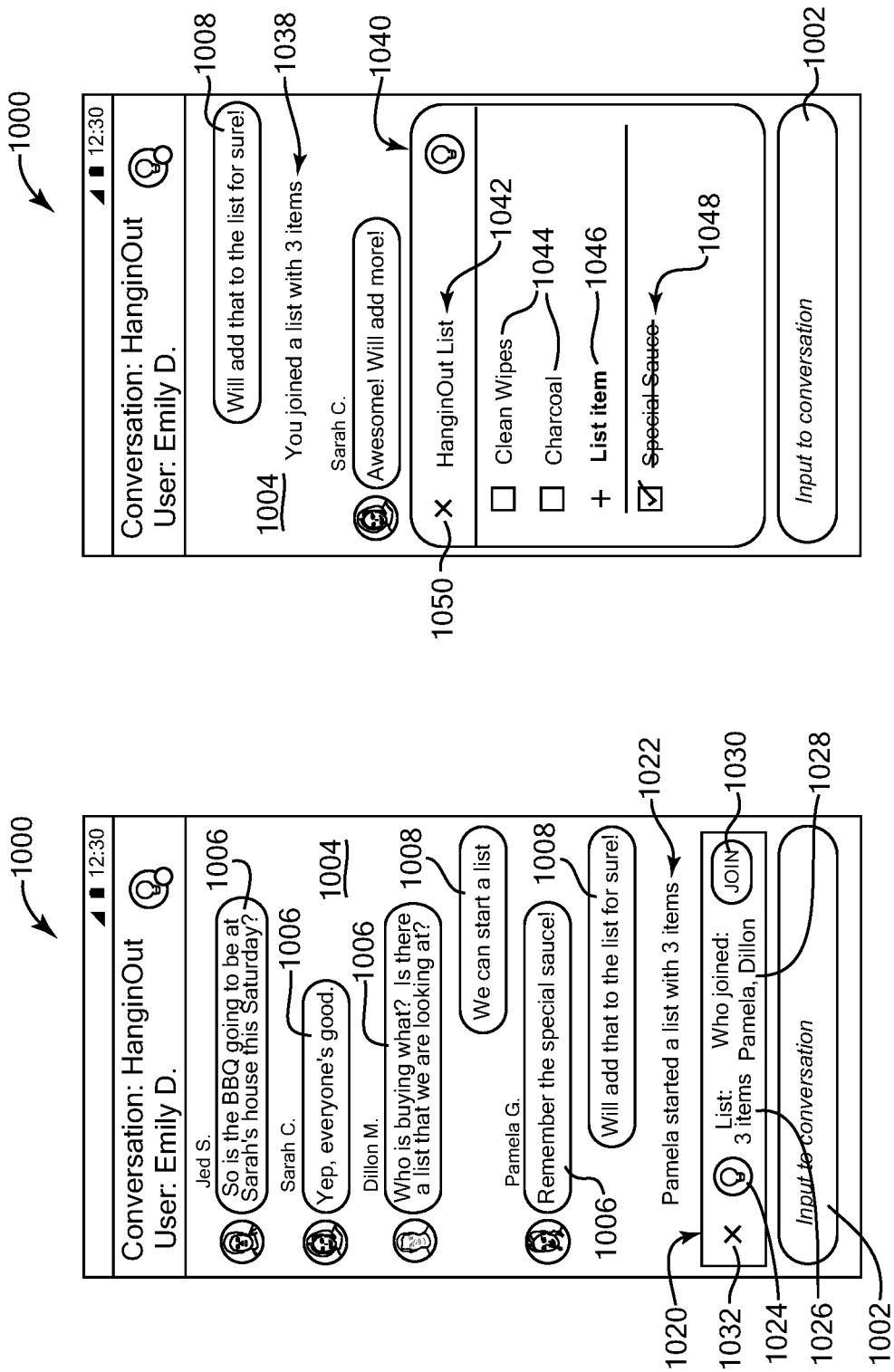
FIGS. 10A-10D are graphic representations of additional example user interfaces displayed by user devices, according to some implementations.

In FIG. 10A, an example of a chat interface 1000 of a messaging application is displayed on a first user device operated by a first user (e.g., "Emily D."). In this example, a chat conversation "HanginOut" has been initiated that includes participation of the first user and first device similarly as described for FIGS. 8A and 9A. Chat messages from the first user can be input in an input field 1002 of chat interface 1000 and the chat messages can be displayed in a message display area 1004 of chat interface 1000.

In this example, several chat users have input messages in the chat conversation, as shown by messages 1006 input from three chat users different than the first user and displayed in the display area 1004. Chat messages 1008 have been input by the first user and displayed in the chat interface in display area 1004. In this example, chat messages from other users are identified by a graphical user identifier and chat messages input by the first user are displayed right-justified on the display screen.

An embedded session notification 1020 can be displayed in chat interface 1000. Notification 1020 indicates that an embedded session is active, similarly to the notifications 858 and 958 described above for FIGS. 8 and 9. In this example, notification 1020 is displayed after the user "Pamela" has initiated the embedded session by selecting an embedded list application to execute and selecting to share a list provided by the embedded list application. Notification 1020 can be displayed in chat interface 1000 after the first device receives information from a session server or a chat device that the embedded session has been initiated and is active. Notification 1020 can be displayed in display area 1004 or other areas of chat interface 1000, or outside the chat interface 1000 various implementations.

In this example, notification 1020 includes a designation 1024 (e.g., icon or symbol) identifying the embedded list application used in the embedded session. Notification 1020 also includes the amount 1026 of user-response items currently in the list provided in the embedded session. Notification 1020 also includes list 1028 of the chat users who have joined (e.g., are currently member users of) the embedded session. Notification 1020 also includes a join control 1030 allowing the first user to join the embedded session if selected, and a close control 1032 causing the notification 1020 to be removed from the chat interface 1000 if selected.

In some implementations, such as the example of FIG. 10A, a notification 1022 can be displayed in the chat interface, e.g., in display area 1004, to indicate that a user has initiated an embedded session. Notification 1022 can include a description of data provided in the embedded session that was contributed or selected by member users, such as the number of items in a list in this example.

In FIG. 10B, chat interface 1000 of FIG. 10A is shown with an example update after the first user has selected to join the embedded session indicated in the notification 1020 of FIG. 10A. For example, the first user may have selected the join control 1030 of FIG. 10A. In FIG. 10B, an embedded interface 1040 has been displayed in the chat interface 1000 such that a portion of the message display area 1004 (and one or more chat messages) remain displayed. For example, an embedded interface 1040 can be provided by an embedded application that has been downloaded (in some cases) and executed by the first device in response to the first user joining the embedded session, similarly as described above. In other implementations, the embedded interface 1040 is displayed based on data received over the network, e.g., from an embedded application executing on a session server or other device. The embedded application is the same list application initiated by the user Pamela to create the embedded session indicated in notification 1020 of FIG. 10A.

In this example, embedded interface 1040 includes a name 1042 of a shared list, here based by default on the chat conversation name. Embedded interface 1040 displays items 1044 in a list, where an item 1044 can be selected by member user input to indicate the item has been completed or is no longer relevant. An add control 1046 allows user input to add a new item to the list and input text to name the new item. Completed items 1048 can be displayed with a visual indication that they have been selected by user input to be considered completed or achieved. A close control 1050 can also be provided. Other features such as an indication or list of member users who have contributed particular items to the list can be displayed in various implementations.

The list of items displayed in embedded interface 1040 are synchronized with the embedded interfaces of all the member devices such that each member device displays the same items and statuses of items in the list. In some implementations, one or more member users can be assigned an observer status, e.g., by the member user that initiated the embedded session, where observer users cannot modify the list.

Figures 10C, 10D:
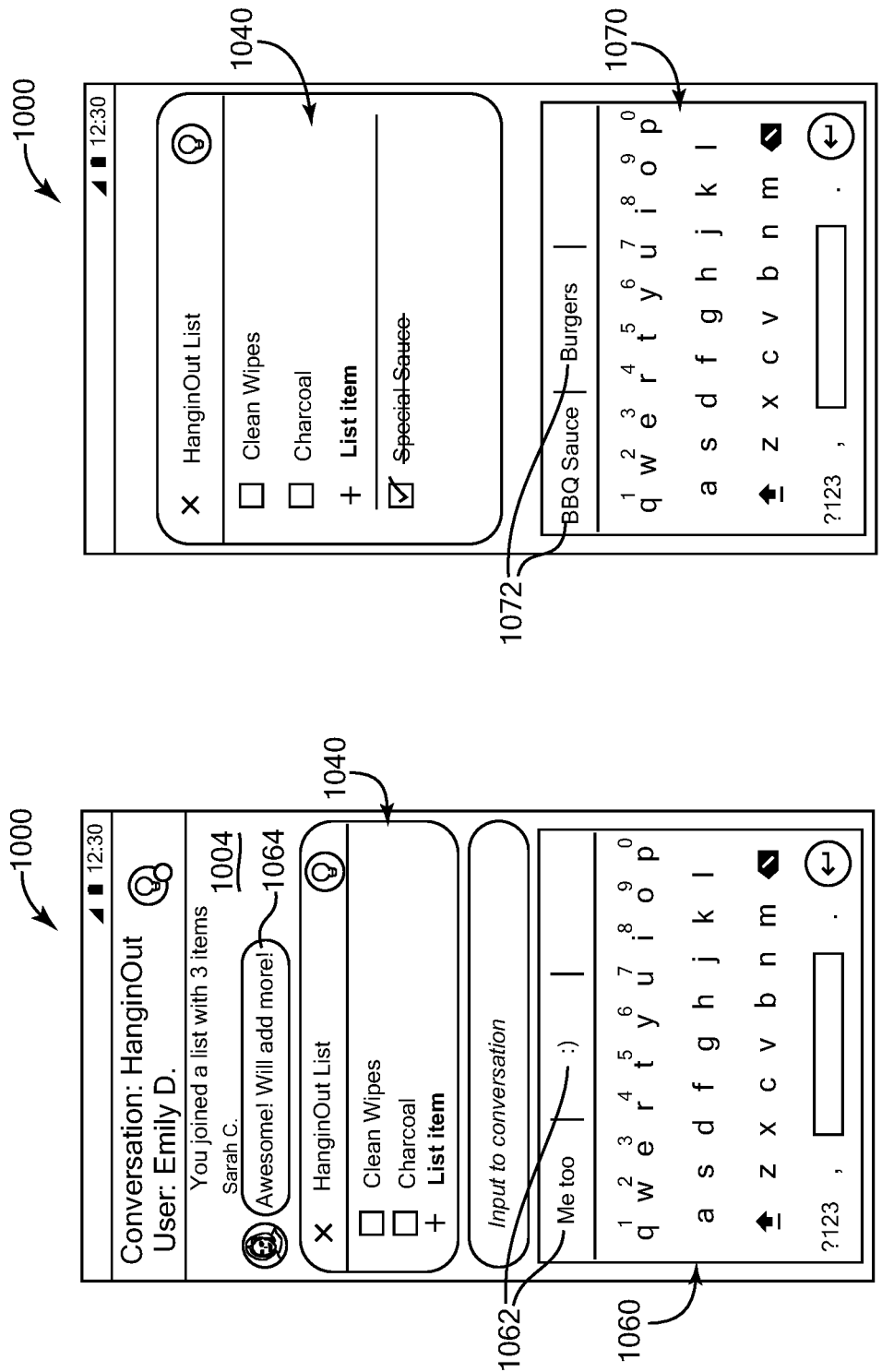

In FIG. 10C, chat interface 1000 of FIG. 10B is shown with an example update after the first user has selected to input a new message in the chat conversation of the chat interface. For example, the first user may have selected input field 1002 of chat interface 1000. In some implementations, this can cause a displayed keyboard 1060 to be displayed in or adjacent to the chat interface 1000, which can be used to input a new message. Some implementations can provide message suggestions 1062 as selectable elements responsive or related to one or more chat messages, e.g., the last chat message 1064. Similarly as in FIG. 8D, some implementations can resize the embedded interface 1040 as shown in the example of FIG. 10C (e.g., shrink the size of the embedded interface) to allow display space for both the keyboard 1060 and chat messages of the chat conversation in display area 1004 of the chat interface 1000, such that keyboard 1060, embedded interface 1040, and a portion of display area 1004 are simultaneously displayed.

In FIG. 10D, chat interface 1000 of FIG. 10B is shown with an example update after the first user has selected to provide input to the embedded interface and to the embedded application. For example, the first user may have selected the add control 1046 of embedded interface 1040 of FIG. 10B, e.g. using touchscreen input or input from another pointing input device, or may have selected a different option in the embedded interface that can accept text input from a keyboard. In other cases, the user may have selected a control in the embedded interface. In some implementations, this user input to the embedded interface can cause a displayed keyboard 1070 to be displayed in or adjacent to the chat interface 1000, where keyboard 1070 can be used to input text (including characters, emoji, symbols, etc.). For example, the first user can use the keyboard 1070 to input a text name or phrase for the added item in the list.

Some implementations can provide one or more suggestions 1072 as suggested input for the embedded interface, e.g., based on an interface element selected by the user input in the embedded interface and/or based on an event of the embedded application. In this example, suggestions 1072 were determined based on the selection of the add control 1046. For example, the embedded application (and/or the messaging application or suggestion server, after being sent the list items) can examine the existing list items to determine suggested new list items that are related to the existing items. For example, stored knowledge base or databases (e.g., hierarchical graph of related concepts) can be examined to find words that are related to words in the list.

In some implementations, as shown in FIG. 10D, while keyboard 1070 is displayed to allow input to the embedded interface 1040, the embedded interface 1040 can be maintained in its normal size as shown (or can be displayed in a larger size than the small-sized embedded interface 1040 of FIG. 10C). The display area 1004 that displays chat messages can be removed from the chat interface 1000 while keyboard 1070 is displayed to enable input to the embedded interface 1040, as shown.

Some implementations can display a keyboard similar to keyboard 1070 for input to the embedded interface, and/or can display suggestions to be input to the embedded interface similar to suggestions 1072, for other types of embedded applications, e.g., media players, games, document processing applications, etc. as described herein for other implementations.

Examples of Bot Implementations

A bot is an automated service, implemented on one or more computers, that users interact with primarily through text, e.g., via messaging application 103a/103b. A bot may be implemented by a bot provider such that the bot can interact with users of various messaging applications. In some implementations, a provider of messaging application 103a/103b may also provide one or more bots. In some implementations, bots provided by the provider of messaging application 103a/103b may be configured such that the bots can be included in other messaging applications, e.g., provided by other providers. In some implementations, one or more bots can be provided by, generated by, and/or included in an embedded application.

A bot may provide several advantages over other modes. For example, a bot may permit a user to try a new service (e.g., a taxi booking service, a restaurant reservation service, etc.) without having to install an application on a client device, or accessing a website. Further, a user may interact with a bot via text, which requires minimal or no learning compared with learning to use a website, software application, a telephone call to, e.g., an interactive voice response (IVR) service, or other manners of interacting with a service. Incorporating a bot within a messaging service or application may also permit users to collaborate with other users to accomplish various tasks such as travel planning, shopping, scheduling events, obtaining information, etc. within the messaging service, and eliminate cumbersome operations such as switching between various applications (e.g., a taxi booking application, a restaurant reservation application, a calendar application, etc.) or websites to accomplish the tasks.

A bot may be implemented as a computer program or application (e.g., a software application) that is configured to interact with one or more users (e.g., any of the users 125a-n) via messaging application 103a/103b to provide information or to perform specific actions within the messaging application 103. As one example, an information retrieval bot may search for information on the Internet and present the most relevant search result within the messaging app. As another example, a travel bot may have the ability to make travel arrangements via messaging application 103, e.g., by enabling purchase of travel and hotel tickets within the messaging app, making hotel reservations within the messaging app, making rental car reservations within the messaging app, and the like. As another example, a taxi bot may have the ability to call a taxi, e.g., to the user's location (obtained by the taxi bot from client device 115, when a user 125 permits access to location information) without having to invoke or call a separate taxi reservation app. As another example, a coach/tutor bot may tutor a user to instruct the user in some subject matter within a messaging app, e.g., by asking questions that are likely to appear on an examination and providing feedback on whether the user's responses were correct or incorrect. As another example, a game bot may play a game on the opposite side or the same side as a user within a messaging app. As another example, a commercial bot may provide services from a specific merchant, e.g., by retrieving product information from the merchant's catalog and enabling purchase through a messaging app. As another example, an interface bot may interface a remote device or vehicle so that a user of a messaging app can chat with, retrieve information from, and/or provide instructions to the remote device or vehicle.

A bot's capabilities may include understanding a user's intent and executing on it. The user's intent may be understood by analyzing and understanding the user's conversation and its context. A bot may also understand the changing context of a conversation or the changing sentiments and/or intentions of the users based on a conversation evolving over time. For example, if user A suggests meeting for coffee but if user B states that he does not like coffee, then a bot may assign a negative sentiment score for coffee to user B and may not suggest a coffee shop for the meeting.

Implementing bots that can communicate with users of messaging application 103a/103b may provide many advantages. Conventionally, a user may utilize a software application or a website to perform activities such as paying bills, ordering food, booking tickets, etc. A problem with such implementations is that a user is required to install or use multiple software applications, and websites, in order to perform the multiple activities. For example, a user may have to install different software applications to pay a utility bill (e.g., from the utility company), to buy movie tickets (e.g., a ticket reservation application from a ticketing service provider), to make restaurant reservations (e.g., from respective restaurants), or may need to visit a respective website for each activity. Another problem with such implementations is that the user may need to learn a complex user interface, e.g., a user interface implemented using multiple user interface elements, such as windows, buttons, checkboxes, dialog boxes, etc.

Consequently, an advantage of one or more described implementations is that a single application enables a user to perform activities that involve interaction with any number of parties, without being required to access a separate website or install and run software applications, which has a technical effect of reducing consumption of memory, storage, and processing resources on a client device. An advantage of the described implementations is that the conversational interface makes it easier and faster for the user to complete such activities, e.g., without having to learn a complex user interface, which has a technical effect of reducing consumption of computational resources. Another advantage of the described implementations is that implementing bots may enable various participating entities to provide user interaction at a lower cost, which has a technical effect of reducing the need for computational resources that are deployed to enable user interaction, such as a toll-free number implemented using one or more of a communications server, a web site that is hosted on one or more web servers, a customer support email hosted on an email server, etc. Another technical effect of described features is a reduction in the problem of consumption of system processing and transmission resources used for completing user tasks across communication networks.

While certain examples herein describe interaction between a bot and one or more users, various types of interactions, such as one-to-one interaction between a bot and a user 125, one-to-many interactions between a bot and two or more users (e.g., in a group messaging conversation), many-to-one interactions between multiple bots and a user, and many-to-many interactions between multiple bots and multiple users are be possible. Further, in some implementations, a bot may also be configured to interact with another bot (e.g., bots 107a/107b, 109a/109b, 111, 113, etc.) via messaging application 103, via direct communication between bots, or a combination. For example, a restaurant reservation bot may interact with a bot for a particular restaurant in order to reserve a table.

In certain embodiments, a bot may use a conversational interface, such as a chat interface, to use natural language to interact conversationally with a user. In certain embodiments, a bot may use a template-based format to create sentences with which to interact with a user, e.g., in response to a request for a restaurant address, using a template such as "the location of restaurant R is L." In certain cases, a user may be enabled to select a bot interaction format, e.g., whether the bot is to use natural language to interact with the user, whether the bot is to use template-based interactions, etc.

In cases in which a bot interacts conversationally using natural language, the content and/or style of the bot's interactions may dynamically vary based on one or more of: the content of the conversation determined using natural language processing, the identities of the users in the conversations, and one or more conversational contexts (e.g., historical information on the user's interactions, connections between the users in the conversation based on a social graph), external conditions (e.g., weather, traffic), the user's schedules, related context associated with the users, and the like. In these cases, the content and style of the bot's interactions is varied based on only such factors for which users participating in the conversation have provided consent.

As one example, if the users of a conversation are determined to be using formal language (e.g., no or minimal slang terms or emojis), then a bot may also interact within that conversation using formal language, and vice versa. As another example, if a user in a conversation is determined (based on the present and/or past conversations) to be a heavy user of emojis, then a bot may also interact with that user using one or more emojis. As another example, if it is determined that two users in a conversation are in remotely connected in a social graph (e.g., having two or more intermediate nodes between them denoting, e.g., that they are friends of friends of friends), then a bot may use more formal language in that conversation. In the cases where users participating in a conversation have not provided consent for the bot to utilize factors such as the users' social graph, schedules, location, or other context associated with the users, the content and style of interaction of the bot may be a default style, e.g., a neutral style, that doesn't require utilization of such factors.

Further, in some implementations, one or more bots may include functionality to engage in a back-and-forth conversation with a user. For example, if the user requests information about movies, e.g., by entering "@moviebot Can you recommend a movie?", the bot "moviebot" may respond with "Are you in the mood for a comedy?" The user may then respond, e.g., "nope" to which the bot may respond with "OK. The sci-fi movie entitled Space and Stars has got great reviews. Should I book you a ticket?" The user may then indicate "Yeah, I can go after 6 pm. Please check if Steve can join". Upon user's consent to the bot accessing information about their contacts and upon the friend Steve's consent to receiving messages from the bot, the bot may send a message to user's friend Steve and perform further actions to book movie tickets at a suitable time.

In certain embodiments, a user participating in a chat conversation may be enabled to invoke a specific bot or a bot performing a specific task, e.g., by typing a bot name or bot handle (e.g., taxi, @taxibot, @movies, etc.), by using a voice command (e.g., "invoke bankbot", etc.), by activation of a user interface element (e.g., a button or other element labeled with the bot name or handle), etc. Once a bot is invoked, a user 125 may send a message to the bot via messaging application 103a/103b in a manner similar to sending messages to other users 125. For example, to order a taxi, a user may type "@taxibot get me a cab"; to make hotel reservations, a user may type "@hotelbot book a table for 4 at a Chinese restaurant near me."

In certain embodiments, a bot may automatically suggest information or actions within a chat conversation without being specifically invoked. That is, the users may not need to specifically invoke the bot. In these embodiments, the bot may depend on analysis and understanding of the chat conversation on a continual basis or at discrete points of time. The analysis of the chat conversation may be used to understand specific user needs and to identify when assistance should be suggested by a bot. As one example, a bot may search for some information and suggest the answer if it is determined that a user needs information (e.g., based on the user asking a question to another user, based on multiple users indicating they don't have some information). As another example, if it is determined that multiple users have expressed interest in eating Chinese food, a bot may automatically suggest a set of Chinese restaurants in proximity to the users, including optional information such as locations, ratings and links to the websites of the restaurants.

In certain embodiments, rather than automatically invoking a bot or waiting for a user to explicitly invoke a bot, an automatic suggestion may be made to one or more users in a messaging conversation to invoke one or more bots. In these embodiments, the chat conversation may be analyzed on a continual basis or at discrete points of time, and the analysis of the conversation may be used to understand specific user needs and to identify when a bot should be suggested within the conversation.

In the embodiments in which a bot may automatically suggest information or actions within a chat conversation without being specifically invoked, such functionality is disabled, e.g., if one or more users participating in the chat conversation do not provide consent to a bot performing analysis of the user's conversation. Further, such functionality may also be disabled temporarily based on user input. For example, when the users indicate that a chat conversation is private, analysis of conversational context is suspended until users provide input for the bot to be activated. Further, indications that analysis functionality is disabled may be provided to participants in the chat conversation, e.g., with a user interface element.

In various implementations, a bot may be implemented in a variety of configurations. For example, as shown in FIG. 1, bot 105 is implemented on client device 115a. In this example, the bot may be a module in a software application that is local to client device 115a. For example, if a user has installed a taxi hailing application on client device 115a, bot functionality may be incorporated as a module in the taxi hailing application. In this example, a user may invoke a taxi bot, e.g., by sending a message "@taxibot get me a cab." Messaging application 103b may automatically cause the bot module in the taxi hailing application be launched. In this manner, a bot may be implemented locally on a client device such that the user can engage in conversation with the bot via messaging application 103.

In another example shown in FIG. 1, bot 107a is shown implemented on client device 115a and bot 107b is shown as implemented on messaging server 101. In this example, the bot may be implemented, e.g., as a client-server computer program, with portions of the bot functionality provided by each of bot 107a (server module) and bot 107b (client module). For example, if the bot is a scheduling bot with the handle @calendar, user 125a may schedule a reminder, by typing "@calendar remind me to pick up laundry in the evening," which may be handled by bot 107b (client module). Continuing with this example, if user 125a tells the bot "check if Jim is free to meet at 4," bot 107a (server module) may contact user Jim (or Jim's scheduling bot) to exchange messages, and provide a response to user 125a.

In another example, bot 109a (server module) is implemented on server 135 and bot 109b (client module) is implemented on client devices 115. In this example, the bot functionality is provided by modules implemented on client devices 115 and server 135, which is distinct from messaging server 101. In some implementations, a bot may be implemented as a distributed application, e.g., with modules distributed across multiple client devices and servers (e.g., client devices 115, server 135, messaging server 101, etc.). In some implementations, a bot may be implemented as a server application, e.g., bot 111 that is implemented on messaging server 101 and bot 113 that is implemented on server 135.

Different implementations such as client-only, server-only, client-server, distributed, etc. may provide different advantages. For example, client-only implementations permit bot functionality to be provided locally, e.g., without network access, which may be advantageous in certain contexts, e.g., when a user is outside of network coverage area or in any area with low or limited network bandwidth. Implementations that include one or more servers, such as server-only, client-server, or distributed configurations may permit certain functionality, e.g., financial transactions, ticket reservations, etc. that may not be possible to provide locally on a client device.

While FIG. 1 shows bots as distinct from messaging application 103, in some implementations, one or more bots may be implemented as part of messaging application 103. In the implementations in which bots are implemented as part of messaging application 103, user permission is obtained before implementing bots. For example, where bots are implemented as part of messaging application 103a/103b, messaging application 103a/103b may provide bots that can perform certain activities, e.g., a translation bot that translates incoming and outgoing messages, a scheduling bot that schedules events on a user's calendar, etc. In this example, translation bot is activated only upon user's specific permission. If the user does not provide consent, bots within messaging application 103a/103b are not implemented (e.g., disabled, removed, etc.). If the user provides consent, a bot or messaging application 103a/103b may make limited use of messages exchanged between users via messaging application 103a/103b to provide specific functionality, e.g., translation, scheduling, etc.

In some implementations, third parties distinct from a provider of messaging application 103a/103b and users 125, may provide bots that can communicate with users 125 via messaging application 103a/103b for specific purposes. For example, a taxi service provider may provide a taxi bot, a ticketing service may provide a bot that can book event tickets, a bank bot may provide capability to conduct financial transactions, etc.

In implementing bots via messaging application 103, bots are permitted to communicate with users only upon specific user authorization. For example, if a user invokes a bot, the bot can reply, e.g., based on the user's action of invoking the bot. In another example, a user may indicate particular bots or types of bots that may contact the user. For example, a user may permit travel bots to communicate with her, but not provide authorization for shopping bots. In this example, messaging application 103a/103b may permit travel bots to exchange messages with the user, but filter or deny messages from shopping bots.

Further, in order to provide some functionality (e.g., ordering a taxi, making a flight reservation, contacting a friend, etc.), bots may request that the user permit the bot to access user data, such as location, payment information, contact list, etc. In such instances, a user is presented with options to permit or deny access to the bot. If the user denies access, the bot may respond via a message, e.g., "Sorry, I am not able to book a taxi for you." Further, the user may provide access to information on a limited basis, e.g., the user may permit the taxi bot to access a current location only upon specific invocation of the bot, but not otherwise. In different implementations, the user can control the type, quantity, and granularity of information that a bot can access, and is provided with the ability (e.g., via a user interface) to change such permissions at any time. In some implementations, user data may be processed, e.g., to remove personally identifiable information, to limit information to specific data elements, etc. before a bot can access such data. Further, users can control usage of user data by messaging application 103a/103b and one or more bots. For example, a user can specify that a bot that offers capability to make financial transactions require user authorization before a transaction is completed, e.g., the bot may send a message "Tickets for the movie Space and Starts are $12 each. Shall I go ahead and book?" or "The best price for this shirt is $125, including shipping. Shall I charge your credit card ending 1234?" etc.

In some implementations, one or more suggested response items generated by systems described above can be messages used to invoke or command a bot, e.g., request a bot for information. For example, the system can determine whether a received image includes content that would be assisted by information and/or one or more functions provided by a bot. In some examples, the first user in a conversation may send a text message to the second user, saying, "Guess where?" The first user then sends an image to the second user's device. The system can determine that a phrase including the word "guess" indicates that a suggested response can be a request to find out the information related to the image content. (Other words can also indicate such a request, such as "where," "what," etc.) In response, the system can generate a suggested response that is a request or command to an appropriate bot that can provide the relevant information. For example, a suggested response can be a request to a mapping bot to provide the name of the location depicted in the image (e.g., where the bot can determine such information using web searches, maps and atlases, geographic location metadata of the received image, etc.). In some implementations, the training message data can be used (if user consent has been obtained) to determine appropriate types of bots for particular types of image content that has been detected in the image (e.g., using one or more image detection or recognition techniques, if user consent has been obtained), and/or rules-based grammars can determine which types of bots to invoke in a suggested response based on the types of image content and/or concepts detected in the image content.

In some implementations, if the bot-related suggested item is displayed for the user as a possible response and the user selects that suggestion, the bot can be added to the chat conversation and messaging interface, e.g., represented with a bot name. The bot can determine and output the requested information in the conversation, e.g., as messages to both the first and second users in a chat interface.

In another example, the first user inputs an image depicting text that is in a language foreign to the second user to a chat conversation or embedded application. The system can determine that an appropriate suggested item is a request to a language bot to translate the text in the image and to output the translated text in the chat interface or embedded interface.

In another example, the first user inputs an image depicting a food item to a chat conversation. The system can determine that an appropriate suggested response is a request to a bot to check one or more accessible data sources (e.g., on the Internet) to determine the ingredients and/or calories typically or specifically included in the food item, and to output that information in the message conversation interface.

Implementations described herein generally relate to messaging applications. Certain implementations may automatically (e.g., without user intervention) analyze image content of one or more chat conversations and/or user information to automatically provide suggested items to a user within a messaging application. In certain examples, the automatic suggested items may be selected by a user to respond in the embedded application or in the messaging application, and/or may be automatically provided as one or more appropriate responses on behalf of a user. In certain other examples, the suggestions may automatically incorporate particular non-messaging functionality into the messaging application.

Suggested items may be provided based on any type of media content that is received in a chat conversation. For example, such media content may include stickers (e.g., in a chat application), animated images (e.g., cinemagraphs, GIF images, etc.), and videos. Further, various types of items may be suggested. For example, suggested messages may include one or more of an image, a sticker, an animated image (e.g., cinemagraph, GIF image, etc.) and a video. To provide these suggestions, a comparison can be made of identified concepts in a received item (e.g., text, image, video, sticker, animated image, etc.) with concepts in different types of responses, and select a suitable response. In different implementations where users provide consent, the type of suggested item may be selected or prioritized based on context, e.g., a sticker may be provided as a suggested item for a particular action in a game, a second video may be provided as a suggested item for a playing video, etc.

Certain implementations enable messaging with human users and/or chat bots. In certain implementations, automatic suggested items may be customized based on whether a chat bot is participating in the chat conversation. In some examples, a first set of automatic suggested items may be provided if a chat bot is absent in a messaging conversation, while a second set of automatic suggested items may be provided if a chat bot is present in the chat conversation, where the first and second sets of suggested items are at least partially different. For example, these implementations may employ conversational rules followed by the chat bot, and suggest items to a user based on the rules. This can mitigate challenges that users may have in communicating with chat bots in a language and in a format that is easily understood by the chat bots.

Some implementations can include determining one or more trending responses (e.g., messages including popular message content sent by many different users) based on other messages in at least one of a region, market, and country related to a location of a user. One or more determined suggested items may include one or more trending responses. In some implementations, a user context, e.g., a geographic location, holiday or an event, etc., can be used to generate and determine for presentation one or more of the suggested items.

In some implementations, determining one or more suggested response items may be based on using machine learning to develop a personalized model for a user. Determining suggested items may be based on preferences of the user and/or prior actions of the user in communications (if user consent for use of such actions and data has been obtained). For example, user preferences may include a whitelist indicating particular words which can be included and/or a blacklist indicating particular words which cannot be included in message suggestions. If user consent has been obtained, suggested items can be generated or modified based on one or more of punctuation use, emoji use, or other content provided by the user on previous occasions.

Machine learning models used to provide suggested items may be implemented by a client device 115 and/or a server, e.g., messaging server 101 and/or a server 150-156. In some implementations, chat conversations may be encrypted such that only client devices of participants in the chat conversation can access conversation content. In these implementations, models implemented by a respective client device may be used to provide suggested response items and models implemented by a server are not used. Models implemented by a client device may also be used, e.g., when the user does not provide consent for use of models implemented by a server. In some implementations, client implemented models may be based on or derived from server implemented models. In some implementations, server models may be used and client models may not be used, e.g., when a client device lacks capability to implement client models. In some implementations, a combination of client and server models may be used.

While the examples described in this document utilize concepts illustrated in English, suggestions may be provided in any language, e.g., a language, locale or other geographic configured for a client device 115, a language selected based on a user preference, etc. In some implementations, where users provide consent for analysis of context of a chat conversation, a language that is used in various conversations (e.g., in recent messages) involving the user may be detected and message suggestions can be provided in that language.

Further Examples of Bots and Embedded Applications

In some implementations, bots as described above can be used by a user in conjunction with the use of an embedded application in one or more chat conversations implemented on a user device.

In some bot implementations, a user can participate in a chat conversation with a bot and without other human users participating in the chat conversation. For example, an assistant bot can be provided by a local program executing on the user device, or provided by a server (e.g., server application program). In some examples, a new, bot chat conversation can be opened including the user and one or more bots, in response to the user inputting a bot command in a first chat conversation (e.g., command chat message), selecting a bot activation control in the chat interface, etc. In the bot chat conversation, the user can input information (e.g., questions, commands, statements) as messages that can be processed by the bot, and the bot can send commands or data to embedded applications based on those messages. For example, a bot can initiate an appropriate embedded application associated with a chat interface based on a command in the chat interface from a user to the bot to join a particular embedded session, playback a media item, play a game, create a shared list, etc. In some implementations, bots can determine and present the suggested response items described herein, e.g., upon a command provided to the bot from user input in the chat interface, and, e.g., simultaneously with execution of an embedded application and embedded session to which the suggested response items are relevant. In some implementations, bots can receive information related to events occurring in embedded applications and can generate and cause to be displayed interactive cards describing the events in embedded sessions, as described herein.

In some examples, in a chat conversation with a bot having media player functionality, a user can input questions in the chat interface or conversation, and the bot can initiate a media player embedded application that plays a particular media item in an embedded interface displayed in association with the bot chat conversation or in association with a different chat conversation (e.g., a chat conversation including other human chat users). For example, if played in association with a different chat conversation, the bot chat conversation can be hidden from the display and the different chat conversation can be displayed in the chat interface, with the embedded interface displayed in association with the chat interface.

In an example in which the embedded application can play a media item, e.g., as described in implementations herein, a media player bot can be invoked in a chat conversation by a user. For example, the bot can be invoked by inputting a command in the chat interface similarly to a chat message, and including command syntax (e.g., a symbol before the command), or by inputting a different type of selection (e.g., selecting a displayed interface element). The media player bot can support queries from the user related to media items played or playable by the embedded application.

In some implementations, a media player bot can be used to search for stored media items or other types of content items that have been saved in accessible storage by the user and/or by other chat users, and/or have had links to the content items posted in the chat conversation. In some examples, a query for the bot can be input to the chat interface as a chat message. For example, a search query can be provided as "@mediaplay cat videos" to cause the media player bot to search for cat videos in a collection of stored media items. Specific titles of media items can also be queried. In some implementations, a conversational search can be provided. For example, a search query can be input as "show me the most recent episode of Gameshow" or "play the most popular Gameshow video" or "show me five videos you recommend for me to watch" or "send me a new cat video each day." In some implementations, the recommended media items can be provided by a content server which may have tracked previous user viewings and preferences (with user consent) and ranked media items for the user.

Some implementations can provide one or more bots to receive user input forming a search query used in searching for other data items or content items to be used in embedded applications. For example, such items can include items to be added to a shared list, a time in a particular time zone to be used in a travel itinerary, a name of a restaurant for a reservation, etc. The bot can search for such items on databases, servers, or other resources accessible on the user device and over the network. Items found by the bot in response to a search query can be presented in the chat interface for selection by the user, or can be provided automatically to the associated embedded application by the bot (and, in some implementations, the bot can initiate the embedded application if the embedded application is not already executing). Items provided to the embedded application can be displayed in the embedded interface, if appropriate.

In some implementations, as described above, playback of media items in an embedded session can be saved for later for a particular user to enable that user to play the media item at a later time, e.g., in a new embedded session. In some implementations, such saved media items can include recordings (e.g., captured video data, screen capture images, etc.) of games or other user and application activity/events that occurred in one or more embedded sessions with chat users, if consent has been obtained from the chat users.

In some implementations, media items can be saved for the user in a dedicated separate chat conversations. For example, a user can provide, in the chat conversation, user input to save a particular media item. In response, a second chat conversation is identified that is associated with the user and a bot is associated with the media item. The media item is inserted into the second chat conversation, and previous saved media items are also listed in the second chat conversation. The messaging application can receive input from the user that is associated with the media item, e.g., to play a selected media item. In response, the first chat conversation is updated by playing the selected media item using an embedded application.

In some additional examples, a save control can be provided in a notification indicating that a media player embedded session is active, or in association with a media item link displayed in the chat conversation. If, for example, a user receives a notification that a media player embedded session is active (or sees a link to a media item in the chat interface), the user can select the save control. This selection can cause a second chat conversation (e.g., media selection chat conversation) to be displayed in which only the user and the bot are participating. A link to the media item in the embedded session can be displayed in the media selection chat conversation. Furthermore, any saved media items from previous embedded sessions can be included in the media selection chat conversation as previous messages. Thus, the user can open the media selection chat conversation to select and play saved media items associated with the user. In some implementations, an option can be provided to automatically insert a user's media items into a media selection chat conversation, e.g., to allow viewing and playing of the media items from a single collection.

In some implementations, the system (e.g., a bot) provides selections in the chat interface for additional media items that are determined to be similar to a media item that was shared in an embedded session. For example, the additional media items can have the same genre, were authored by or feature the same artists, etc.

In some implementations, a share option can be provided, which if selected causes a media item being played in an embedded interface to be shared to a different chat conversation or share to a new chat conversation that is created for the selected sharing action. For example, to cause the share option to be displayed, a user can touch the embedded interface playing the media item for over a threshold amount of time to cause the share option to be displayed, or can select a particular displayed interface element.

In some implementations, the user can select a comment control to enable inputting a comment to the chat conversation associated with the embedded session playing the media item. In some implementations, a link to play the media item is posted in the chat conversation, followed by a user comment input by the user. If the comment control is selected while viewing a saved media item viewed in a different chat conversation (e.g., a media selection chat conversation as described above), the selected comment control can cause the originating chat conversation to be opened and displayed, allowing the person to comment in the originating chat conversation where the media item was played in an embedded session.

In some implementations, suggested responses as described herein can be used with bots. For example, selection of a suggested response can trigger a bot associated with the suggested response to perform one or more actions in an embedded application, messaging application, or other program or device. In some examples, a bot can perform an action on embedded application content without opening the embedded application. For example, the embedded application can allow a user to provide commands to the embedded application in the chat interface (e.g., by providing a command to a bot), and allow users to interact with the embedded application visually via the embedded interface. In some examples in which an embedded application has or communicates with a server component (e.g., a game where game states are managed by a server), commanding the bot via a chat message to perform actions in the embedded application and embedded interface also causes the actions to be performed in the embedded interfaces displayed by other member devices. In another example, a shared list embedded application causes list data to be stored on a server. The first user opens the shared list embedded application and adds items to the list or removes items from the list. Other users' devices can display suggested responses to add items to the list via bot commands to the embedded application using the chat interface. For example, the suggested responses can be in response to chat messages such as "don't forget to buy drinks for the party" (e.g., a suggested response of "Add 'Buy drinks' to the 'Tonight's Party' list") or in response to chat messages such as "I just bought the sodas for tonight's party" (e.g., a suggested command of "Remove 'Buy Sodas' from the 'Tonight's Party' list"). In some implementations, these example suggested responses, when selected by the associated user, can call the bot to send the command to the embedded application, and, e.g., would not provide the command to the embedded interface. In some implementations, an advantage of providing a bot interface (via chat interface) in addition to the embedded interface is that a visual interface need not be displayed on a device, thus saving device processing, memory, and screen space resources, and enabling quick user interaction with content data managed by the embedded application.

Figure 11:
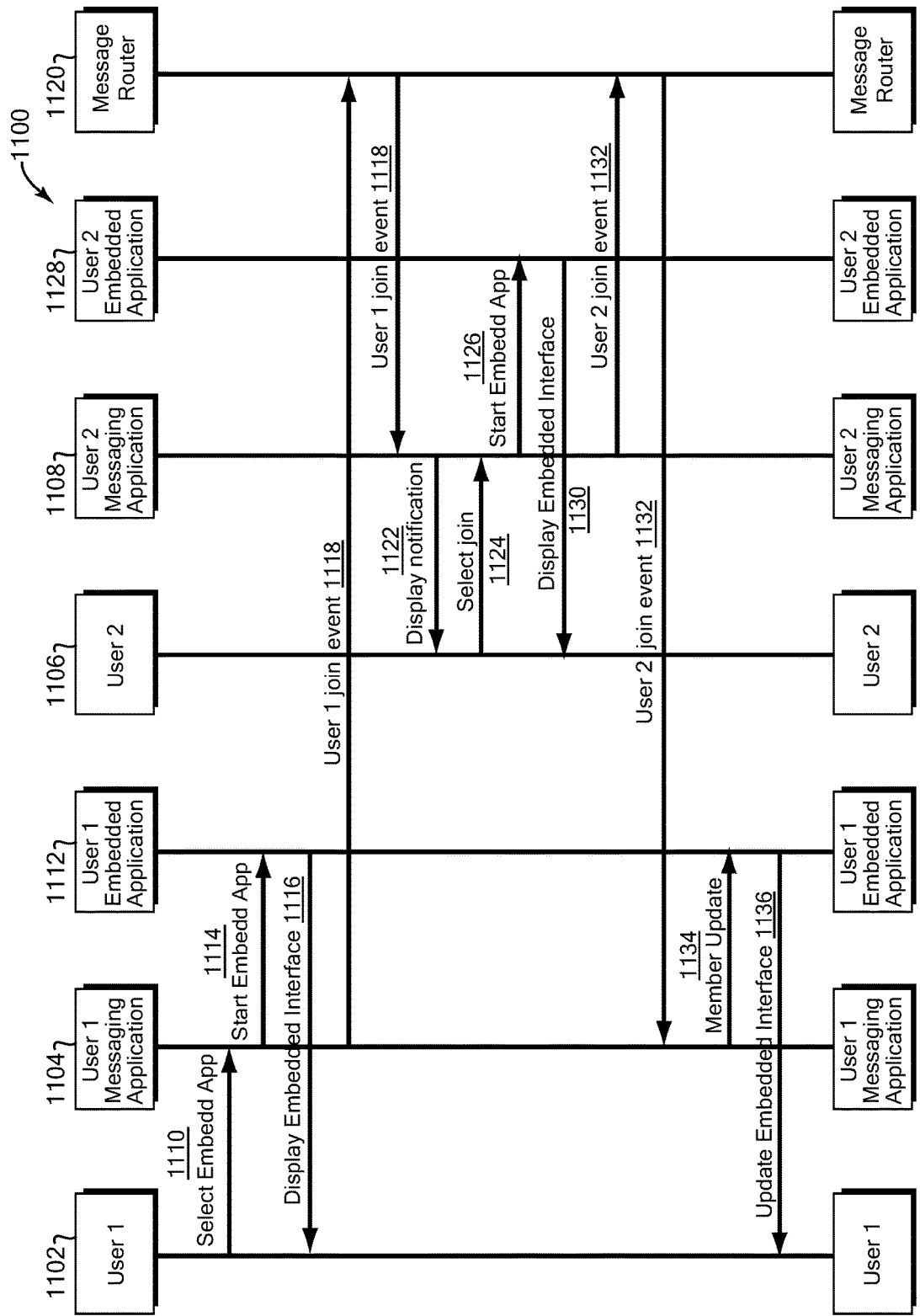
FIG. 11 is a diagrammatic illustration of an example sequence including initiation of an embedded application and a user joining an embedded session.

FIG. 11 is a diagrammatic illustration of an example sequence including initiation of an embedded application and a user joining an embedded session, according to some implementations. In this example, a first user 1102 ("User 1") is operating a first user device that executes messaging application 1104 which displays a first chat interface. A second user 1106 ("User 2") is operating a second user device that executes second messaging application 1108 which displays a second chat interface, A chat conversation is provided over a network between the messaging applications 1104 and 1108 in which the users 1102 and 1106 (and their devices) are participating, where the users are inputting messages in their respective chat interfaces to be displayed by the participating user devices.

In 1110, user 1102 selects to open an embedded application 1114 by providing user input to messaging application 1104. At 1114, first messaging application 1104 initiates the selected embedded application 1112. In some implementations, the first embedded application 1112 is downloaded from a server, e.g., embedded application server 150 (not shown). At 1116, the initiated first embedded application 1112 causes an embedded interface to be displayed by the first user device, e.g., in, adjacent, or otherwise in association with the first chat interface, and which is viewed by first user 1102.

In addition to starting the embedded application, at 1118 the first messaging application sends information over the network indicating an initiate event (or join event of the first user) based on the initiation of the first embedded application 1112. In this example, the event at 1118 is sent to a message router 1120. Message router 1120 can be a session server 152 (e.g., included in a messaging server 101) or other server, in various examples. An embedded session can be created at the message router in response to the initiate event some implementations, or can be created by the first user device, etc. Message router 1120 sends the join event at 1118 to the second messaging application 1108 operating on the second user device. At 1122, the second messaging application 1108 causes a notification to be displayed by the second user device to be viewed by the second user, e.g., in the second chat interface, indicating that the first user 1102 has initiated an embedded session. In this example, the notification includes a displayed join option (e.g., interface element) for the second user to select to join the embedded session.

At 1124, the second user 1106 selects the displayed join option to join the embedded session, where this selection is provided to the second messaging application 1108. In response to the join selection, at 1126 the second messaging application 1108 causes initiation of a second embedded application 1128 on the second user device (e.g., downloaded in some implementations). At 1130, the second embedded application causes display of a second embedded interface on the second user device. In addition to initiating the second embedded application, at 1132 the second messaging application 1108 sends information over the network indicating a join event of the second user to the embedded session in response to the join selection at 1124. In this example, the join event 1132 is sent to message router 1120.

The join event 1132 is sent by the message router 1120 over the network to the first messaging application 1104 on the first user device. In response, at 1122, the first messaging application 1104 sends a member update to the first embedded application 1112 for the second user joining the embedded session. For example, the member update can include data indicating that the second user has joined, the chat identity of the second user, a selected user status of the second user, etc., as described herein. In response to the member update, the first embedded application 1112 updates the display of the first embedded interface at 1136, as viewed by the first user 1102. For example, the chat identity (or other user identity) of the second user can be displayed in the embedded interface.

In various example implementations of systems, methods, and non-transitory computer readable medium having stored software instructions, an embedded application is provided in association with a messaging application. A first embedded application can be initiated in association with a first chat interface displayed by a first messaging application that executes at least in part on a first user device. The first chat interface is configured to receive first user input from a first user and display messages originating from one or more other user devices participating in a chat conversation over a network. The one or more other user devices are associated with one or more chat users, the chat users associated with respective chat identities. An indication is received over the network indicating that one or more particular user devices of the other user devices have connected to an embedded session associated with the first embedded application. In response to the indication, one or more chat identities are provided from the first messaging application to the first embedded application, which are associated with one or more particular chat users of the particular user devices. The particular chat users are designated as one or more member users of the embedded session, and the first embedded application is updated based on data received from at least one of the particular user devices of the embedded session.

In further examples, the first embedded application receives the first user input from the first user to an embedded interface displayed as part of the first chat interface, and the first user input includes selection of an interface element in the embedded interface. The first embedded application is updated in response to the first user input. In some examples, each of the particular user devices of the embedded session execute a respective embedded application that provides a respective embedded interface associated with a respective chat interface displayed on the respective particular user device, and the first embedded application is updated based on the data received from at least one of the particular user devices of the embedded session. The data can include other user input received by at least one of the respective embedded interfaces from at least one of the one or more member users of the embedded session. Output data can be obtained from the first embedded application to be displayed in the first chat interface, and, in response to receiving the output data, a prompt is displayed by the first user device, the prompt including a user-selectable control to consent to display of the output data in the chat interface. Prior to providing the one or more chat identities to the first embedded application, one or more of the chat identities can be anonymized to create anonymized chat identities, such that the anonymized chat identities are provided to the first embedded application.

In further examples, information is transmitted to the other user devices participating in the chat conversation, which causes display of an interface element by the other user devices, the interface element receptive to selective user input at each of the other user devices, and in response to receiving the selective user input at the interface element on a particular user device, designating the particular user device as a member device of the embedded session. One or more characteristics of the one or more particular user devices can be determined and provided to the first embedded application, where the characteristics include a geographic location of at least one of the particular user devices, a local time for at least one of the particular user devices, and/or an available data bandwidth over the network for at least one of the particular user devices, where the characteristics are used by the first embedded application to determine output information to be displayed by the particular user devices, and/or cause a modification of transmission of input data to the first user device from one or more other devices over the network. The indication can be received from a server that manages the embedded session, and updates to the first embedded application can be received from the server, where the updates are based on the other user input from the particular chat users, the other user input provided to the server.

In further examples, a notification is output, to be displayed in respective chat interfaces of the one or more other user devices, where the notification indicates that the particular user devices are member devices of the embedded session. In some implementations, a notification is output to the chat conversation in response to one or more particular types of events that occur in the embedded session, including events that occur in the first embedded application and include initiation of playback of a media item, ceasing of the playback of the media item, a change in the playback of the media item based on the first user input and/or the other user input, a game event occurring in a game of the embedded session, an update to the game based on the first user input and/or the other user input, and/or an update to a shared content document based on the first user input and/or the other user input. In some implementations, a notification is output to the chat conversation in response to receiving server event information indicating that one or more events have occurred on a server, and providing the server event information to the first embedded application to display on the first user device.

In further examples, a suggestion event in the embedded session is determined based on receiving second user input received from the first user in the first chat interface, embedded event information from the first embedded application, and/or server event information from a server coupled to the network, obtaining one or more suggested response items based on the suggestion event, and causing to be displayed the one or more suggested response items by the first user device. For example, third user input indicative of a selected suggested response item can be received, causing output of a chat message associated with the selected suggested response item in the first chat interface displayed on the first user device and at the other user devices participating in the chat conversation. In another example, third user input selecting a selected suggested response item, and provide one or more commands associated with the selected suggested response item. In various examples, the commands can include at least one first command provided to the first embedded application, at least one second command provided to the first messaging application, and/or at least one third command provided to the first user device to cause display of output information from a different application executing on the first user device. The output information can include information received from a server device in communication with the first user device. In further examples, the commands can include a first command to add a first set of one or more other users to the embedded session in response to determining that a second content item is the same as a first content item being output in an embedded interface of the embedded application on the first user device, where the second content item is displayed on a first set of one or more user devices not participating in the chat conversation. The command can include a second command to add a second set of one or more other users to the embedded session in response to determining that the second set of one or more other users have input user comments associated with a fourth content item that is the same as a third content item being output in the embedded interface on the first user device, where the fourth content item is displayed on a second set of one or more user devices not participating in the chat conversation.

In further examples, content data can be received at the messaging application over a network from a server application executing at a server device and provided to the embedded application to cause output information to be displayed by the embedded application for the embedded session in an embedded interface displayed on the first user device and the one or more particular user devices. Event information is received over the network indicating a suggestion event occurring at the server application, where the suggestion event is based on input received by the server application by one or more network users different than the one or more chat users. One or more suggested response items responsive to the suggestion event are obtained, and the suggested response items are displayed in the first chat interface on the first user device. Suggested response items are selectable by user input to cause a message to be displayed in the chat interface, and/or a command to be sent to one of the embedded application and the messaging application.

In further examples, prior to the one or more particular chat users being designated as the one or more member users of the embedded session, selection input is received from the particular chat users selecting one or more associated user roles for the embedded session. The associated user roles are selected from a plurality of predefined user roles. In response to receiving the selection input, each of the one or more particular chat users is enabled to be assigned, in the embedded session, a respective associated user role selected by the particular chat user. Each particular chat user is enabled to activate one or more functions of the embedded application associated with the respective associated user role selected by the particular chat user. Indications of the associated user roles and the particular chat users are output by the first messaging application to the other user devices to be displayed.

In further examples, a first user device joins a chat conversation provided, at least in part, by a first messaging application that executes at least in part on the first user device, and a first chat interface is configured to receive first user input from the first user and display messages originating from one or more other chat users of one or more other chat devices participating in the chat conversation over a network. Each chat user is associated with a chat identity displayed in the first chat interface. Second user input is received from the first user to the first chat interface and, in response to the second user input, a first embedded application is initiated in association with the first chat interface. The first embedded application provides output information in an embedded interface that is displayed by the first user device such that least a portion of the first chat interface is visible. The chat identity associated with the first user is provided from the first messaging application to the first embedded application, where the first user is designated as a member user of an embedded session associated with the first embedded application, and the first embedded application is updated based on third user input received from the first user to the embedded interface. In some examples, the other chat users include a bot executing on at least one of the first user device and a server device connected to the first user device by a network. Based on fourth user input received from the first user in the first chat interface, the bot causes a display of content data in the embedded interface.

In further examples, first user input is received from a first user to a first embedded interface displayed in association with a first chat interface by a first embedded application that executes in association with a first messaging application on a first user device. The first user input is received by the first embedded application, the first chat interface is displayed by the first messaging application executing at least in part on the first user device, and the first chat interface is configured to receive second user input from the first user and display messages received from one or more other user devices participating in a chat conversation over a network. Each of the other user devices is associated with a respective chat user, each chat user associated with a chat identity displayed in the first chat interface. Other user input is received from one or more member users of one or more member devices of the one or more other user devices, where the member devices are included in an embedded session associated with the first embedded application. One or more states of the embedded application are updated based on the first user input and based on the other user input, where the updating includes assigning a respective user status to each of the member users. Information indicating the respective user status of the member users is provided to the first messaging application to be displayed by the other user devices participating in the chat conversation.

Figure 12:
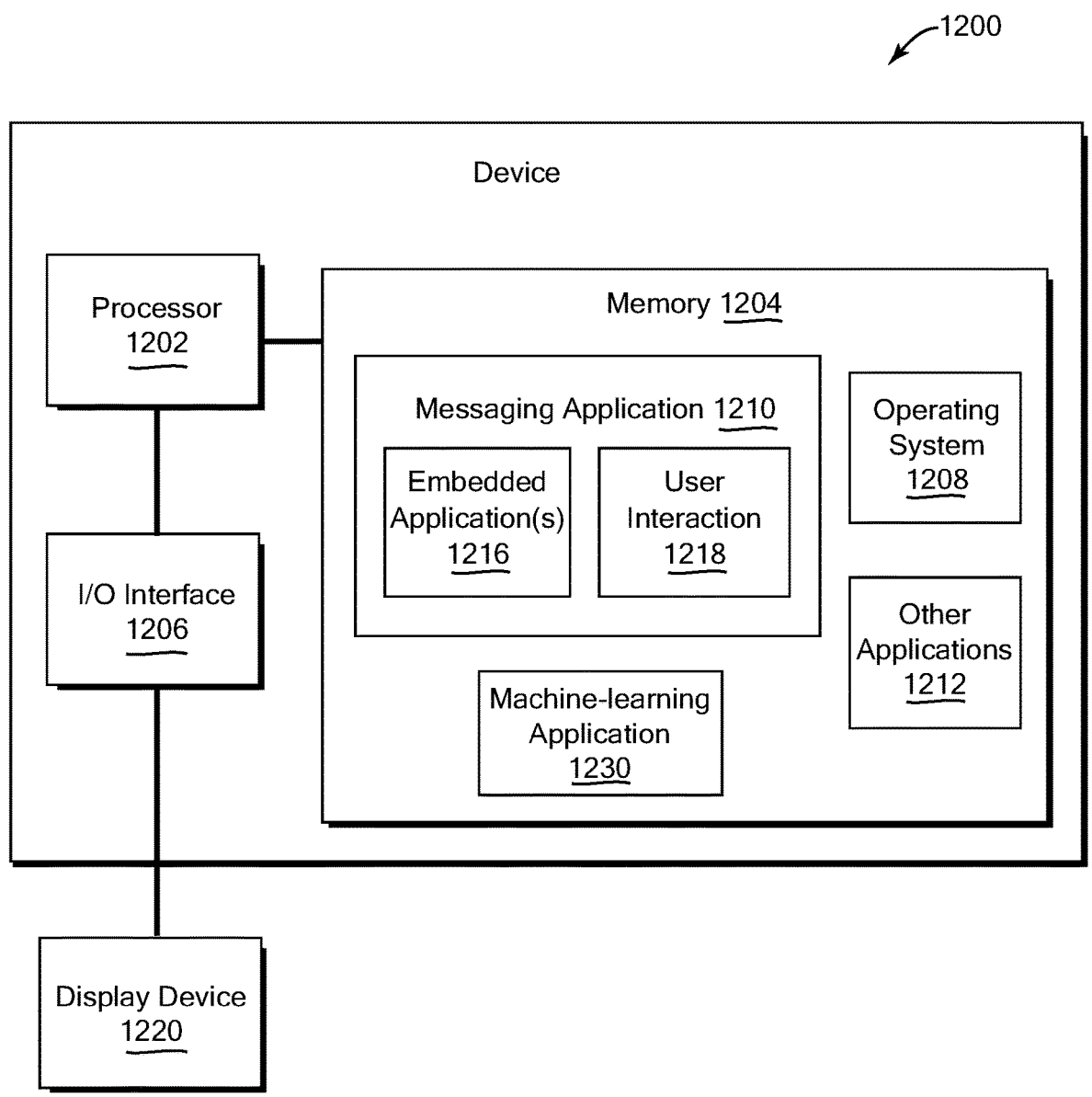
FIG. 12 is a block diagram of an example device which may be used for one or more implementations described herein.

FIG. 12 is a block diagram of an example device 1200 which may be used to implement one or more features described herein. In one example, device 1200 may be used to implement a client device, e.g., any of client devices 115 shown in FIG. 1. Alternatively, device 1200 can implement a server device, e.g., messaging server 101 and/or other servers of FIG. 1. Device 1200 can be any suitable computer system, server, or other electronic or hardware device as described above.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 1200 includes a processor 1202, a memory 1204, and input/output (I/O) interface 1206. Processor 1202 can be one or more processors and/or processing circuits to execute program code and control basic operations of the device 1200. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1204 is typically provided in device 1200 for access by the processor 1202, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1202 and/or integrated therewith. Memory 1204 can store software operating on the server device 1200 by the processor 1202, including an operating system 1208, messaging application 1210 and other applications (or engines) 1212 such as a data display engine, web hosting engine, image display engine, notification engine, social networking engine, etc. In some implementations, the messaging application 1210 can include instructions that enable processor 1202 to perform functions described herein, e.g., some or all of the methods of FIGS. 2-7. For example, messaging application 1210 can communicate with other applications and devices as described herein. In some implementations, messaging application 1210 may include or be associated with one or more embedded applications 1216, which can provide features as described herein and can communicate with the messaging application 1210 to send and receive information from other applications 1212 and devices connected via a network. In some implementations, messaging application 1210 can include one or more modules, such as user interaction module 1218 managing a chat interface and/or other user interfaces, and/or these modules can be implemented in other applications or devices in communication with the device 1200. The user interaction module 1218 and/or one or more of the other applications 1212 can, for example, provide a displayed user interface responsive to user input to display selectable options or controls, and data based on selected options.

Other applications 1212 can include, e.g., image editing applications, media display applications, communication applications, web hosting engine or application, etc. One or more methods disclosed herein can operate in several environments and platforms, e.g., as a stand-alone computer program that can run on any type of computing device, as a web application having web pages, as a mobile application ("app") run on a mobile computing device, etc.

In various implementations, the other applications 1212 can include a machine-learning application 1230 which can be used in various implementations described herein. For example, machine-learning application 1230 may utilize Bayesian classifiers, support vector machines, neural networks, or other learning techniques. In some implementations, machine-learning application 1230 may include a trained model, an inference engine, and data. In some implementations, the data may include training data, e.g., data used to generate the trained model. For example, the training data may include any type of data such as text, images, audio, video, etc. Training data may be obtained from any source, e.g., a data repository specifically marked for training, data for which permission is provided for use as training data for machine-learning, etc. In implementations where one or more users permit use of their respective user data to train the trained model, training data may include such user data. In implementations where users permit use of their respective user data, the data may include permitted data such as images (e.g., photos or other user-generated images), communications (e.g., e-mail; chat data such as text messages, voice, video, etc.), documents (e.g., spreadsheets, text documents, presentations, etc.)

In some implementations, the data may include collected data such as map data, image data (e.g., satellite imagery, overhead imagery, etc.), game data, etc. In some implementations, training data may include synthetic data generated for the purpose of training, such as data that is not based on user input or activity in the context that is being trained, e.g., data generated from simulated conversations, computer-generated images, etc. In some implementations, machine-learning application 1230 excludes the data. For example, in these implementations, the trained model may be generated, e.g., on a different device, and be provided as part of machine-learning application 1230. In various implementations, the trained model may be provided as a data file that includes a model structure or form, and associated weights. The inference engine may read the data file for the trained model and implement a neural network with node connectivity, layers, and weights based on the model structure or form specified in the trained model.

The machine-learning application also includes a trained model. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence (e.g., in a chat message), frames in a video, etc. and produces as output a result sequence), etc. The model form or structure may specify connectivity between various nodes and organization of nodes into layers. For example, nodes of a first layer (e.g., input layer) may receive data as input data or application data. Such data can include, for example, one or more pixels per node, e.g., when the trained model is used for image analysis. Subsequent intermediate layers may receive as input output of nodes of a previous layer per the connectivity specified in the model form or structure. These layers may also be referred to as hidden layers. A final layer (e.g., output layer) produces an output of machine-learning application 1230. For example, the output may be a set of labels for an image, a representation of the image that permits comparison of the image to other images (e.g., a feature vector for the image), an output sentence in response to an input sentence, one or more categories for the input data, etc. depending on the specific trained model. In some implementations, model form or structure also specifies a number and/or type of nodes in each layer.

In different implementations, the trained model can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, the trained model may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using the data described above, to produce a result.

For example, training may include applying supervised learning techniques. In supervised learning, the training data can include a plurality of inputs (e.g., a set of images) and a corresponding expected output for each input (e.g., one or more labels for each image). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to differentiate images such that the model distinguishes abstract images (e.g., synthetic images, human-drawn images, etc.) from natural images (e.g., photos).

In another example, a model trained using unsupervised learning may cluster words based on the use of the words in input sentences. In some implementations, unsupervised learning may be used to produce knowledge representations, e.g., that may be used by machine-learning application 1230. In various implementations, a trained model includes a set of weights, or embeddings, corresponding to the model structure. In implementations where the data is omitted, machine-learning application 1230 may include the trained model that is based on prior training, e.g., by a developer of machine-learning application 1230, by a third-party, etc. In some implementations, the trained model may include a set of weights that are fixed, e.g., downloaded from a server that provides the weights.

Machine-learning application 1230 also may include an inference engine. The inference engine is configured to apply the trained model to data, such as application data, to provide an inference. In some implementations, inference engine may include software code to be executed by processor 1202. In some implementations, the inference engine may specify circuit configuration (e.g., for a programmable processor, for a field programmable gate array (FPGA), etc.) enabling processor 1202 to apply the trained model. In some implementations, the inference engine may include software instructions, hardware instructions, or a combination. In some implementations, the inference engine may offer an application programming interface (API) that can be used by operating system 1208 and/or other applications 1212 to invoke the inference engine, e.g., to apply the trained model to application data to generate an inference.

Machine-learning application 1230 may provide several technical advantages. For example, when the trained model is generated based on unsupervised learning, the trained model can be applied by inference engine to produce knowledge representations (e.g., numeric representations) from input data, e.g., application data. For example, a model trained for image analysis may produce representations of images that have a smaller data size (e.g., 1 KB) than input images (e.g., 10 MB). In some implementations, such representations may be helpful to reduce processing cost (e.g., computational cost, memory usage, etc.) to generate an output (e.g., a label, a classification, a sentence descriptive of the image, etc.). In some implementations, such representations may be provided as input to a different machine-learning application that produces output from the output of the inference engine. In some implementations, knowledge representations generated by machine-learning application 1230 may be provided to a different device that conducts further processing, e.g., over a network. In such implementations, providing the knowledge representations rather than the images may provide a technical benefit, e.g., enable faster data transmission with reduced cost. In another example, a model trained for clustering documents may produce document clusters from input documents. The document clusters may be suitable for further processing (e.g., determining whether a document is related to a topic, determining a classification category for the document, etc.) without the need to access the original document, and therefore, save computational cost.

In some implementations, machine-learning application 1230 may be implemented in an offline manner. In these implementations, the trained model may be generated in a first stage, and provided as part of machine-learning application 1230. In some implementations, machine-learning application 1230 may be implemented in an online manner. For example, in such implementations, an application that invokes machine-learning application 1230 (e.g., operating system 1208, one or more of other applications 1212) may utilize an inference produced by machine-learning application 1230, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update the trained model, e.g., to update embeddings for the trained model.

In some implementations, machine-learning application 1230 may be implemented in a manner that can adapt to particular configuration of device 1200 on which machine-learning application 1230 is executed. For example, machine-learning application 1230 may determine a computational graph that utilizes available computational resources, e.g., processor 1202. For example, if machine-learning application 1230 is implemented as a distributed application on multiple devices, machine-learning application 1230 may determine computations to be carried out on individual devices in a manner that optimizes computation. In another example, machine-learning application 1230 may determine that processor 1202 includes a GPU with a particular number of GPU cores (e.g., 1,000) and implement the inference engine accordingly (e.g., as 1,000 individual processes or threads).

In some implementations, machine-learning application 1230 may implement an ensemble of trained models. For example, the trained model may include a plurality of trained models that are each applicable to same input data. In these implementations, machine-learning application 1230 may choose a particular trained model, e.g., based on available computational resources, success rate with prior inferences, etc. In some implementations, machine-learning application 1230 may execute the inference engine such that a plurality of trained models is applied. In these implementations, machine-learning application 1230 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking machine-learning application 1230, e.g., by operating system 1208 or one or more applications 1212.

In different implementations, machine-learning application 1230 can produce different types of outputs. For example, machine-learning application 1230 can provide representations or clusters (e.g., numeric representations of input data), labels (e.g., for input data that includes images, documents, etc.), phrases or sentences (e.g., descriptive of an image or video, suitable for use as a response to an input sentence, etc.), images (e.g., generated by machine-learning application 1230 in response to input), audio or video (e.g., in response an input video, machine-learning application 1230 may produce an output video with a particular effect applied, e.g., rendered in a comic-book or particular artist's style, when the trained model is trained using training data from the comic book or particular artist, etc. In some implementations, machine-learning application 1230 may produce an output based on a format specified by an invoking application, e.g. operating system 1208 or one or more applications 1212. In some implementations, an invoking application may be another machine-learning application. For example, such configurations may be used in generative adversarial networks, where an invoking machine-learning application is trained using output from machine-learning application 1230 and vice-versa.

Any of software in memory 1204 can alternatively be stored on any other suitable storage location or computer-readable medium. In addition, memory 1204 (and/or other connected storage device(s)) can store one or more messages, one or more taxonomies, electronic encyclopedia, dictionaries, thesauruses, message data, grammars, user preferences, and/or other instructions and data used in the features described herein. Memory 1204 and any other type of storage (magnetic disk, optical disk, magnetic tape, or other tangible media) can be considered "storage" or "storage devices."

I/O interface 1206 can provide functions to enable interfacing the server device 1200 with other systems and devices. Interfaced devices can be included as part of the device 1200 or can be separate and communicate with the device 1200. For example, network communication devices, storage devices (e.g., memory and/or database 106), and input/output devices can communicate via I/O interface 1206. In some implementations, the I/O interface can connect to interface devices such as input devices (keyboard, pointing device, touchscreen, microphone, camera, scanner, sensors, etc.) and/or output devices (display device, speaker devices, printer, motor, etc.).

Some examples of interfaced devices that can connect to I/O interface 1206 can include one or more display devices 1220 that can be used to display content, e.g., images, video, and/or a user interface of an output application as described herein. Display device 1220 can be connected to device 1200 via local connections (e.g., display bus) and/or via networked connections and can be any suitable display device. Display device 1220 can include any suitable display device such as an LCD, LED, or plasma display screen, CRT, television, monitor, touchscreen, 3-D display screen, or other visual display device. For example, display device 1220 can be a flat display screen provided on a mobile device, multiple display screens provided in a goggles device, or a monitor screen for a computer device.

The I/O interface 1206 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 12 shows one block for each of processor 1202, memory 1204, I/O interface 1206, and software blocks 1208, 1210, and 1212. These blocks may represent one or more processors or processing circuitries, operating systems, memories, I/O interfaces, applications, and/or software modules. In other implementations, device 1200 may not have all of the components shown and/or may have other elements including other types of elements instead of, or in addition to, those shown herein. While some components are described as performing blocks and operations as described in some implementations herein, any suitable component or combination of components of environment 100, device 1200, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to provide suggested items, the computer-implemented method comprising:
causing a chat interface to be displayed by a first user device, wherein the chat interface is generated by a messaging application, and wherein the chat interface is configured to display one or more messages in a chat conversation, wherein the one or more messages are provided by a plurality of user devices that are connected to the chat conversation over a network;
causing an embedded interface to be displayed associated with the chat interface, wherein the embedded interface is provided by a first embedded application that executes at least in part on the first user device in association with the messaging application;
causing the first user device to join an embedded session that is in association with the first embedded application and with the chat conversation, wherein a subset of the plurality of user devices is connected to the embedded session and communicates via the embedded session separately from the chat conversation;

determining that a suggestion event has occurred in association with the first embedded application based on received data that indicates that a particular event has occurred at one or more of the subset of the plurality of user devices that are connected to the embedded session;

obtaining one or more suggested response items based on the suggestion event; and causing the one or more suggested response items to be displayed by the first user device, where the one or more suggested response items are each selectable by user input received by the first user device.

2. The computer-implemented method of claim 1, wherein the particular event includes at least one of:

user input received by an associated embedded interface of the one or more of the plurality of user devices; or an embedded application event has occurred in an associated embedded application executing on the one or more of the plurality of user devices.

3. The computer-implemented method of claim 1, wherein the particular event includes at least one of:

a connection of a user device to the embedded session; or a disconnection of a user device from the embedded session.

4. The computer-implemented method of claim 1, wherein a first user of the first user device communicates, separately from the chat conversation, via the first embedded application with one or more other users of the subset of the plurality of user devices in the embedded session.

5. The computer-implemented method of claim 1, wherein an occurrence of the particular event is indicated by event information that identifies the particular event or a type of the particular event to the messaging application, wherein the messaging application obtains the one or more suggested response items in response to the messaging application receiving the event information.

6. The computer-implemented method of claim 1, further comprising:

receiving user input indicative of selection of a selected suggested response item from the one or more suggested response items; and in response to the user input, providing a command to the first embedded application, wherein the command is associated with the selected suggested response item, wherein the command causes a change in state of the first embedded application, and wherein the change in state is indicated to one or more other user devices of the plurality of user devices that are connected to the chat conversation.

7. The computer-implemented method of claim 1, further comprising:

receiving user input indicative of user selection of a selected suggested response item from the one or more suggested response items; and outputting a selected message in the chat conversation, the selected message associated with the selected suggested response item.

8. The computer-implemented method of claim 1, wherein a particular suggested response item of the one or more suggested response items includes an attached embedded application which performs one or more actions or provides output in the embedded interface, wherein the attached embedded application is encoded in data of the particular suggested response item such that selection of the particular suggested response item causes the attached embedded application to be opened by the first user device without downloading the attached embedded application to the first user device from a different device.

9. The computer-implemented method of claim 1, wherein the particular event has occurred within a different chat conversation provided by the messaging application that provides the chat conversation.

10. The computer-implemented method of claim 9, wherein the particular event is one of: a different user message input in the different chat conversation, a different user device connecting to the different chat conversation, or the different user device disconnecting from the different chat conversation.

11. The computer-implemented method of claim 9, wherein the particular event includes receiving, by the messaging application, a user message from a different user in the different chat conversation, wherein obtaining the one or more suggested response items includes one of:

obtaining a suggested command to add the different user of the different chat conversation to the embedded session; or obtaining a suggested command to send a message to be output in the different chat conversation.

12. The computer-implemented method of claim 1, wherein a particular suggested response item of the one or more suggested response items includes a suggested command to provide control over specified functions of the first embedded application to a particular user device that is connected to the embedded session.

13. The computer-implemented method of claim 1, wherein a content item displayed in the embedded session is determined to be concurrently displayed in a different embedded session, wherein obtaining the one or more suggested response items includes generating a suggested command to add one or more users of the different embedded session to the embedded session.

14. A system comprising:

a memory; and at least one processor configured to access the memory and configured to perform operations comprising:

causing a chat interface to be displayed by a first user device, wherein the chat interface is generated by a messaging application, and wherein the chat interface is configured to display one or more messages in a chat conversation, wherein the one or more messages are provided by a plurality of user devices that are connected to the chat conversation over a network;

causing an embedded interface to be displayed associated with the chat interface, wherein the embedded interface is provided by a first embedded application that executes at least in part on the first user device in association with the messaging application;

causing the first user device to join an embedded session that is in association with the first embedded application and with the chat conversation, wherein a subset of the plurality of user devices is connected to the embedded session and communicates via the embedded session separately from the chat conversation;

determining that a suggestion event has occurred in association with the first embedded application based on received data that indicates that a particular event has occurred at one or more of the subset of the plurality of user devices that are connected to the embedded session;

obtaining one or more suggested response items based on the suggestion event; and causing the one or more suggested response items to be displayed by the first user device, where the one or more suggested response items are each selectable by user input received by the first user device.

15. The system of claim 14, wherein the particular event includes at least one of:
   user input received by an associated embedded interface of the one or more of the plurality of user devices;
   an embedded application event has occurred in an associated embedded application executing on the one or more of the plurality of user devices;
   a connection of a user device to the embedded session; or
   a disconnection of a user device from the embedded session.

16. The system of claim 14, wherein the first embedded application executes at least in part on the first user device, wherein the one or more of the subset of the plurality of user devices at which the particular event has occurred are different than the first user device.

17. The system of claim 14, wherein an occurrence of the particular event is indicated by event information that identifies the particular event or a type of the particular event to the messaging application, wherein the messaging application obtains the one or more suggested response items in response to the messaging application receiving the event information.

18. The system of claim 14, wherein the operations further comprise:
   receiving user input indicative of selection of a selected suggested response item from the one or more suggested response items; and
   in response to the user input, providing a command to the first embedded application, wherein the command is associated with the selected suggested response item, wherein the command causes a change in state of the first embedded application, wherein the change in state is indicated to one or more other user devices of the plurality of user devices that are connected to the chat conversation.

19. The system of claim 14, wherein the particular event has occurred within a different chat conversation provided by the messaging application that provides the chat conversation, wherein the particular event is one of: a different user device connecting to the different chat conversation, or the different user device disconnecting from the different chat conversation.

20. A non-transitory computer readable medium having stored thereon software instructions that, when executed by a processor, cause the processor to perform operations including:
   causing a chat interface to be displayed by a first user device, wherein the chat interface is generated by a messaging application, and wherein the chat interface is configured to display one or more messages in a chat conversation, wherein the one or more messages are provided by a plurality of user devices that are connected to the chat conversation over a network;
   causing an embedded interface to be displayed associated with the chat interface, wherein the embedded interface is provided by a first embedded application that executes at least in part on the first user device in association with the messaging application;
   causing the first user device to join an embedded session that is in association with the chat conversation and the first embedded application, wherein a subset of the plurality of user devices is connected to the embedded session and communicates via the embedded session separately from the chat interface and the chat conversation;
   determining that a suggestion event has occurred in association with the first embedded application based on received data that indicates that a particular event has occurred at one or more of the subset of the plurality of user devices that are connected to the embedded session, wherein the one or more of the subset of the plurality of user devices at which the particular event has occurred are different than the first user device;
   obtaining one or more suggested response items based on the suggestion event; and
   causing the one or more suggested response items to be displayed by the first user device, where the one or more suggested response items are each selectable by user input received by the first user device.

* * * * *